(12) United States Patent
Griesinger

(10) Patent No.: US 7,499,553 B2
(45) Date of Patent: Mar. 3, 2009

(54) SOUND EVENT DETECTOR SYSTEM

(75) Inventor: David H. Griesinger, Cambridge, MA (US)

(73) Assignee: Harman International Industries Incorporated, Northridge, CA (US)

( * ) Notice: Subject to any disclaimer, the term of this patent is extended or adjusted under 35 U.S.C. 154(b) by 319 days.

(21) Appl. No.: 10/810,989

(22) Filed: Mar. 26, 2004

(65) Prior Publication Data

US 2004/0179697 A1 Sep. 16, 2004

Related U.S. Application Data

(63) Continuation of application No. 10/428,405, filed on May 2, 2003.

(60) Provisional application No. 60/377,558, filed on May 3, 2002.

(51) Int. Cl.
  *H04R 29/00* (2006.01)
  *H04R 5/00* (2006.01)
  *H02B 1/00* (2006.01)
(52) U.S. Cl. .......................... 381/56; 381/18; 381/19; 381/20; 381/123
(58) Field of Classification Search .................. 381/58, 381/59, 56, 92, 19–23, 17–18; 348/14.01–14.16
See application file for complete search history.

(56) References Cited

U.S. PATENT DOCUMENTS

| | | |
|---|---|---|
| 3,845,572 A | 11/1974 | McCanney |
| 4,251,688 A | 2/1981 | Furner |
| 4,382,158 A | 5/1983 | Ohshita et al. |
| 4,759,066 A | 7/1988 | Polk et al. |

(Continued)

FOREIGN PATENT DOCUMENTS

EP 1 387 601 A2 4/2004

(Continued)

OTHER PUBLICATIONS

Griesinger, David, "Practical Processors and Programs for Digital Reverberation", *Proceedings of the AES 7th International Conference, Audio Engineering Society*, Toronto, May 1989, pp. 187-195.

(Continued)

*Primary Examiner*—Vivian Chin
*Assistant Examiner*—Douglas J Suthers
(74) *Attorney, Agent, or Firm*—Brinks Hofer Gilson & Lione

(57) ABSTRACT

The beginning detection, accommodation and frequency bias properties of the human hearing mechanism have been modeled to create systems that can detect directional transients ("sound events") in a sound field and localize them. These systems break down a sound field into sound events and non-sound events and separately localize the sound events and non-sound events. Sound events are generally identified according to the frequency bias and beginning detection properties. Once detected, the sound events are generally localized according to differential steering angles (steering angles to which the steady-state signals have been accommodated) or ordinary steering angles, both of which reflect the direction of a sound event indicated during the rise-time of the sound event. When no sound events are detected, non-sound events are localized according to a steering angle that does not reflect rapid motion.

37 Claims, 41 Drawing Sheets

U.S. PATENT DOCUMENTS

| | | |
|---|---|---|
| 4,761,814 A | 8/1988 | Sugai et al. |
| 4,799,260 A | 1/1989 | Mandell et al. |
| 4,862,502 A | 8/1989 | Griesinger |
| 4,866,776 A | 9/1989 | Kasai et al. |
| 4,891,839 A | 1/1990 | Scheiber |
| 4,932,059 A | 6/1990 | Fosgate |
| 4,940,977 A | 7/1990 | Mandell |
| 4,941,177 A | 7/1990 | Mandell et al. |
| 4,953,213 A | 8/1990 | Tasaki et al. |
| 4,972,482 A | 11/1990 | Ishiguro et al. |
| 5,046,098 A | 9/1991 | Mandell et al. |
| 5,109,419 A | 4/1992 | Griesinger |
| 5,119,422 A | 6/1992 | Price |
| 5,136,650 A | 8/1992 | Griesinger |
| 5,146,507 A | 9/1992 | Satoh et al. |
| 5,161,197 A | 11/1992 | Griesinger |
| 5,172,415 A | 12/1992 | Fosgate |
| 5,189,703 A | 2/1993 | Holman |
| 5,199,075 A | 3/1993 | Fosgate |
| 5,222,143 A | 6/1993 | Min |
| 5,263,087 A | 11/1993 | Fosgate |
| 5,274,740 A | 12/1993 | Davis et al. |
| 5,280,528 A | 1/1994 | Fosgate |
| 5,295,189 A | 3/1994 | Fosgate |
| 5,301,237 A | 4/1994 | Fosgate |
| 5,307,415 A | 4/1994 | Fosgate |
| 5,319,713 A | 6/1994 | Waller, Jr. et al. |
| 5,333,201 A | 7/1994 | Waller, Jr. |
| 5,337,196 A | 8/1994 | Kim |
| 5,339,363 A | 8/1994 | Fosgate |
| 5,386,473 A | 1/1995 | Harrison |
| 5,400,433 A | 3/1995 | Davis et al. |
| 5,412,732 A | 5/1995 | Kanishi et al. |
| 5,428,687 A | 6/1995 | Willcocks et al. |
| 5,463,424 A | 10/1995 | Dressler |
| 5,467,399 A | 11/1995 | Whitecar |
| 5,497,425 A | 3/1996 | Rapoport |
| 5,504,819 A | 4/1996 | Fosgate |
| 5,524,054 A | 6/1996 | Spille |
| 5,583,962 A | 12/1996 | Davis et al. |
| 5,594,800 A | 1/1997 | Gerzon |
| 5,610,985 A | 3/1997 | Ten Kate |
| 5,617,480 A | 4/1997 | Ballard et al. |
| 5,625,696 A | 4/1997 | Fosgate |
| 5,638,452 A | 6/1997 | Waller, Jr. |
| 5,642,423 A | 6/1997 | Embree |
| 5,644,640 A | 7/1997 | Fosgate |
| 5,666,424 A | 9/1997 | Fosgate et al. |
| 5,708,719 A | 1/1998 | Greenberger et al. |
| 5,727,067 A | 3/1998 | Iwamatsu |
| 5,727,068 A | 3/1998 | Karagosian et al. |
| 5,748,746 A | 5/1998 | Ozaki et al. |
| 5,761,313 A | 6/1998 | Schott |
| 5,768,394 A | 6/1998 | Heo |
| 5,771,295 A | 6/1998 | Waller, Jr. |
| 5,796,844 A | 8/1998 | Griesinger |
| 5,798,818 A | 8/1998 | Derderian et al. |
| 5,802,181 A | 9/1998 | Ozaki et al. |
| 5,841,993 A | 11/1998 | Ho |
| 5,850,455 A | 12/1998 | Arnold et al. |
| 5,862,228 A | 1/1999 | Davis |
| 5,870,480 A | 2/1999 | Griesinger |
| 5,930,370 A | 7/1999 | Ruzicka |
| 5,974,380 A | 10/1999 | Smyth et al. |
| 5,983,087 A | 11/1999 | Milne et al. |
| 6,032,081 A | 2/2000 | Han et al. |
| 6,038,324 A | 3/2000 | Ambourn |
| 6,108,584 A | 8/2000 | Edwards |
| 6,118,876 A | 9/2000 | Ruzicka |
| 6,122,381 A | 9/2000 | Winterer |
| 6,141,597 A | 10/2000 | Botzko et al. |
| 6,144,474 A | 11/2000 | Nitta et al. |
| 6,150,597 A | 11/2000 | Kakishita et al. |
| 6,157,725 A | 12/2000 | Becker |
| 6,198,826 B1 | 3/2001 | Cowieson et al. |
| 6,332,026 B1 | 12/2001 | Kuusama et al. |
| 6,442,277 B1 | 8/2002 | Lueck et al. |
| 6,442,278 B1 | 8/2002 | Vaudrey et al. |
| 6,453,047 B1 | 9/2002 | Dicker et al. |
| 6,466,913 B1 | 10/2002 | Yasuda et al. |
| 6,496,584 B2 | 12/2002 | Irwan et al. |
| 6,498,856 B1 | 12/2002 | Itabashi et al. |
| 6,501,717 B1 | 12/2002 | Yamazaki |
| 6,501,843 B2 | 12/2002 | Usui et al. |
| 6,539,357 B1 | 3/2003 | Sinha |
| 6,556,685 B1 | 4/2003 | Urry et al. |
| 6,577,736 B1 | 6/2003 | Clemow |
| 6,587,565 B1 | 7/2003 | Choi |
| 6,590,983 B1 | 7/2003 | Kraemer |
| 6,611,212 B1 | 8/2003 | Craven et al. |
| 6,624,873 B1 | 9/2003 | Callahan, Jr. et al. |
| 6,636,608 B1 | 10/2003 | Kishii et al. |
| 6,639,989 B1 | 10/2003 | Zacharov et al. |
| 6,650,755 B2 | 11/2003 | Vaudrey et al. |
| 6,683,962 B1 | 1/2004 | Griesinger |
| 6,694,027 B1 | 2/2004 | Schneider |
| 6,697,491 B1 | 2/2004 | Griesinger |
| 6,711,266 B1 | 3/2004 | Aylward |
| 6,804,565 B2 | 10/2004 | Eid |
| 6,816,597 B1 | 11/2004 | Kawano |
| 6,829,576 B2 | 12/2004 | Tsai et al. |
| 6,850,622 B2 | 2/2005 | Maejima |
| 6,996,239 B2 | 2/2006 | Wood |
| 7,065,217 B2 | 6/2006 | Gierl et al. |
| 7,107,211 B2 | 9/2006 | Griesinger |
| 7,177,432 B2 | 2/2007 | Eid et al. |
| 7,206,413 B2 | 4/2007 | Eid et al. |
| 7,236,838 B2 | 6/2007 | Katayama et al. |
| 2003/0040822 A1 | 2/2003 | Eid et al. |
| 2003/0206639 A1 | 11/2003 | Griesinger |
| 2004/0005064 A1 | 1/2004 | Griesinger |
| 2004/0005065 A1 | 1/2004 | Griesinger |
| 2004/0022392 A1 | 2/2004 | Griesinger |
| 2004/0086130 A1 | 5/2004 | Eid et al. |
| 2004/0179697 A1 | 9/2004 | Griesinger |
| 2005/0018860 A1 | 1/2005 | Furger et al. |
| 2005/0031128 A1 | 2/2005 | Tomita et al. |
| 2005/0063551 A1 | 3/2005 | Cheng et al. |
| 2006/0088175 A1 | 4/2006 | Eid et al. |

FOREIGN PATENT DOCUMENTS

| | | |
|---|---|---|
| WO | WO 02-091798 A2 | 11/2002 |
| WO | WO 02-091798 A3 | 11/2002 |

OTHER PUBLICATIONS

Griesinger, David, "Multichannel Matrix Surround Decoders for Two-Eared Listeners", *Presented at the 101st Convention of the Audio Engineering Society*, Los Angeles, Nov. 8-11, 1996, Preprint # 4402, 21 pages.

Griesinger, David, "Spaciousness and Envelopment in Musical Acoustics", *Presented at the 101st Convention of the Audio Engineering Society*, Los Angeles, Nov. 8-11, 1996, Preprint # 4401, 23 pages.

Griesinger, David, "Speaker Placement, Externalization, and Envelopment in Home Listening Rooms", *Presented at the 105th Convention of the Audio Engineering Society*, San Francisco, 1998, Preprint # 4860, 48 pages.

Griesinger, David, "General Overview of Spatial Impression, Envelopment, Localization, and Externalization", *Proceedings of the 15th International Conference of the Audio Engineering Society on Small Room Acoustics*, Denmark, Oct. 31-Nov. 2, 1998, pp. 136-149.

Griesinger, David "Theory and Design of a Digital Audio Processor for Home Use", *J. Audio Eng. Soc.*, vol. 37, No. 1/2, 1989, pp. 40-50.

Griesinger, David, "Binaural Techniques for Music reproduction" *Proceedings of the 8th International Conference of the Audio Engineering Society*, 1990, pp. 197-207.

Griesinger, David, "Improving Room Acoustics Through Time Variant Synthetic Reverberation", *Presented at the 90th Convention of the Audio Engineering Society*, Paris, Feb. 1991, reprint # 3014, 27 pgs.

Griesinger, David, "Room Impression Reverberance and Warmth in Rooms and Halls", *Presented at the 93rd Convention of the Audio Engineering Society*, San Francisco, Nov. 1992, Preprint # 3383, 21 pgs.

Griesinger, David, "IALF—Binaural Measures of Spatial Impression and Running Reverberance", *Presented at the 92nd Convention of the Audio Engineering Society*, Mar. 1992, Preprint #3292, 42 pgs.

Griesinger, David, "Stereo and Surround Panning in Practice", *Presented at the 112th Convention of the Audio Engineering Society*, Munich, May 2002, 6 pages.

Griesinger, David, "Progress in 5-2-5 Matrix Systems", *Presented at the 103rd Convention of the Audio Engineering Society*, New York, Sep. 1997, 34 pages.

Griesinger, David, "Multichannel Sound Systems and Their Interaction with the Room", *Presented at the 15th International Conference, of the Audio Engineering Society*, Copenhagen, Oct. 1998, pp. 159-173.

Griesinger, David, "How Loud Is My Reverberation?", *Presented at the 98th Convention of the Audio Engineering Society*, Paris, Feb. 1995, 11 pages.

Griesinger, David, "Spaciousness and Localization in Listening Rooms and Their Effects on the Recording Technique", *J. Audio Eng. Soc.*, vol. 34, No. 4, 1986, pp. 255-268.

Griesinger, David, "The Psychoacoustics of Apparent Source Width, Spaciousness and Envelopment in Performance Spaces", *Acta Acoustics*, vol. 83, 1997, pp. 721-731.

Griesinger, David, "Surround: The Current Technological Situation", *SMPTE Journal*, 2001, pp. 857-866.

Griesinger, David, "Feedback Reduction and Acoustic Enhancement Using An Inexpensive Digital Sound Processor", *Presented at the 15th International Congress on Acoustics*, Trondheim, Jun. 1995, pp. 473-476.

Griesinger, David, "The Science of Surround", *Presentation material from a speech given at McGill University*, copyright by David Griesinger, Sep. 1999, 69 pages.

Griesinger, David, "Recent Experiences With Electronic Acoustic Enhancement in Concert Halls and Opera Houses", material from David Griesinger's Internet Home Page, obtained from the Internet at: <www.world.std.com/~griesngr...>, undated but prior to May 2002, 9 pages.

Griesinger, David, "The Theory and Practice of Perceptual Modeling—How to use Electronic Reverberation to Add Depth and Envelopment Without Reducing Clarity", material from David Griesinger's Internet Home Page, obtained from the Internet at: <www.world.std.com/~griesngr...>, undated but prior to May 2002, 28 pages.

Griesinger, David, "Internet Home Page", obtained from the Internet at: <www.world.std.cpm/~griesngr/>, printed on Apr. 26, 2004.

Griesinger, David, "Measures of Spatial Impression and Reverberance Based on the Physiology of Human Hearing," *Proceedings of the 11th International Audio Engineering Society Conference*, May 1992, pp. 114-145.

Griesinger, David, "Internet Home Page," obtained from the Internet at: www.world.std.com/griesinger/..printed on Apr. 26, 2004, 9 pages.

Griesinger, David, "Recent Experiences With Electronic Acoustic Enhancement in Concert Halls and Opera Houses," material from David Griesinger's Internet Home Page, obtained from the Internet at: www.world.std.com/griesinger, undated but prior to May 2002, 28 pages.

Griesinger, David, "The Science of Surround," *Presentation material from a speech given at McGill University*, copyright by David Griesinger, Sep. 1999, 69 pages.

Griesinger, David, "The Theory and Practice of Perceptual Modeling—How To Use Electronic Reverberation to Add Depth and Envelopment Without Reducing Clarity," material from David Griesinger's Internet Home Page, obtained from the Internet at: www.world.std.com/griesinger...., undated but prior to May 2002, 28 pages.

SOUND EVENT DETECTOR SYSTEM

CROSS REFERENCE TO RELATED APPLICATIONS

This application is a continuation of copending U.S. patent application Ser. No. 10/428,405, filed May 2, 2003, entitled "Sound Event Detection and Localization System," which is hereby incorporated by reference, and is based on U.S. Provisional Application Ser. No. 60/377,558, filed May 3, 2002, entitled "Adaptive Circuit for Determining the Direction and Timing of Sound Events Embedded in a Complex Sound Field." The benefit of the filing date of the Application and the Provisional Application is claimed for this application.

BACKGROUND OF THE INVENTION

1. Technical Field

The invention relates generally to detecting and localizing sound. More particularly, this invention relates to detecting and/or localizing sound that includes sound events in a complex sound field 2. Related Art Many sound-based applications, such as audio reproduction systems, audio and speech coding systems, speech recognition systems, and audio amplification systems require the ability to distinguish and detect certain types of sound and to determine the directions from which the sound emanates or originates. The ability to detect certain types of sound is important to applications such as sound amplification, while the ability to detect and localize sound is crucial to applications involving sound reproduction. Unfortunately, the detection and localization of sound can be very complicated because, whether live or reproduced, sound generally consists of a complicated combination of many different sounds, which rarely occur by themselves.

These many different sounds may occur over time to form a complex sound field, in which the sounds can overlap, occur one after the other, or in any combination. One way in which the individual sounds in a sound field are classified is according to whether an individual sound has emanated or originated from a particular location. Sounds that can be detected as emanating or originating from a particular direction are referred to as directional sounds, while sounds that can be detected as emanating or originating from no particular direction at all are referred to as non-directional sounds. Another way of classifying individual sounds is according to whether an individual sound is a transient or a steady-state sound. Steady-state sounds are those that have a generally constant level of power over time, such as a sustained musical note. Steady-state sounds can be directional or non-directional sounds. Transient sounds (or "transients") are sounds that have an initial energy spike, such as a shout or a drum hit. Transients can also be directional or non-directional sounds. An example of a non-directional transient sound is speech in a reverberant space where the direct speech is blocked by an object. In this case, if the reverberation time of the speech is less than one second, the time characteristics of the signal are preserved, but information about its direction is lost.

Directional transients are referred to in this application collectively as "sound events." Two types of sound events are syllables and impulsive sounds. Syllables include phonemes and notes. Phonemes are transient sounds that are characteristic of phones in human speech and can be particularly useful in detecting and localizing syllables in human speech. Notes are the individual notes created, for example, by a musical instrument. Syllables, including notes and phonemes, generally have the following characteristics: a finite duration of at least about 50 ms up to about 200 ms, but typically about 150 ms; rise times of about 33 ms; generally occur no more frequently than about once every 0.2 ms to about once every 0.5 ms; and may have low or high volume (amplitude). In contrast, impulsive sounds are transients of very short duration, such as a drum hit or fricatives and explosives in speech. Impulsive sounds generally have the following characteristics: a short duration of about 5 ms to about 50 ms, rise times of about 1 ms to about 10 ms, and high volume.

To detect sounds in a sound field, whether generated live or as a reproduction, generally the sound field need only be generated in one input or "input channel." However, to localize sounds, generally the sound field needs to be generated in at least two inputs or input channels. The archetype for sound localization is natural hearing, where the azimuth of the sound is detected primarily by the arrival time difference between the two input channels represented by the two ears. When localizing sounds electronically, the azimuth of a sound source is determined primarily by the amplitude and phase relationships between the signals generated in two or more input channels. Generally, in order to describe the azimuth of directional sounds from these input channels, the direction of the source of these sounds is described in terms of an angle between each corresponding pair of input channels (each an "input channel pair"). If sounds are generated in only two channels, the directions of the sounds are given in terms of an angle for that input channel pair, generally a left/right angle "lr." In this case, the value for lr ranges from about −45 degrees to about 45 degrees, with −45 degrees indicating that the sound field originates from the left input channel, 45 degrees indicating that the sound field originates from the right input channel, and 0 degrees indicating that the sound field originates from a position in the middle, precisely between the right and left input channels (a position often referred to as "center").

However, when the sound field is generated in two channel pairs, such as in a surround sound system, a second directional component is specified. Even if the sound field is generated in only one channel pair, a second directional component may also be specified because it is often possible to derive an additional channel pair from the one channel pair. The second directional component may include a front/back or center/surround angle "cs." The value for cs also ranges from about −45 degrees to about 45 degrees, with lr=0 and cs=45 degrees indicating that the sound field originates from the center input channel only, and lr=0 and cs=−45 degrees indicating that the sound field originates from the rear input channel only. Similarly, lr=−45 and cs=0 degrees indicates a sound originating from the left and lr=45 and cs=0 degrees indicating that the sound field originates from the right. Additionally, lr=−22.5 degrees and cs=−22.5 degrees indicates that the sound field originates from the left rear and lr=22.5 and cs=−22.5 indicates that the sound field originates from the right rear.

One known technique for determining these angles is used in reproducing recorded sound. In general, this known technique determines the intended direction of sounds by comparing the amplitudes of the signals in one input channel of a input channel pair with the signals in the corresponding input channel of the input channel pair (generally, the left with the right, and the center with the surround). More specifically, this ratio of amplitudes is used to determine what is generally referred to an "ordinary steering angle" or "OSA" for each input channel pair. To obtain the OSA, the voltage signals in each input channel of an input channel pair are rectified and the logarithms of the rectified voltages are taken. By subtracting the logarithm of the rectified voltage of one input channel from the log of the rectified voltage of the other input channel in the input channel pair, a signal is produced that equals the logarithm of the ratio of the voltages in the input channel pair which, when converted back into the magnitude domain, is the ordinary steering angle. In surround reproduction systems, this determination is often made by a device called a matrix decoder.

Unfortunately, this known technique treats the entire sound field as if it contains only a single sound because it determines the direction of the entire sound field according to the relative voltage strength in each input channel. Therefore, many directional individual sounds will not be properly localized. In order to treat the sound field as a complex combination of many sounds, attempts have been made to devise filters that will separate the directional transient sounds (sound events) so that their directions can be independently determined. However, a fundamental problem is encountered when designing such a filter. If the filter is made fast enough to distinguish the fluctuations of all directional transient signals, it will also distinguish fluctuations characteristic of non-directional transient signals such as reverberation and noise. As a result, the rapid fluctuations of reverberation and noise are reproduced as directional changes in the sound, which severely degrades the quality of the reproduced sound. On the other hand, if the filter is made slow enough not to distinguish the fluctuations characteristic of the non-directional signals, the filter is generally too slow to distinguish the fluctuations of certain sound events, particularly impulsive sounds. As a result, many sound events are not properly localized. No matter how these filters are designed, they generally work well on only one type of music but not on all. For example, the fast filter will work well on complex popular music, which is full of rapid changes, but will reflect false directional changes (steer too greatly) when a highly-reverberant classical piece is reproduced.

Additional problems arise when sounds are recorded in a given number of input channels and then reproduced over a different number of channels. For example, two common classes of sound recording and reproduction techniques are stereo and surround. Sounds recorded for reproduction in stereo (two channels) are intended to be perceived as originating only from the front. Sounds recorded for reproduction in surround (any number of input channels greater than two, but generally five or seven channels) are intended to be perceived as originating from all around, generally with one or two input channels used to reproduce sounds from the rear. The techniques used to record sounds intended for reproduction in stereo are generally different from those used to record sounds intended for reproduction in surround. However, because surround systems are not universally used, sounds recorded for reproduction in surround generally need to be capable of high-quality reproduction in stereo. For example, in a typical five channel surround system, the sounds in the center channel are encoded into the right and left input channels so that the sounds included in the center channel "c" equal the sum of the sounds included in the left and right input channels (c=l+r). Similarly, the sounds in the surround channel are encoded into the left and right input channels so that the sounds included in the surround channel "s" equal the difference between the sounds included in the left and right input channels (s=l−r). In another example, the Dolby Surround® system, which records sounds for reproduction in surround, adds a negative phase to the sounds intended for reproduction from behind the listener (the rear). This negative phase is generally undetected by stereo reproduction systems and is transparent to the listener. However, the negative phase is detected by a surround reproduction system that then reproduces the associated sounds in the rear input channels. Unfortunately, many sounds naturally have negative phase, even when recorded in stereo format, and are therefore incorrectly reproduced in the rear input channels by a surround reproduction system. This can be distracting and unnatural.

SUMMARY

A need exists for a detector that can distinguish sound events from the remainder of the sound field, a localizer that can separately determine the directions of the detected sound events, and a sound localizer that can separately determine the direction of sound events as well as the remaining sounds in a sound field. Properties of the human hearing mechanism have been modeled and used to create systems with these features because many of the problems encountered by known sound detection and localization systems are not experienced by the human hearing mechanism.

The human hearing mechanism localizes sounds in a sound field by breaking down the sound field into individual sounds, determining the direction of the individual sounds, reassembling related sounds into streams (such as the melody line of a particular instrument or a line of dialogue from a particular speaker), and determining the direction of the stream based on the average direction of the individual sounds within the stream. In breaking down a sound field into individual sounds, the human hearing mechanism has the ability to distinguish transient sounds from other sounds and to distinguish sound events from non-directional transients.

Furthermore, the human hearing mechanism can distinguish transient from non-transient sounds and sound events from other transient sounds even in the presence of a background signal by relying on the properties of beginning detection and accommodation. Beginning detection results from human neurology, which is highly evolved to determine the starting points and end points of sounds and makes the human hearing mechanism particularly sensitive to the rise and fall times of sounds. Accommodation is the property that allows the human hearing mechanism to distinguish transient from steady-state sounds by gradually ignoring the presence of the steady state sounds. Additionally, for purposes of localization, the human hearing mechanism relies more heavily on certain frequencies and the apparent direction of the beginnings of sounds. The human hearing mechanism relies most heavily on frequencies between about 500 Hz and about 4000 Hz for direction determination. This frequency bias is largely a result of the frequency response of the external ear (the pinnae, concha and ear canal) and by the frequency transfer function of the middle ear. The human hearing mechanism also relies on the direction indicated in the rise time of a sound more than the direction indicated in other portions of the sound. This reliance is advantageous because the direction indicated in the rise time of a sound is less likely to be corrupted by sound reflections or reverberations even in a highly reflective environment.

After detecting the directions of the individual sounds, the human hearing mechanism reassembles related sounds into streams and separately determines the direction of each stream. The direction of each stream is generally the average direction of all sounds within the stream. In any case, the process of reassembling related sounds into streams and determining the direction of each stream is performed unconsciously and automatically by the human hearing mechanism.

The properties of the human hearing mechanism have been modeled to create sound event detection methods, which produce a signal indicating the occurrence of sound events in a sound field. These sound event detection methods use the property of beginning detection to detect the occurrence of sound events. The beginning detection property is modeled to identify the onsets typical of sound events and uses these onsets to generate a trigger signal. Additionally, the sound event detection methods may use the accommodation property to improve the accuracy of the trigger signal. The accommodation property is modeled to reduce over time the effect any steady-states sounds may have on the sound field. These effects are reduced in the sound field to produce a differential signal. This differential signal may then be used by the beginning detection model to produce an improved trigger signal. The sound event detection methods may also include emphasizing the frequencies important to the human hearing mechanism.

The properties of the human hearing mechanism have also been used to create sound event detection and localization methods for determining the location of sound events that occur in the presence of a background signal. These sound event detection and localization methods produce at least one steering angle indicating the direction of a sound event whenever a trigger signal indicates that the sound event has occurred (each a "differential steering angle"). Sound event detection and localization methods use differential signals to determine the differential steering angles by comparing the relative power of the sound event in each input channel of each input channel pair after accommodating to any steady-state sounds. By comparing the power in each input channel of an input channel pair instead of the voltage in each input channel of an input channel pair, as done in known methods, individual sound events can be identified and separately localized.

The properties of the human hearing mechanism may also be used to determine the location of all sounds within a sound field. By combining the sound event detection and localization methods with known methods for determining the intended direction of sounds, sound localization methods have been developed that localize the individual sounds in the presence of background sounds for any combination of sounds more accurately. The sound localization methods divide the sound field into sound events and non-sound events and localize the sound events in terms of a true differential steering angle or a true ordinary steering angle and the non-sound events in terms of a filtered ordinary steering angle. These methods essentially treat the non-sound events as a separate sound for which the direction is separately determined. The sound localization methods, as well as the sound event detection and localization methods and the sound event detection methods, can be implemented for any number and combination of sound event types in a sound field generated in any number of input channel pairs.

The properties of the human hearing mechanism have been modeled to create electronic circuitry that detects sound events in the presence of a background signal. These sound event detectors may be used for a variety of applications for which the detection of specific types of sound events is helpful. For example, a sound event detector that detects syllables may be used as part of a phonic detector or as part of a speech recognition or speech coding system. In another example, a sound event detector that detects syllables may be used in conjunction with an audio amplification device, such as a microphone. This allows the microphone to remain off until a syllable is detected from a speaker, thus preventing the microphone from amplifying undesired sounds and feedback through the microphone itself when the speaker is silent. Sound event detectors, like the sound event detection methods, are based on models of the beginning detection property and the accommodation property and generally produce a trigger signal that includes some flag or marker, such as a pulse, that indicates the occurrence of a sound event.

The properties of the human hearing mechanism have been modeled to create electronic circuitry that detects and localizes sound events in the presence of a background signal. These sound event detectors and localizers, like the sound event detection and localization methods, determine the direction of sound events in relation to one or more input channel pairs in terms of a true differential steering angle or a true ordinary steering angle and in some cases, verify the accuracy of the steering angles. One application of a sound event detector and localizer is as a stereo/surround detector. A stereo/surround detector determines whether a sound field is intended for reproduction in two input channels or in more than two input channels.

The properties of the human hearing mechanism have been modeled to create electronic circuitry that determines the location of all sounds within a sound field. These sound localizers separately detect and localize sound events and non-sound events in a sound field to produce a continuous indication of the direction of the sound field. These sound localizers may be used in a variety of applications, such as the reproduction of recorded sounds, particularly if the sounds are part of a complex sound field that includes sound events occurring simultaneously with steady-state sounds. When a sound field is to be reproduced in surround but was stored in stereo format, the sound localizers can be used as part of a matrix decoder to derive the true directions of the sounds from a two input channel mix. Also, the sound localizers can be implemented to detect any number and combination of sound event types in a sound field generated in any number of input channels.

The sound event detection methods, sound event detection and localization methods, sound localization methods, as well as any of the sound event detectors, sound event detectors and localizers and sound localizers, may be implemented in a sound event device and/or in computable readable software code.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. In the drawings.

DETAILED DESCRIPTION OF THE PREFERRED EMBODIMENTS

Figure 1:
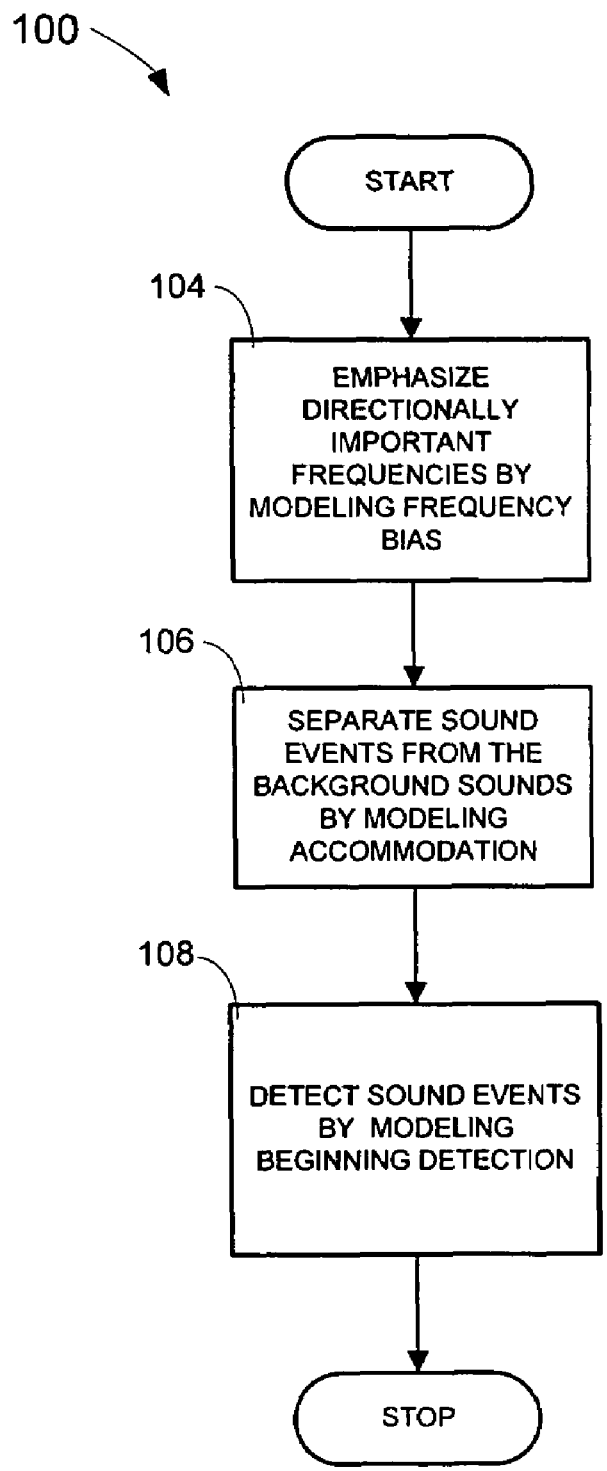
FIG. 1 is a flow chart of a sound event detection method for a single input channel and single sound event type.

Sound detection and localization systems, including methods, devices, circuits, software and the like, have been developed that detect and separately determine the direction of sound events in a complex sound field based on the properties of the human hearing mechanism. The human hearing mechanism, which includes the ears, auditory system and related portions of the brain, was chosen as a model for two basic reasons. The first is that the human hearing mechanism detects sounds and determines their direction very effectively and without the shortcomings of known systems. The second reason is that many of the mistakes made by systems modeled after the human hearing mechanism will generally be the same mistakes made by the human hearing mechanism, thus making these mistakes inaudible.

The human hearing mechanism was studied and used as a model from which sound detection and localization systems were created. By modeling the frequency bias, beginning detection property, accommodation property and the onset reliance of the human hearing mechanism, extremely effective, high-quality methods have been created for the detection of sound events in the presence of steady-state sounds, for the detection and localization of sound events in the presence of steady-state sounds, and for the detection and localization of all sounds in a sound field. These methods can also be implemented in software and hardware to create programs, devices, circuits, even more complicated systems, and the like applicable to a wide range of applications.

Many of the problems encountered by known sound detection and localization systems are not experienced by the human hearing mechanism. For example, human listeners are not generally fooled by highly reverberant music into perceiving rapid motion of the music or its source. Furthermore, the human hearing mechanism localizes sounds in a sound field by breaking down the sound field into individual sounds, determining the direction of the individual sounds, reassembling related sounds into streams (such as the melody line of a particular instrument or a line of dialogue from a particular speaker), and determining the direction of the stream based on the average direction of the individual sounds within the stream. The robust nature of the human hearing mechanism enhances its ability to distinguish sounds and determine their direction, such that, even if the direction of the sounds in the stream are determined correctly only about 50% of the time, the direction of the entire stream will most likely be correctly determined.

In breaking down a sound field into individual sounds, the human hearing mechanism has the ability to distinguish transient sounds from other sounds and to distinguish sound events from non-directional transients. Furthermore, the human hearing mechanism can distinguish transient from non-transient sounds and sound events from other transient sounds, even in the presence of a background signal, by relying on the properties of beginning detection and accommodation. Beginning detection results from human neurology, which is highly evolved to determine the starting points and end points of individual sounds (also referred to as "sounds") and makes the human hearing mechanism particularly sensitive to the rise and fall times of sounds. Accommodation is the property that allows the human hearing mechanism to distinguish transient from steady-state sounds by gradually ignoring the presence of the steady state sounds. The properties of beginning detection and accommodation and their effect on localization were discovered and demonstrated experimentally. In experiments with headphones, it was discovered that the azimuth (as an indication of direction) of a tone can only be detected when the tone starts or stops. If the tone is continuous, it becomes very difficult to determine its direction. Furthermore, if new sounds are added to a steady-state tone, the true direction of the new sounds is easy to determine. This demonstrates that some sounds have both a transient and a steady-state component. It also demonstrates that the human hearing mechanism is particularly sensitive to the transient components, which include the beginnings and ends of sounds, and uses the beginnings and ends of sounds for localization (the beginning detection property). It also demonstrates that the human hearing mechanism ignores steady-state sounds over time and generally does not rely on them for localization (the accommodation property). It was further discovered that the rate at which the human hearing mechanism gradually ignores the steady-state sounds (the "accommodation rate") is independent of the sound event type being detected. It was also found that the accommodation rate may not be constant and may adjust to acoustic conditions and to the rapidity of speech. However, a reasonable average value for the accommodation rate was found to be about 300 ms.

Additionally, for purposes of localization, the human hearing mechanism relies more heavily on certain frequencies and the apparent direction of the beginnings of sounds. The human hearing mechanism relies most heavily on frequencies between about 500 Hz and about 4000 Hz for direction determination. This frequency bias is largely a result of the frequency response of the external ear (the pinnae, concha and ear canal) and by the frequency transfer function of the middle ear. The human hearing mechanism also relies on the direction indicated in the rise time of a sound more than the direction as indicated in other portions of the sound. This reliance is advantageous because the direction indicated in the rise time of a sound is less likely to be corrupted by sound reflections or reverberations even in a highly reflective environment.

After detecting the directions of the individual sounds, the human hearing mechanism reassembles related sounds into streams and separately determines the direction of each stream. The direction of each stream is generally the average direction of all sounds within the stream. In many cases, sounds are reassembled into a foreground stream and a background stream. In one example, the foreground stream may consist of dialog and the background stream may consist of environmental sounds being produced around the source of the dialog. In any case, the process of reassembling related sounds into streams and determining the direction of each stream is performed unconsciously and automatically by the human hearing mechanism.

By applying the properties of the human hearing mechanism, systems have been developed to (a) detect sound events within a sound field; (b) detect and localize sound events in a sound field; and (c) localize all sounds within a sound field. These methods, devices, circuits, software, systems and the like use the properties of the human hearing mechanism to break the sound field down into individual sounds, distinguish the individual sound events, and determine the direction of the individual sound events and other sounds. When the directions of the individual sounds are used to reproduce the sound field, it is left to the human hearing mechanism to reassemble the related sounds into streams and to determine the direction of each stream.

1. Methods for Detecting Sound Events

The properties of the human hearing mechanism have been modeled to create methods for detecting sound events in the presence of a background signal (collectively "sound event detection methods"). Sound event detection methods produce a signal (referred to in this application as a "trigger signal"), which includes a flag or marker, such as a pulse, that indicates the occurrence of a sound event. The sound event detection methods can be implemented to detect any number and combination of sound events in any number of input channels. In the following description, the sound event detection methods are discussed in order of increasing complexity, with each subsequent sound event detection method incorporating the steps of the prior methods, except as indicated.

An example of a method for detecting sound events in the presence of a background signal that detects a single sound event type in a sound field generated in a single input channel ("sound event detection methods for a single input channel and a single sound event type"), is shown in FIG. 1 and indicated by reference number 100. The sound event detection method for a single input channel and a single sound event type 100 includes: emphasizing the directionally important frequencies by modeling frequency bias 104; separating sound events from background sounds by modeling accommodation 106; and detecting sound events by modeling beginning detection 108.

Figure 2:
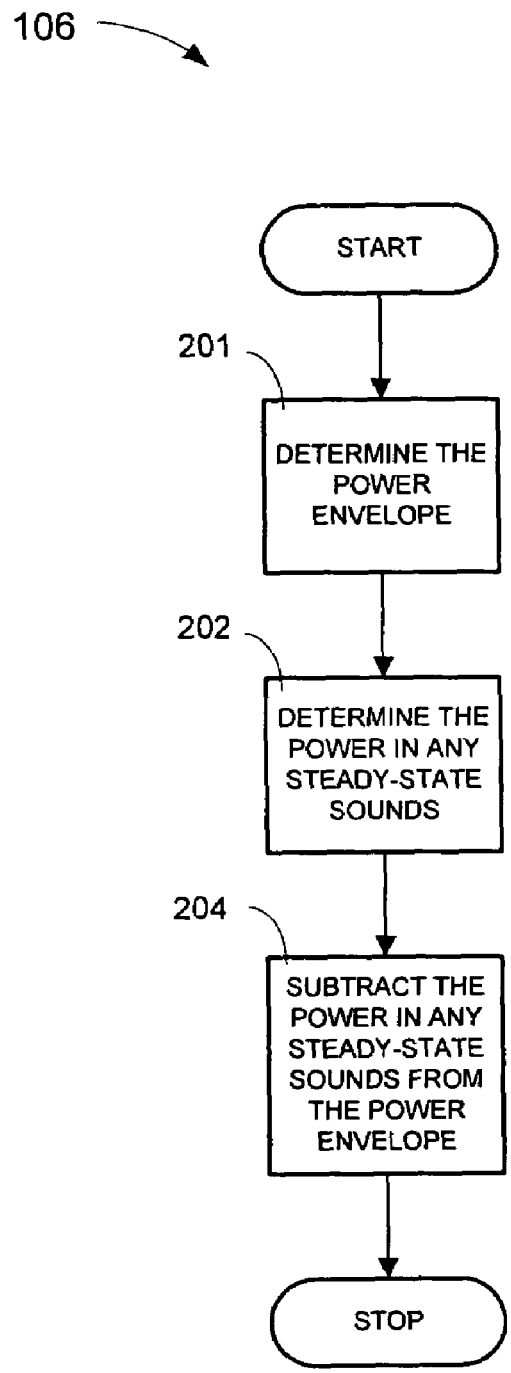
FIG. 2 is a flow chart of an accommodation method.

The directionally important frequencies are emphasized by modeling the frequency bias of the human hearing mechanism 104 using a frequency emphasis method. The frequency emphasis method includes emphasizing the frequencies between about 500 Hz and about 4 kHz in the input channel to produce a filtered signal in the input channel. These frequencies are emphasized because they have the most influence on the human hearing mechanism in terms of determining direction. Separating the sound events from the background sounds by modeling accommodation 106 generally includes examining the change in input power in the sound field and is shown in more detail in FIG. 2. More specifically, separating the sound events from the background sounds by modeling accommodation 106 (an "accommodation method") includes: determining the power envelope of the input channel 201; determining the power in any steady-state sounds 202, and subtracting the power in any steady-state sounds from the power envelope of the input channel. Determining the power envelope of the input channel 201 generally includes squaring the voltage signal in the input channel. A sound field, whether produced live or from a recording, is generally represented as a voltage signal in the time domain. As later explained in connection with FIG. 3, the voltage signal and the power envelope may both include fluctuations or pulses, only some of which may be characteristic of sound events. Unfortunately, voltage signals do not have the additive property, which means that the magnitude of a voltage signal resulting from the combination of two voltage signals cannot be determined by simply adding the amplitudes of the two voltage signals. However, power signals do have the additive property. Therefore, by converting the voltage signal into a power signal, (generally by squaring the voltage signal) a power envelope results from which other power signals may be subtracted. In this manner, fluctuations in the power envelope that are not characteristic of the sound event type being detected may be removed in order to obtain a cleaner power envelope (one containing fewer fluctuations). For example, if syllables are being detected, fluctuations with rise times faster than that characteristic of a syllable, which is about 33 ms, will be removed from the power envelope.

Determining the power in any steady-state signals 202 in the sound field (FIG. 2) includes determining the long-term average power of the sound field. The long-term average power (referred to in this application as the "accommodation signal") may be determined by integrating the power envelope over a time period equal to the rise time of the sound event type that is being detected. The accommodation signal may then be gradually subtracted from the power envelope 204 whenever a fluctuation in the power envelope reaches its maximum value (at the end of the rise time typical of the sound event type that is being detected). The accommodation signal may be subtracted at a rate equal to the accommodation rate of the human hearing mechanism (which is about 300 ms) to model the way in which the human hearing mechanism gradually ignores the effects of steady-state sounds in the presence of sound events. In order to control the accommodation, at all times the accommodation signal is forced to be less than or equal to the power envelope when the power envelope drops below the accommodation voltage. Therefore, when the sound event ends, causing the power envelope to drop rapidly, the accommodation signal will be forced to equal the power envelope. The result of subtracting the accommodation signal from the power envelope is a "differential signal." This differential signal includes positive pulses and other fluctuations. Each pulse in the differential signal indicates the occurrence of a sound event and the other fluctuations are caused by noise such as: reverberation, Gaussian noise, and other signals that may not currently be in the foreground stream.

Figure 3:
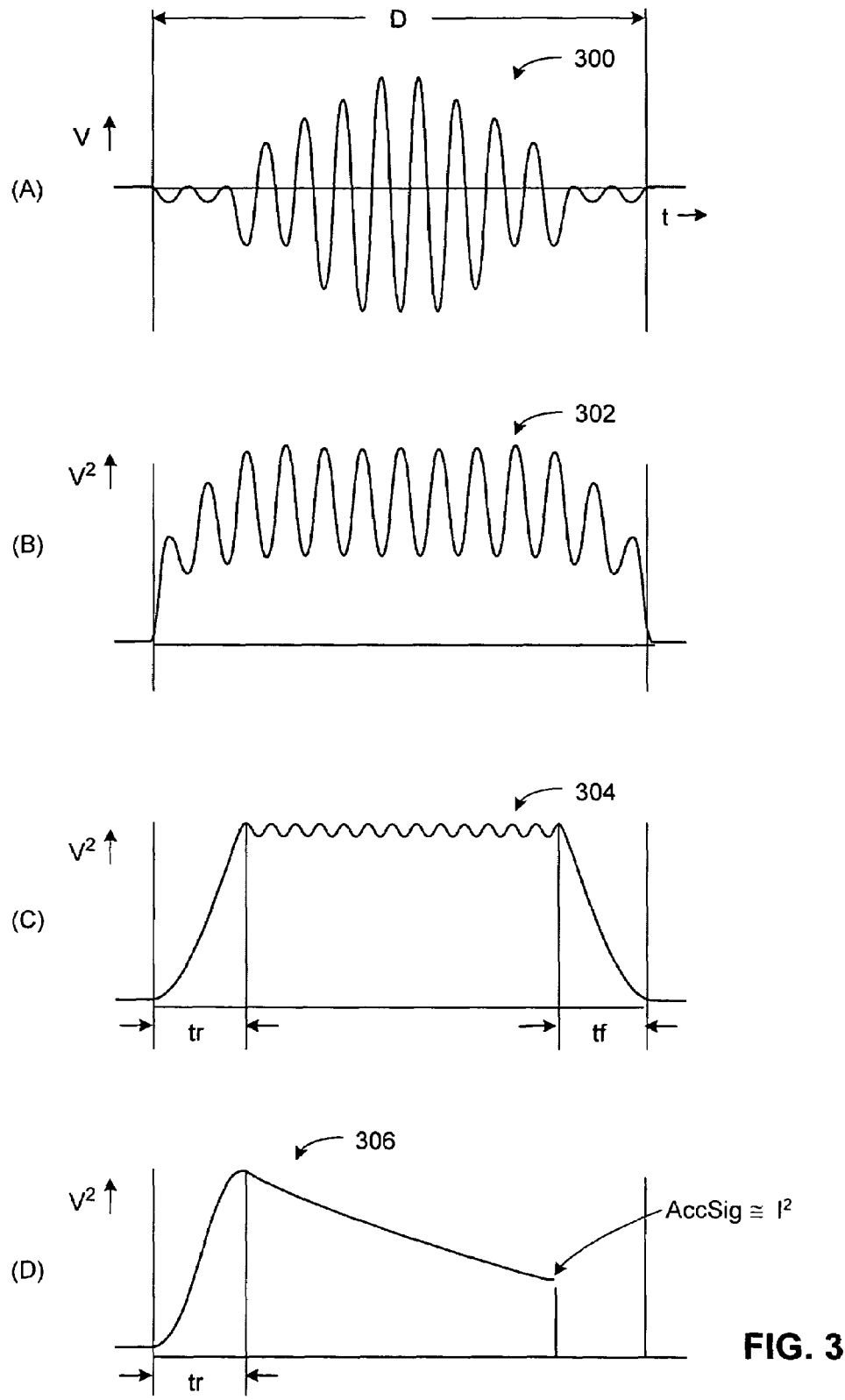
FIG. 3 is a series of time-domain plots of a sample segment of a sound field before, during and after the onsets of transients have been distinguished and the transients have been separated from background sounds.

An example of how the accommodation method affects a signal in an input channel (an "input signal") is shown in FIG. 3. The time-domain plot A in FIG. 3 shows a sample segment of a sound field. This segment includes a collection of sound waves of varying frequencies that is characteristic of a syllable 300. The magnitude of this syllable is the voltage in the signal "V." The voltage V varies with time "t" and has a duration of "D." The time-domain plot B shows a pulse 302, which is segment 300 after it has been converted into a power signal (step 201 in FIG. 2). Pulse 302 has an amplitude that represents the power in the signal ("$V^2$") and also has duration D. The time-domain plot C shows pulse 304, which is pulse 302 after the fluctuations with rise times that are not characteristic of a syllable have been removed. The pulse 304 also has an amplitude $V^2$ and has a rise time "$t_r$," where $t_r$ is equal to about 33 ms. The time-domain plot D shows a pulse 306, which is pulse 304 after the steady-state sounds have been accommodated to by subtracting the accommodation signal (the differential signal). The rise-time of pulse 306 follows that of pulse 304. However, after the syllable has reached its maximum value (after $t_r$) the effects of any simultaneously-occurring steady-state signals are removed from pulse 306 at a rate that is equal to the accommodation rate of the human hearing mechanism (about 300 ms). When the sound event ends, the power envelope $V^2$ (pulse 304) decreases rapidly. At the point where $V^2$ is about to become less than the accommodation signal "AccSig," A ccSig is forced to about equal $V^2$ until the end of the sound event. This causes the differential signal to go to zero.

Figure 4:
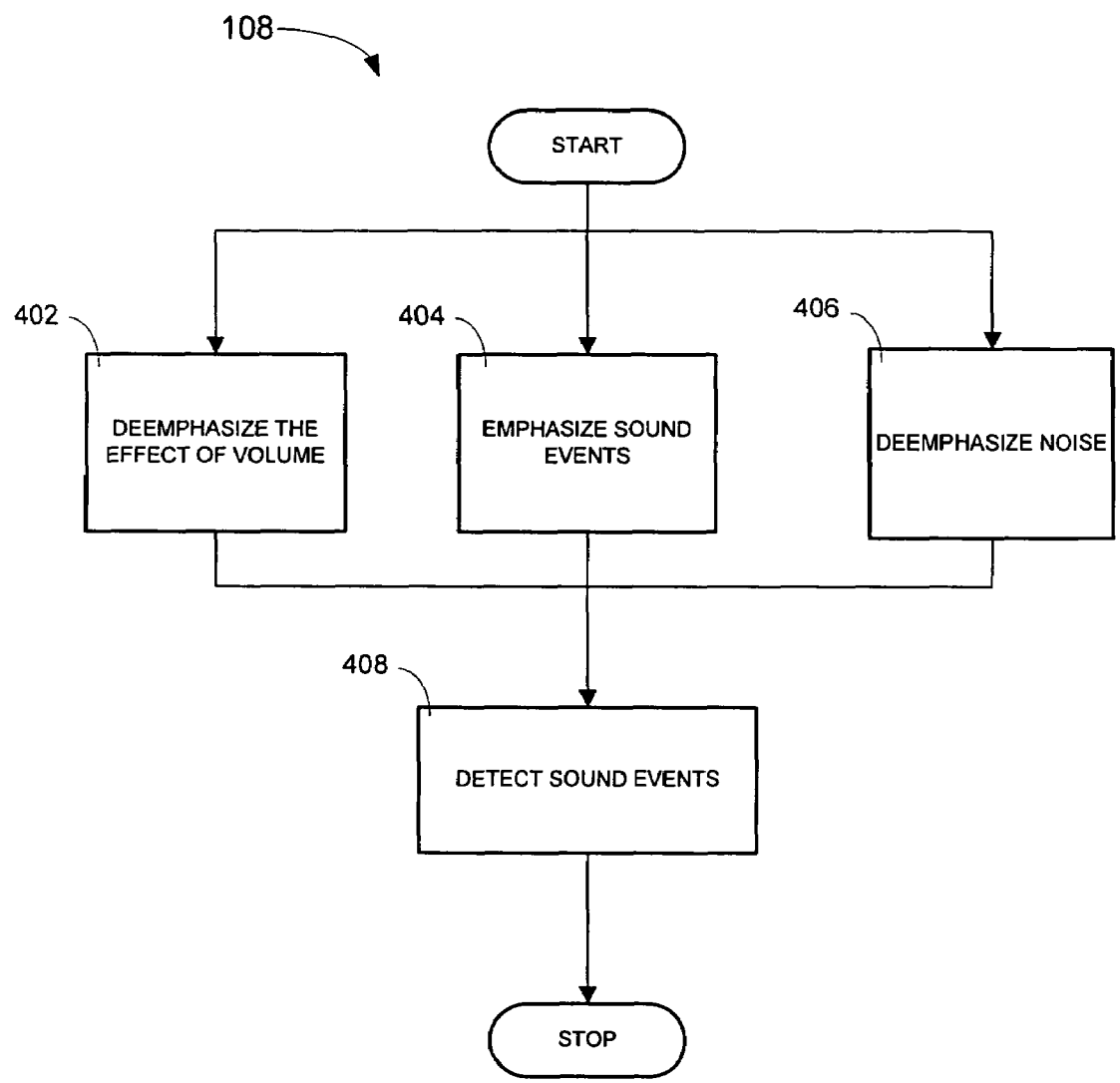
FIG. 4 is a flow chart of a beginning detection method for a single input channel.

Referring again to FIG. 1, once the sound events have been separated from the background sounds by modeling accommodation 106, the sound events are detected by modeling beginning detection 108. Modeling beginning detection includes distinguishing the sound events from the noise present in the differential signal. As previously discussed, the differential signal includes a series of rapidly-rising pulses and noise. While each pulse indicates the occurrence of a sound event, the noise includes fluctuations that may falsely indicate the occurrence of a sound event. Therefore, in order to detect the sound events, the sound events need to be distinguished from the noise. Modeling beginning detection 108 is shown in more detail in FIG. 4 and includes deemphasizing the effects of volume; emphasizing the sound events 404; deemphasizing the noise 406; and detecting the sound events 408.

One way in which steps 404, 406 and 408 can be simultaneously accomplished is by scaling the differential signal by the short-term average power contained in the noise component of the differential signal (the "short-term average high frequency power"). Using techniques generally involved in automatic gain control (an "automatic gain method"), the short-term average high frequency power is isolated and used to divide the differential signal. The short-term average high frequency power can be isolated by filtering the differential signal to obtain the component of the differential signal with frequencies higher than those characteristic of the sound event type being detected, and integrating the high-frequency portion over a short time period. This short time period may be different for different types of music or speech rates. However, a value of about 160 ms was experimentally determined to work well for a wide variety of inputs.

Normalizing the differential signal by using an automatic gain method has two effects, one obvious and two not-so-obvious. The first effect is to deemphasize the effect volume has on the differential signal 402 by normalizing the differential signal with regard to the amplitude (which represents power) of the fluctuations in the differential signal. Because louder sound events and noise generally contain more power, the louder sound events and noise will be scaled more strongly that those that are not as loud. This is the normal function of an automatic gain control method.

A second effect is to de-emphasize noise 406 by de-emphasizing the fluctuations that occur more often than is characteristic of the sound event type being detected (for example, syllables generally occur or repeat once about every 200 ms). The fluctuations in portions of the differential signal due to noise generally occur more frequently than is typical for a sound event. The rapid repeat rate of these noise fluctuations increases the average high-frequency power with which that portion of the differential signal is divided. This de-emphasizes the portion of the differential signal that contains the noise. The third effect of normalizing the differential signal is to emphasize the sound events 404 by emphasizing the fluctuations that occur or repeat no more often than is characteristic of the sound event type being detected. The portions of the differential signal that contain fluctuations that occur as often or less often than is typical for the sound event type being detected will have a lower average high frequency power (as compared to those containing noise) with which that portion of the differential signal is divided. This will provide a relative emphasis to the sound events.

De-emphasizing noise 406 may be further accomplished by removing many of the fluctuations in the differential signal due to noise. Some of the fluctuations due to noise can be identified and removed according to their rise time and other characteristics. For example, fluctuations that have rise-times not characteristic of the sound event type being detected are removed. For example, if the sound event type being detected is syllables, fluctuations with rise times faster than about 33 ms will be removed. In another example, if the sound event type being detected is impulsive sounds, fluctuations with rise times faster than about 3.3 ms will be removed. Additionally, low amplitude transients that occur more frequently than is characteristic of sound events such as, some noise and reverberation, can also be filtered out. Furthermore, because it can be assumed that whenever the power level of the sound field has dropped more than about 10 dB from that of a previous sound event, any transient simultaneously detected is noise or some other non-directional transient, transients occurring under such conditions can also be removed. As a result of steps 402, 404 and 406, many of the fluctuations in the differential signal are removed to create an improved differential signal that includes pulses each indicating the occurrence of a sound event. However, some noise may remain.

Therefore, to produce a trigger signal that only includes pulses indicating the occurrence of sound events, the sound events need to be detected 408 from the noise. Because at this point, most of the fluctuations in the improved differential signal due to noise have a low amplitude as compared with the fluctuations caused by the sound events, the sound events are detected 408 by determining which fluctuations have an amplitude that exceeds a threshold using a threshold detection method. In the threshold detection method, the fluctuations that do not exceed the threshold are removed or ignored to produce the trigger signal. One advantage of this method is that the triggering need not be ideal. The sound event detection methods are not perfect in that in some sound events will not be detected, and some fluctuations due to noise will result in a pulse in the trigger signal falsely indicating the occurrence of a sound event. However, these occasional errors do not matter. Because the sound event detection methods are modeled after the human hearing mechanism, they produce the same types of errors as does the human hearing mechanism. Therefore, the result will be perceived as completely natural.

The threshold is chosen so that low amplitude fluctuations that are characteristic of noise or reverberation are not detected. The threshold may be a fixed value which is determined experimentally. However, more accurate results are obtained if the threshold varies as a function of the sound field. For example, when the sound field includes many sound events, the threshold will generally be lower than when the sound field includes fewer sound events. This allows greater sensitivity when a greater number of sound events are present in the sound field.

Alternatively, the threshold can be manually selected from among two or more values experimentally determined according to the characteristics of the sound field. For example, if the sound field is that of modern or popular music, which typically includes many sound events, a lower threshold value can be selected, and alternatively, if the sound field is that of classical music, which typically includes few sound events and may be highly reverberant, a higher threshold value can be selected. Alternatively, the threshold value can be chosen as a function of the number of sound events detected during a given time period. Therefore, during time periods in which fewer sound events are detected, the threshold value is raised and during time periods in which a greater number of sound events are detected, the threshold value is lowered. This provides an automatic and continuous adjustment of the threshold value as a function of the sound field and results in a more accurate trigger signal.

Any of the sound event detection methods may also include performing only the beginning detection method, which is of particular use when detecting sound events of short duration ("short-duration sound events"), such as impulsive sounds. Short-duration sound events, such as impulsive sounds, tend to end before the effects of accommodation can be sensed. Therefore, the sound event detection methods can be simplified to include performing only the beginning detection method on the input signal or the input signal after the directionally important frequencies have been emphasized (in decibels) directly. The sound event detection methods that include performing only the beginning detection method (the "sound event detection methods for short-duration sound events") may also include removing any fluctuations with rise-times slower than those characteristic of the short-duration sound event being detected before performing the beginning detection method. For example, if impulsive sounds are being detected, fluctuations in the input signal with rise times slower than about 3 ms will be removed.

Methods for detecting a single sound event type in the presence of a background signal may also be implemented when the sound field is generated in two or more input channels ("sound event detection methods for multiple input channels and a single sound event type"). The sound event detection methods for multiple input channels and a single sound event type may include performing the sound event detection method for a single input channel and a single sound event type in parallel for each input channel to produce a trigger signal for each input channel indicating the occurrence of whatever sound event type is being detected.

Alternatively, a sound event detection method for multiple input channels and a single sound event may include detecting sound events in channel pairs, instead of in each channel separately. Generally, this includes subtracting the differential signal in one channel of the channel pair from the differential signal in the other channel of the channel pair to create a "difference signal," which is then used to create the trigger signal. Often the difference signal is created by subtracting the differential signal of one input channel in an input channel pair from that of the other input channel in the input channel pair. For example, the input channel pairs may include a left-right channel pair and/or a center-surround input channel pair. Throughout this application, the term "input channel pair" includes any combination of two input channels and the channels that can be derived from the input channels. The purpose of using more than one input channel to derive trigger signals is to provide a focus on directional signals. For example, in electronically recorded music and speech, directional signals can be differentiated from non-directional signals by the phase and amplitude relationships between the input channels. For example, sound fields are often generated in two input channels (ordinary stereo). From these two input channels, it is useful to derive four power envelopes and to organize the four power envelopes into two power envelope pairs. For example, if the original two input channels are designated with the conventional "left" and "right" names, the resulting power envelopes can be designated "left power" and "right power," respectively, and together make up a power envelope pair. The remaining power envelope pair is made up of power envelopes derived from the sum and the difference of the two input channels, the "left plus right power" and "left minus right power." This pair is often also referred to as "center power" or the "surround power." Non-directional signals almost always will cause all four of these power envelopes to be equal in level. A non-directional transient signal will cause all four of them to rise at the same time. When the difference signal is used to create the trigger signal, a non-directional transient will cause no rise in the difference signal, because the differential signal is equal in each input channel. By contrast, a directional signal, for example a sound event in the left input channel only, will cause a large change in the left power envelope, and no corresponding increase in the right power envelope. Therefore, there will be a large increase in the difference signal created from the left and right differential signals, and this change can be used to generate triggers that preferentially distinguish directional signals from non-directional signals.

Figure 5:
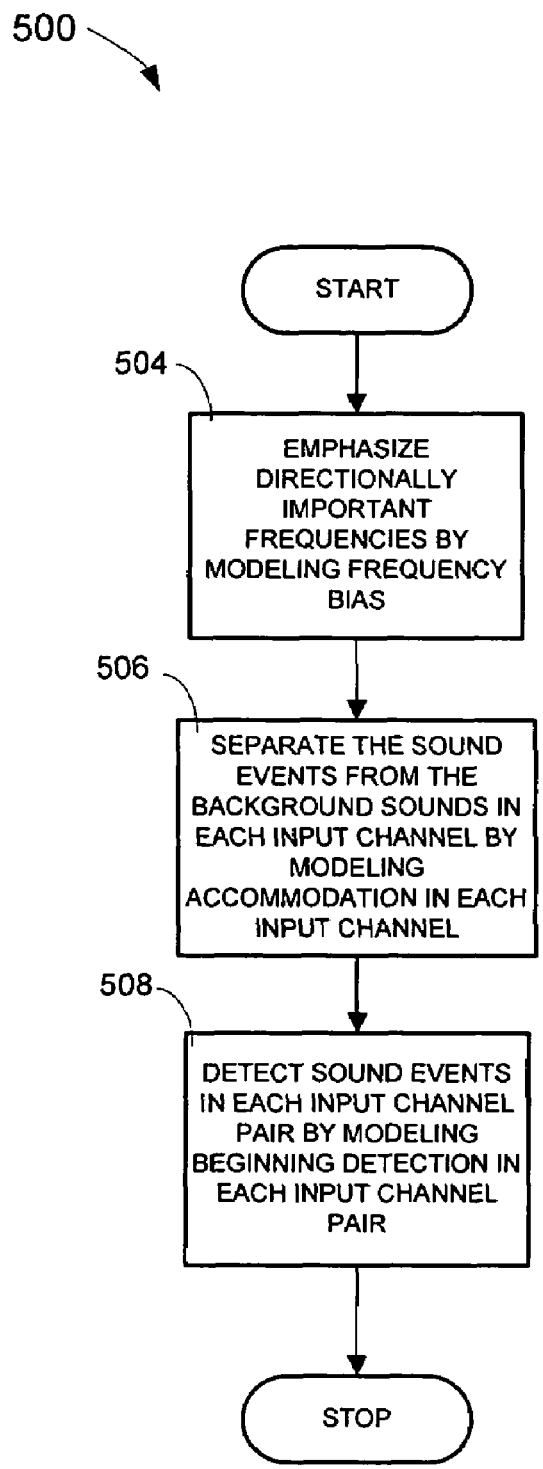
FIG. 5 is a flow chart of a sound event detection method for multiple input channels.

An example of a sound event detection method for multiple input channels and a single sound event 500 that includes detecting sound events in pairs of channels is shown in FIG. 5 and includes: emphasizing the directionally important frequencies by modeling frequency bias 504; separating the sound events from the background sounds by modeling accommodation in each input channel 506; and detecting sound events in each input channel pair by modeling beginning detection in each input channel pair. The directionally important frequencies are emphasized 504 using a frequency emphasis method. Then, the sound events are separated from the background signal in each input channel 506 using an accommodation method to produce a differential signal for each input channel. Subsequently, the sound events are detected in each input channel pair 508 using an alternate beginning detection method in parallel for each input channel pair in and the differential signals for each channel pair.

Figure 6:
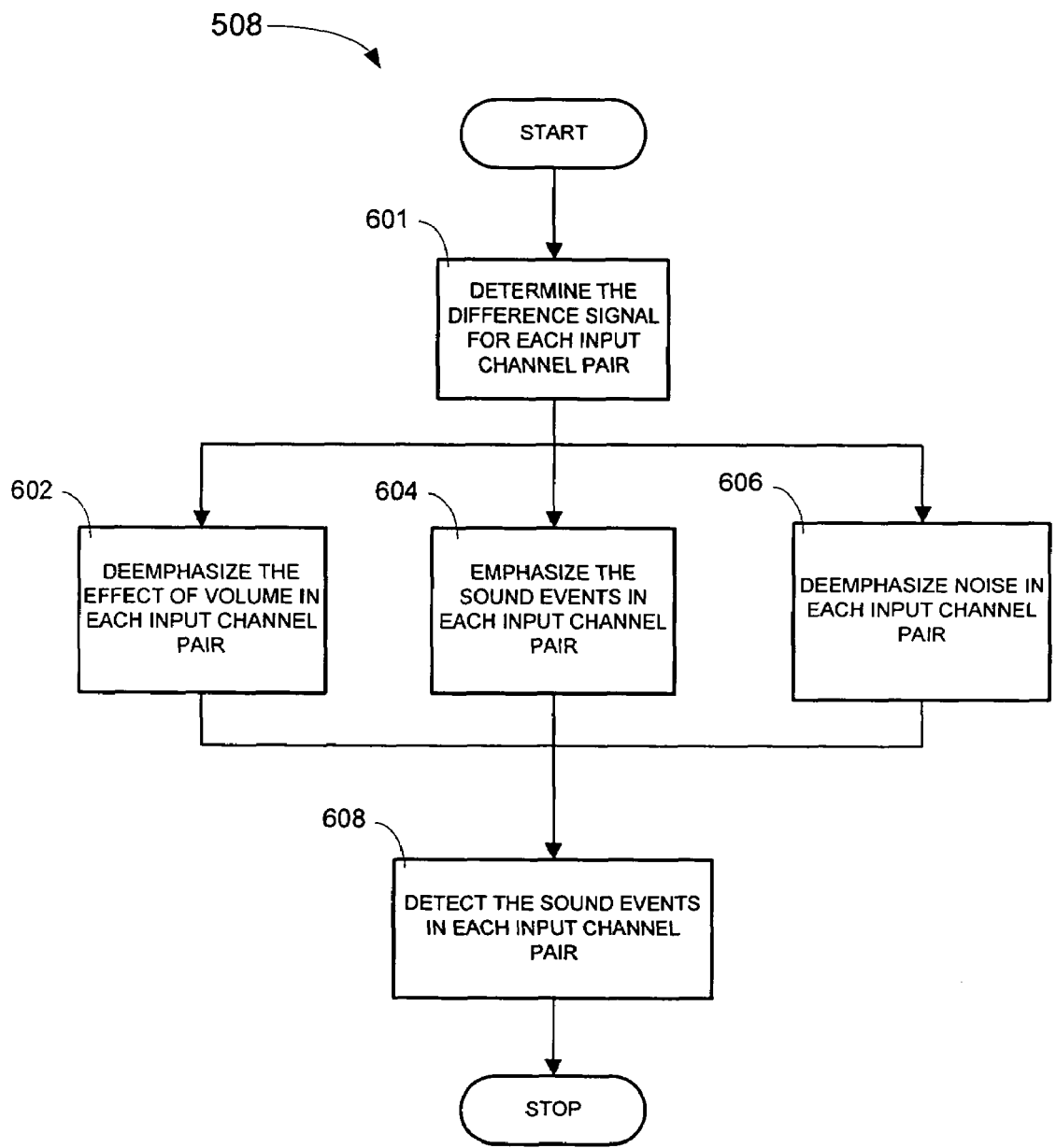
FIG. 6 is a flow chart of a beginning detection method for multiple input channels.

An alternate beginning detection method is shown in more detail in FIG. 6 and may include, determining the difference signal for each input channel pair 601; deemphasizing the effects of volume in each input channel pair 602; emphasizing sound events in each input channel pair 604; deemphasizing noise in each input channel pair 606; and detecting sound events in each input channel pair 608. Therefore, the sound event detection method for multiple input channels may include the same steps as the sound event detection method but is performed on the difference signal of each input channel pair.

A difference signal is determined 601 by determining the difference between the differential signals in each input channel of an input channel pair, and rectifying this difference. The difference between the input channels in the input channel pair includes both positive and negative pulses representing sound events that have occurred in either input channel of the input channel pair. A pulse will be negative or positive depending upon which input channel in the input channel pair reflects the majority of the power in the particular sound event. Therefore, this difference is rectified to produce a difference signal with only positive pulses. While the difference signal still indicates sound events, as previously discussed, it does not indicate sound events common to both input channels. Therefore, the difference signal has a better signal to noise ratio then that of the differential signals of the individual input channels. Furthermore, the difference signal does not contain any signals that are equal in both input channels of the input channel pair, which helps to elimination certain non-directional signals, such as noise, which are generally equal in all input channels. Once the difference signal has been determined for each input channel pair 601, the effects of volume on the difference signal are de-emphasized 602, sound events are emphasized 604, and noise is de-emphasized in the difference signal 606 using an automatic gain method to produce a series of pulses indicating the presence of any remaining transients. Subsequently, the sound events may be detected in each input channel 608 by determining which of the pulses are greater than a given threshold. Generally, steps 602, 604 and 608 include a rectification step so that the pulses indicating the remaining transients are all positive. The result of step 608 is a trigger signal with positive pulses indicating the occurrence of sound events for every input channel pair. This sound event detection method may be implemented for multiple input channel pairs by performing the method in parallel for each input channel pair to create a separate trigger signal for each input channel pair.

The sound event detection methods for multiple channels and a single sound event type may also include detecting a sound event type in multiple channel pairs (collectively, "sound event detection methods for multiple channel pairs and a single sound event type"). These methods generally include the sound event detection methods for multiple channels and a single sound event type, which may include an alternate beginning detection method implemented for more than one channel pair, or for a single channel pair from which four power envelopes can be derived.

Figure 7:
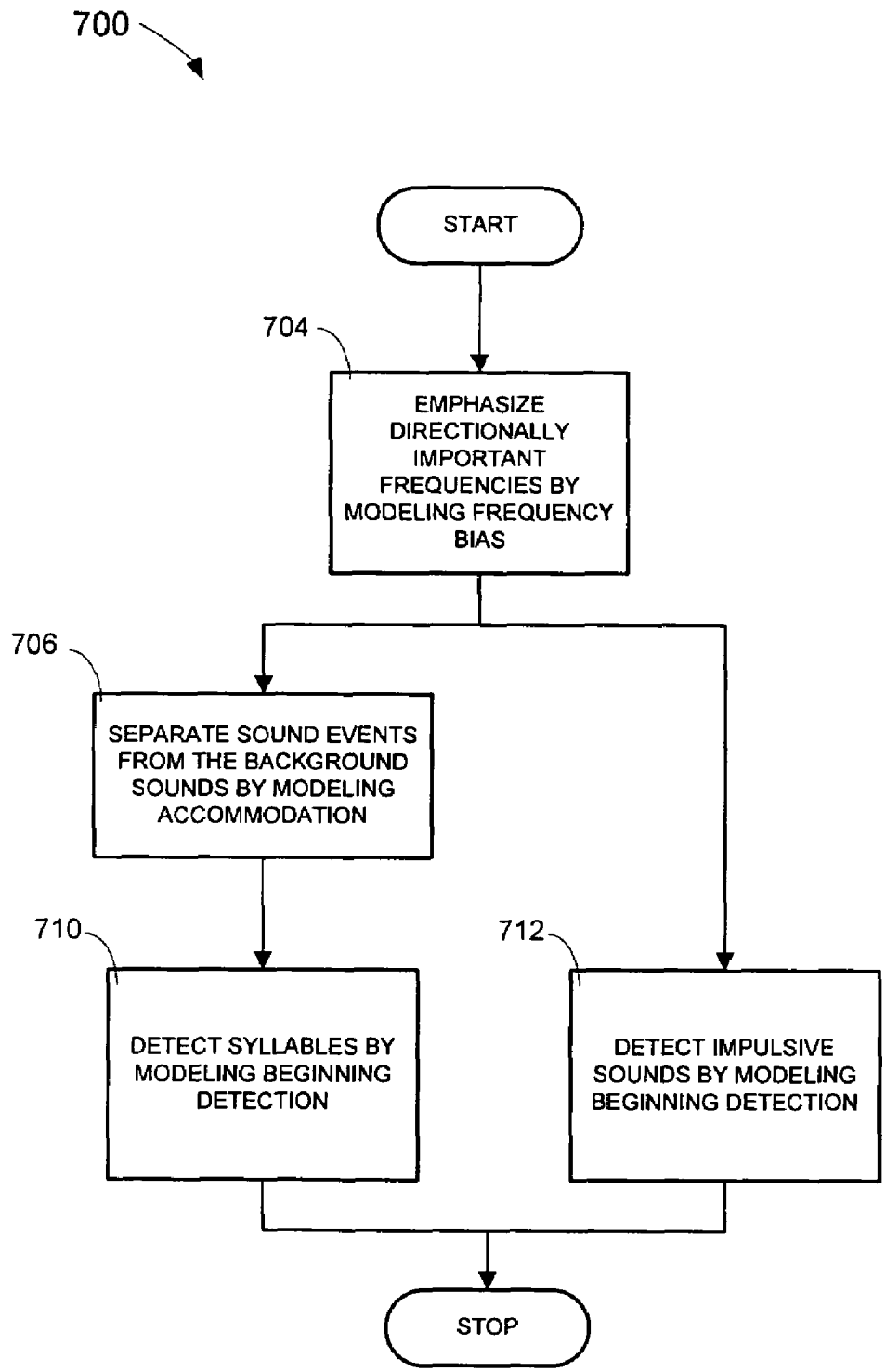
FIG. 7 is a flow chart of a sound event detection method for a single input channel and multiple sound event types.

Methods for detecting one or more sound events in the presence of a background signal may also be implemented so that multiple sound event types, such as syllables and impulsive sounds, are detected in a single input channel ("sound event detection methods for a single input channel and multiple sound event types"). One example of a sound event detection method for a single input channel and multiple sound event types that detects both syllables and impulsive sounds is shown in FIG. 7 (although this method may be implemented to detect any number and combination of sound event types). The example of a sound event detection method for a single input channel and multiple sound event 700 shown in FIG. 7, basically includes: emphasizing the directionally important frequencies by modeling frequency bias 704; separating sound events from the background sounds by modeling accommodation 706; detecting syllables by modeling beginning detection 710; and detecting impulsive sounds by modeling beginning detection 712. It is important to understand that syllables and impulsive sounds may often occur simultaneously.

The directionally important frequencies are emphasized 704 using a frequency bias method. Then, the sound events are separated from the background signal 706 using an accommodation method to produce a differential signal. To improve the results, the accommodation method may also include removing fluctuations in the power envelope with rise times that not characteristic of syllables (those above about 33 ms). Subsequently, syllables are detected 710 from the differential signal using a beginning detection method for single input channel (see FIG. 4) and impulsive sounds are detected from the frequency emphasized input signal using a sound event detection method for short-duration sound events. As describe in connection with FIG. 4, detecting sound events includes deemphasizing the effects of volume, emphasizing sound events and deemphasizing noise using an automatic gain method and by removing certain fluctuations, and detecting sound events using a threshold detection method. However, in this case, when detecting syllables 710, the short-term high frequency power used to normalize the differential signal is the power in the components of the differential signal above about 30 Hz determined over about 167 ms. Additionally, the fluctuations removed are those with a rise time of less than about 33 ms. Conversely, in these cases, when detecting impulsive sounds, the sound event detection method for a single short-duration sound event includes: removing certain fluctuations; deemphasizing the effects of volume, emphasizing sound events and deemphasizing noise using an automatic gain method and removing certain fluctuations, and detecting sound events using a threshold detection method. However, when detecting impulsive sounds, the automatic gain method uses the input signal (in decibels) instead of the differential signal. Further, the fluctuations that are removed are those with rise times less than about 3 ms.

Figure 8:
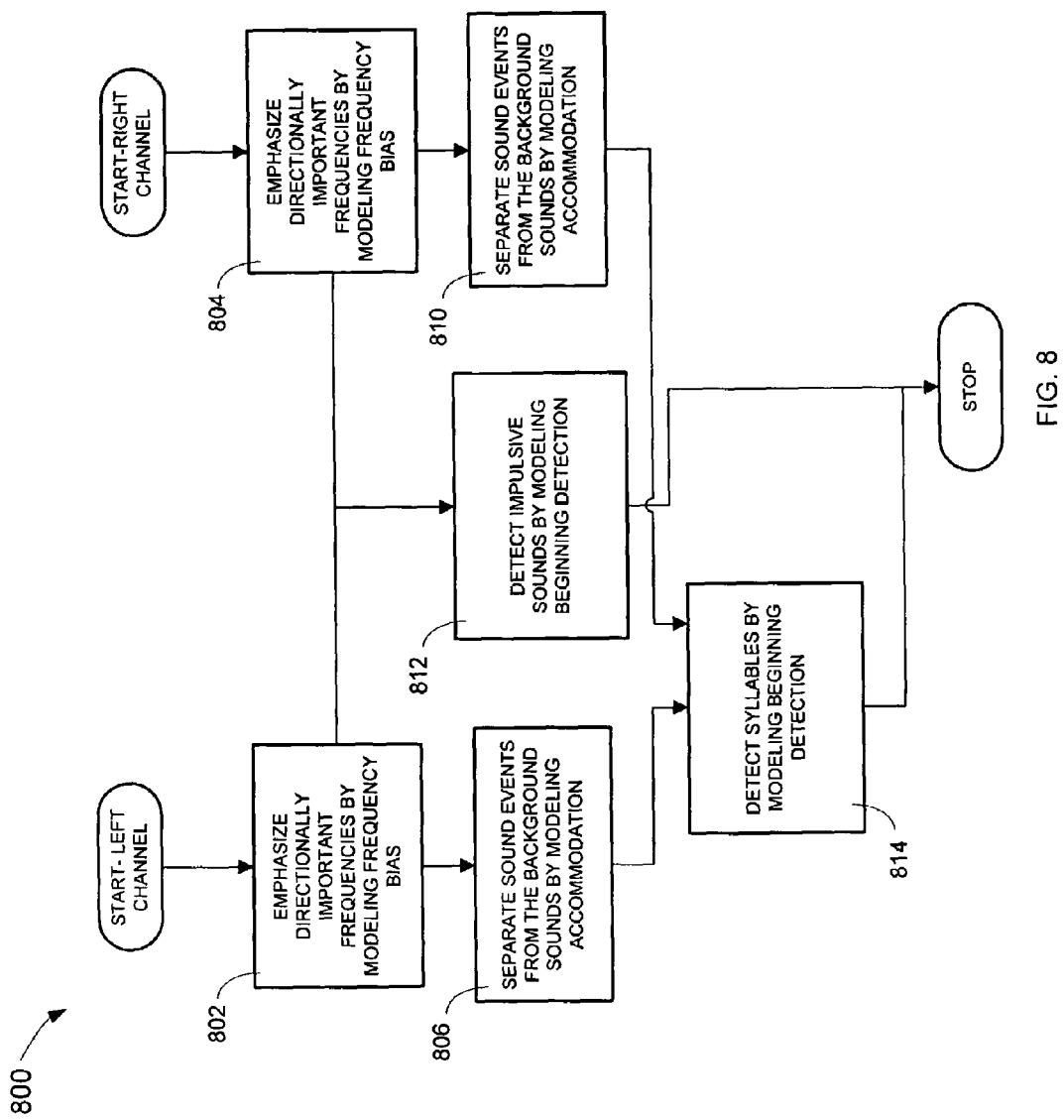
FIG. 8 is a flow chart of a sound event detection method for multiple input channels and multiple sound event types.

Methods for detecting one or more sound events in the presence of a background signal may also be implemented so that multiple types of sound events may be detected for a sound field generated in multiple input channels ("sound event detection methods for multiple input channels and multiple sound events"). The sound event detection method for multiple input channels and multiple sound events includes performing the sound event detection method for a single input channel and multiple sound event types implemented in parallel for each input channel of the sound field to produce a trigger signal for each sound event type in each input channel. Alternatively, as shown in FIG. 8, the sound event detection method for multiple input channels and multiple sound events 800 may detect each sound event only in each input channel pair, thus producing a trigger signal for each sound event type in each input channel pair. In the example shown in FIG. 8, this method 800 is used to detect two sound event types (syllables and impulsive sounds) in two input channels (a right input channel and a left input channel) to produce two trigger signals for the input channel pair, the first indicating the occurrence of syllables and the second indicating the occurrence of impulsive sounds. However, the method may be implemented to detect any number of sound events in any number of input channels to produce for each input channel pair a trigger signal for each sound event type. The sound event detection method for multiple input channels and multiple sound event types 800 generally includes: emphasizing directionally important frequencies by modeling the frequency bias in the left input channel 802; emphasizing directionally important frequencies by modeling the frequency bias in the right input channel 804; separating sound events from the background sounds by modeling accommodation in the left input channel 806; separating sound events from the background sounds by modeling accommodation in the left input channel 808; detecting impulsive sounds in the left-right input channel pair by modeling beginning detection 812; and detecting syllables in the left-right input channel pair by modeling beginning detection 814.

Directionally important frequencies are emphasized separately in both the left and right input channels 802 and 804, respectively, using a frequency bias method. Subsequently, sound events are separated from the background sounds using an accommodation method in both the left and right input channels 806 and 810, respectively, to produce a differential signal for the left and right input channels, respectively. The differential signals from both channels are then used to detect syllables by modeling beginning detection 814. Syllables may be detected using a beginning detection method to separately detect syllables in each input channel to produce a trigger signal indicating the occurrence of syllables in each channel. Alternatively, syllables may be detected using an alternate beginning detection method to produce a single trigger signal indicating the occurrence of syllables for the channel pair. To detect impulsive sounds by modeling beginning detection 812, a sound event detection method for a single channel and a short-duration sound event, which may produce a trigger signal from the frequency enhanced input signal, is used to produce a trigger signal indicating the occurrence of an impulsive sound for each input channel. In this, as in all the sound event detection methods, the trigger signals may be combined to create fewer trigger signals.

The sound event detection methods for multiple channels and multiple sound event types may also include detecting more than one sound event type in multiple channel pairs (collectively, "sound event detection methods for multiple channel pairs and multiple sound event types") These methods generally include the sound event detection methods for multiple channels and multiple sound event types, which may include an alternate beginning detection method, implemented for more than one channel pair, or for a single channel pair from which four power envelopes can be derived.

2. Methods for Detecting and Localizing Sound Events

The properties of the human hearing mechanism have also been used to create methods for determining the location of sound events that occur in the presence of a background signal (collectively "sound event detection and localization methods"). As previously discussed, the sound event detection methods for multiple input channels not only produce a trigger signal indicating whenever a sound event occurs, but also produce differential signals from which the direction of a sound event can be determined. Sound event detection and localization methods use these differential signals to determine the direction of a sound event by comparing the relative power of the sound event in each input channel of each input channel pair after any steady-state sounds have been removed. By comparing the power in each input channel of an input channel pair, instead of the voltage as done in known methods, individual sound events can be identified and separately localized. The sound event detection and localization methods can be implemented to detect and localize any number and combination of sound events types in a sound field generated in any number of input channel pairs. In the following description, the sound event detection and localization methods are discussed in order of increasing complexity, with each subsequent sound event detection and localization method incorporating the steps of the prior methods, except as indicated.

Figure 9:
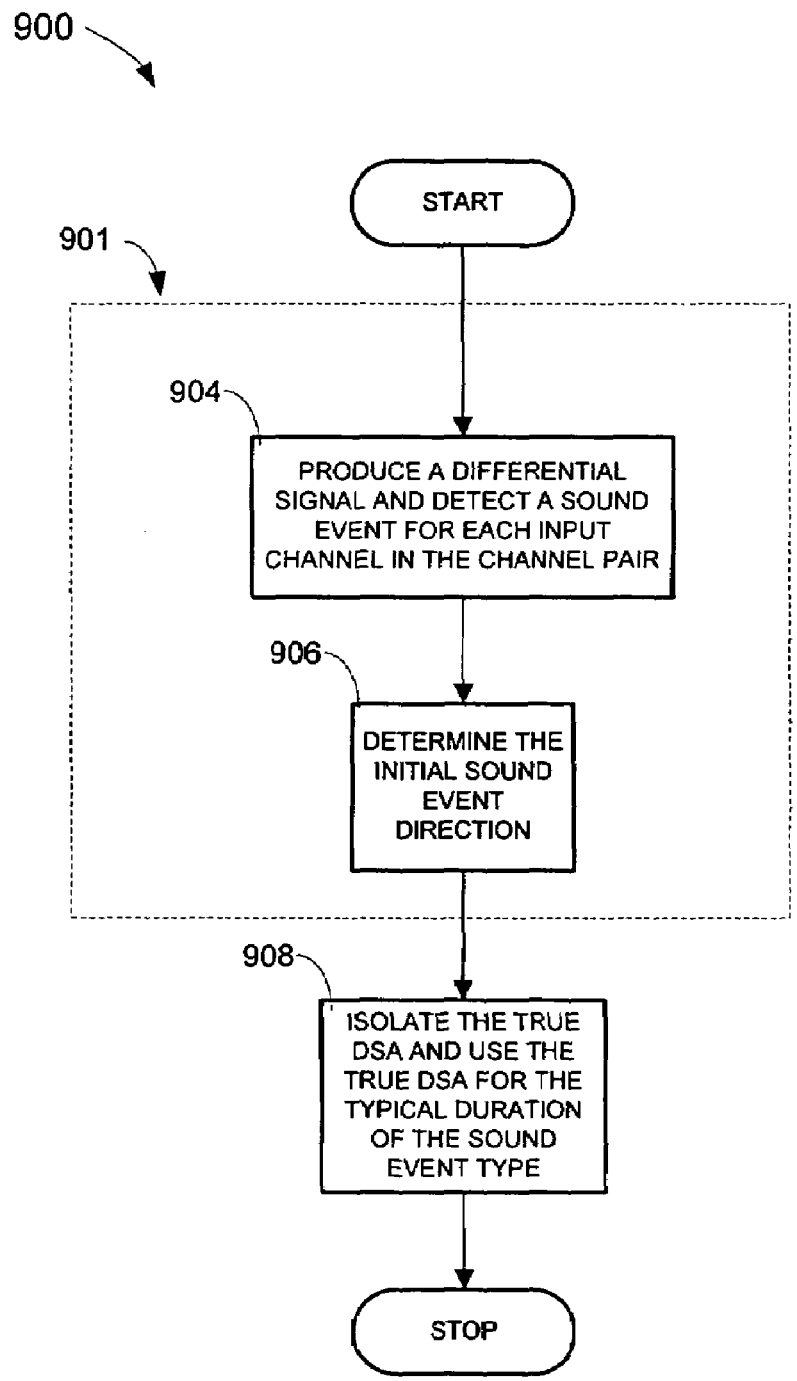
FIG. 9 is a flow chart of a sound event detection and localization method for a single input channel pair and a single sound event type.

A sound event detection and localization method for a single input channel pair and a single sound event type is shown in FIG. 9. This sound event detection and localization method for a single input channel pair and a single sound event type 900 detects a single sound event type and locates sound events relative to a single input channel pair. The location of a sound event as determined by this method 900 is given in terms of an angle between the input channels in the input channel pair (referred to in this application as a "true differential steering angle" or "true DSA"). The sound event detection and localization method 900 generally includes: producing a differential signal and detecting a sound event in an input channel pair for each input channel in the input channel pair 904; determining the initial sound event direction (the DSA) 906; and isolating the true DSA and using the true DSA for the typical duration of the sound event type 908. Collectively, 904 and 906 define a DSA determination method for a single input channel pair and a single sound event type 901.

A differential signal is produced for each input channel of the input channel pair and sound events are detected in the input channel pair 904 using a sound event detection method for a single input channel pair and a single sound event type or a sound event detection method for a single input channel pair and a single short-duration sound event as appropriate for the sound event type being detected. As a result, a trigger signal indicating the occurrence of a single sound event type is produced for the input channel pair and a differential signal is produced for each input channel in the input channel pair. When a sound event is detected 904 in the input channel pair, as indicated by the trigger signal, the initial direction of that sound event is determined 906 using an initial direction determination method. The initial direction determination method determines the direction of the sound event from the differential signal for each input channel in the input channel pair as the differential signals exist when the sound event occurs. More specifically, when the trigger signal indicates that a sound event is occurring, the differential signals for each input channel are converted into decibels to create a decibel differential signal for each input channel. The decibel differential signal for one input channel is then subtracted from the decibel differential signal from the other input channel to create a decibel ratio. This decibel ratio is converted into an equivalent angle using known methods to create a "differential steering angle" or "DSA," which indicates the location of the sound event between the input channels in the input channel pair.

Isolating the true DSA and using that DSA for the typical duration of the sound event type being detected 908 includes determining the DSA during the rise-time of the sound event. For example, if syllables are being detected, the true direction of any syllables detected is obtained by isolating the DSA indicated in about the first 20 ms to about the first 30 ms of the syllable, which is then used (held) for about 200 ms. In another example, if impulsive sounds are being detected, the true direction of any impulsive sounds is obtained by isolating the DSA indicated in about the first 3.3 ms to about 5 ms of the impulsive sound, which is then used for about 50 ms. However, in short-duration sound events, such as impulsive sounds, the initial direction determination method may be implemented to obtain an even more accurate initial direction. This initial direction determination method detects all triggers that occur in a very short segment of the trigger signal (generally, about 3 ms) determines the DSAs associated with those pulses, determines the short-time average of these DSAs and uses the short-time average DSA to indicate the direction of all the short-term sound events detected in the very short segment for the typical duration of the short-duration sound event type being detected. For example, if impulsive sounds are being detected, the short-time average is then used for the next about 50 ms. The idea of using a time average over typical the rise-time of a sound event type as a measure of its direction also works with sounds that have longer durations, but it is useful to use a longer time period for the averaging, as the rise time of these signals is frequently longer.

Sound event detection and localization methods may also be implemented to detect and localize a single sound event type in multiple input channel pairs ("sound event localization methods for multiple input channels pairs and a single sound event type"). For example, a typical surround sound system includes at least a left-right input channel pair and a center-surround input channel pair. In the sound event localization methods for multiple input channel pairs and a single sound event type, the true DSA for every channel pair is used whenever a trigger signal in any channel pair indicates that a sound event is occurring. In some cases, however, the DSAs are used to indicate the direction of the sound event only if the DSAs are accurate. If the DSAs are not accurate, the direction indicated by a true OSA is used.

Figure 10:
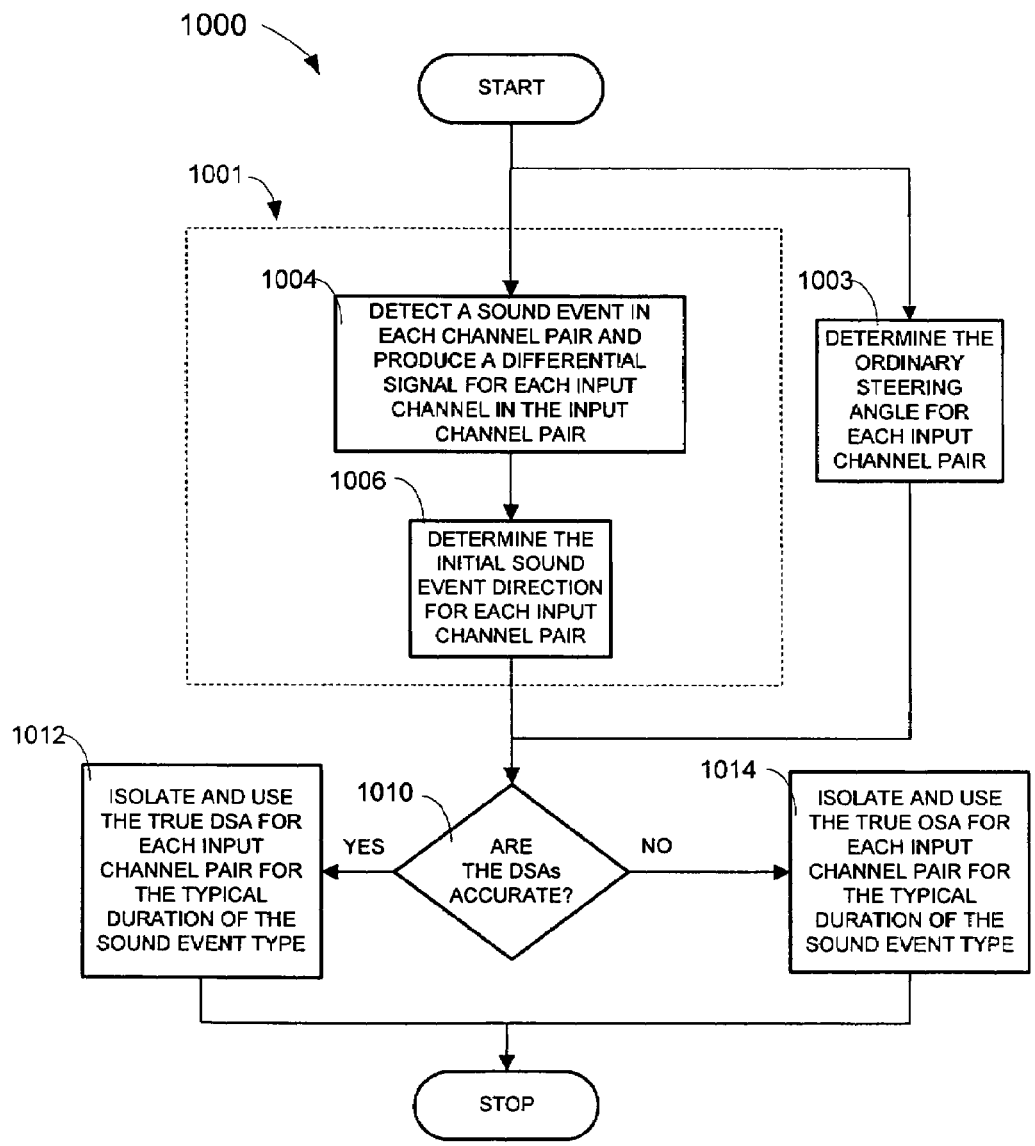
FIG. 10 is a flow chart of a sound event detection and localization method for multiple input channel pairs and a single sound event type.

An example of a sound event localization method for multiple input channel pairs and a single sound event type, is shown in FIG. 10, indicated by reference number 1000 and includes: performing a DSA determination method for a single input channel pair and a single sound event for each input channel pair (collectively a "DSA determination method for multiple input channel pairs a single sound event type") 1001; determining the ordinary steering angle for each input channel pair 1003; determining whether the DSAs are accurate 1010, where if the DSAs are not accurate, isolating and using the true OSA for each input channel pair for the typical duration of the sound event type being detected 1014; where, if the DSAs are accurate, isolating the true DSAs and using the true DSAs for the typical duration of the sound event type being detected 1012.

The DSA determination method for multiple channel pairs and a single sound event type 1001 includes: detecting a sound event in each input channel pair and producing a differential signal for each channel in each channel pair 1004; and determining the initial sound event direction for each input channel in each channel pair 1006. Detecting a sound event in each input channel pair and producing a differential signal for each channel in each channel pair 1004 includes performing a sound event detection method for a single channel pair and a single sound event type in parallel for each channel pair. Determining the initial sound event direction for each input channel pair 1006 includes performing determination method in parallel for each channel pair. Determining the OSA for each channel pair 1003 is generally accomplished using known methods.

Determining whether the DSAs are accurate includes determining, at the moment the trigger signal indicates that a sound event is occurring, whether a sound event begins in one channel just as a sound event ends in another channel using a "background signal check" and determining whether the values obtained for the DSAs are consistent with each other using a "consistency check." In general, when one input channel pair is derived from another input channel pair (for example, when the center-surround input channel pair is derived from the left-right input channel pair), the sound event detection and localization methods do not yield accurate results when a sound event occurs precisely at the moment that another sound event in a different direction ends. This is generally characterized by an about simultaneous drop of about 3 dB in the power envelopes of at least two of the input channels. Although signals of this type are not common in natural environments, they are common in many popular test signals used for sound equipment and are sometimes used in popular music. Therefore, the background signal check examines the power envelopes in each input channel and when at least two of them drop about simultaneously by about 3 dB, the DSA is considered to be inaccurate.

The consistency check determines whether the sum of the absolute values of the true sound event directions in the left-right input channel pair and the center-surround input channel pair is less than about 45 degrees. Therefore, a sum of less than 45 degrees indicates that the steady-state signal did remain constant and that the direction indicated by the true sound event direction is accurate. However, a sum of greater than or equal to about 45 degrees indicates that the steady-state signal did not remain constant and that the direction indicated by the true sound event direction is not accurate. Based on these determination, the consistency check and/or the background signal check produce a signal whenever the true sound event is found to be inaccurate, thus indicating an error (an "error signal").

If the DSAs are found to be accurate, the true DSAs are isolated and used for the typical duration of the sound event type being detected 1012. For example, if syllables are being detected, the DSAs are used for the typical duration of a syllable. In another example, if impulsive sounds are being detected, the DSAs are used for the typical duration of an impulsive sound. If however, the DSAs are not accurate, the true OSAs are isolated and used for the typical duration of the sound event type being detected 1014. The true OSAs are the OSA that occur during the typical rise-time of the sound event type being detected.

The sound event detection and localization methods for multiple channel pairs and a single sound event type may also include methods that reduce the occurrence of errors in the true direction of the sound events using an "accommodation adjustment method." The accommodation adjustment method uses the consistency check to adjust the degree of accommodation in the accommodation signal. As previously discussed, the accommodation signal represents the steady-state signals present in the sound field as they are gradually ignored (accommodated to) by the human hearing mechanism. The rate at which these steady-state signals are ignored is referred to as the "degree of accommodation," which is defined by the accommodation signal ("AccSig"). The accommodation adjustment method multiplies the accommodation signal AccSig by an adjustment factor Adj, so that AccSig is defined according to the following equation:

$$\text{AccSig} = \text{AccSig}(\text{Adj}) \quad (1)$$

where Adj is defined by the following equation:

$$Adj = 1 - \frac{\alpha}{50} \quad (2)$$

where $\alpha$ is the number of errors determined by the consistency check in a time period of about several seconds. The precise time period over which the number of errors is determined is relatively unimportant. The purpose of Adj is to reduce the degree of accommodation (the accommodation signal), therefore, causing any steady-state signals to be ignored at a slower rate. A reduced degree of accommodation results in fewer transients being detected, thus reducing the number of transients incorrectly located. It has been determined experimentally that if Adj is greater or equal to about 0.998, the number of errors indicated by the consistency check are reduced and usable results are still obtained by the sound event detection and localization methods for multiple input channel pairs. However, if Adj is about equal to or lower than 0.995, too many transients fail to be detected so that the sound event detection and localization methods for multiple input channel pairs do not yield usable results.

Alternatively, the sound event detection and localization methods for multiple input channels pairs and a single sound event type may use the number of errors to adjust the threshold as part of error threshold adjustment methods. An error threshold adjustment method determines the number of errors determined by the consistency check in a predetermined time period of about several seconds and uses this number to adjust the threshold. As the number of errors increases, the threshold is increased so that fewer sound events are detected. Therefore, a continuous adjustment to the threshold can be provided, which is in proportion to the number of errors detected by the consistency check.

Figure 11:
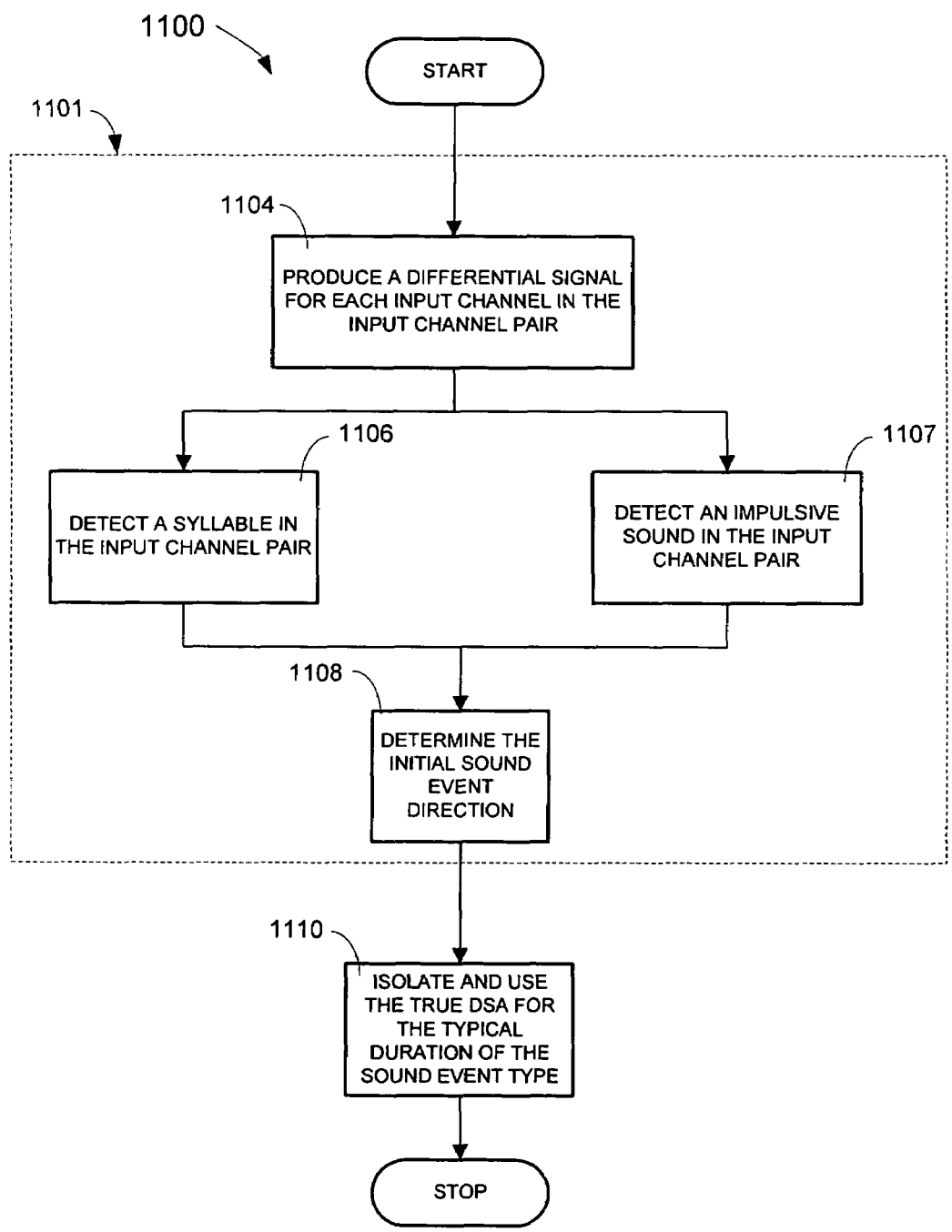
FIG. 11 is a flow chart of a sound event detection and localization method for a single input channel pair and multiple sound event types.

Sound event detection and localization methods may also be implemented to detect and localize multiple sound event types in a single input channel pair ("sound event localization methods for a single input channel pair and multiple sound event types"). FIG. 11 shows a sound event detection and localization method 1100 implemented to detect and localize two types of sound events (syllables, and impulsive sounds) to produce a DSA that indicates whenever they occur. However, this method may be implemented in a similar manner to detect and localize any number and types of sound events. The sound event detection and localization method for a single input channel pair and multiple sound event types 1100 generally includes: producing a differential signal for each input channel in the input channel pair 1104; detecting syllables in the input channel pair 1106; detecting impulsive sounds in the input channel pair 1107; determining the initial sound event direction 1108; and isolating the true DSA 1110 for the typical duration of the sound event type being detected. Collectively, steps 1104, 1106, 1107, and 1108 define a DSA determination method for a single input channel pair and multiple sound event type 1101.

Producing a differential signal for each channel in the channel pair 1104 includes performing an accommodation method for each input channel. Detecting syllables in the input channel pair 1106 includes performing a beginning detection method for a single channel pair and a single sound event type to produce a trigger signal indicating the occurrence of syllables in the channel pair. Detecting impulsive sounds in the input channel pair 1107 includes performing a sound event detection method for a single input channel and a single short-duration sound event in parallel for each channel in the channel pair (the resulting two trigger signals may be combined to form a single trigger signal indicating the occurrence of impulsive sounds in the channel pair).

The DSA is then determined 1108 at the moment any trigger signal indicates that a syllable or an impulsive sound is detected. At this moment, a DSA determination method is used to determine the DSA of the sound event detected using the differential signals of each input channel in the input channel pair. At the moment any trigger signal indicates that a sound event of either type is occurring, the true DSA is isolated 1110. The true DSA is then used for the typical duration of the sound event type that was detected. For example, if a syllable was detected, the true DSA will be used for the typical duration of a syllable. Conversely, if an impulsive sound was detected, the true DSA will be used for the typical duration of an impulsive sound.

Figure 12:
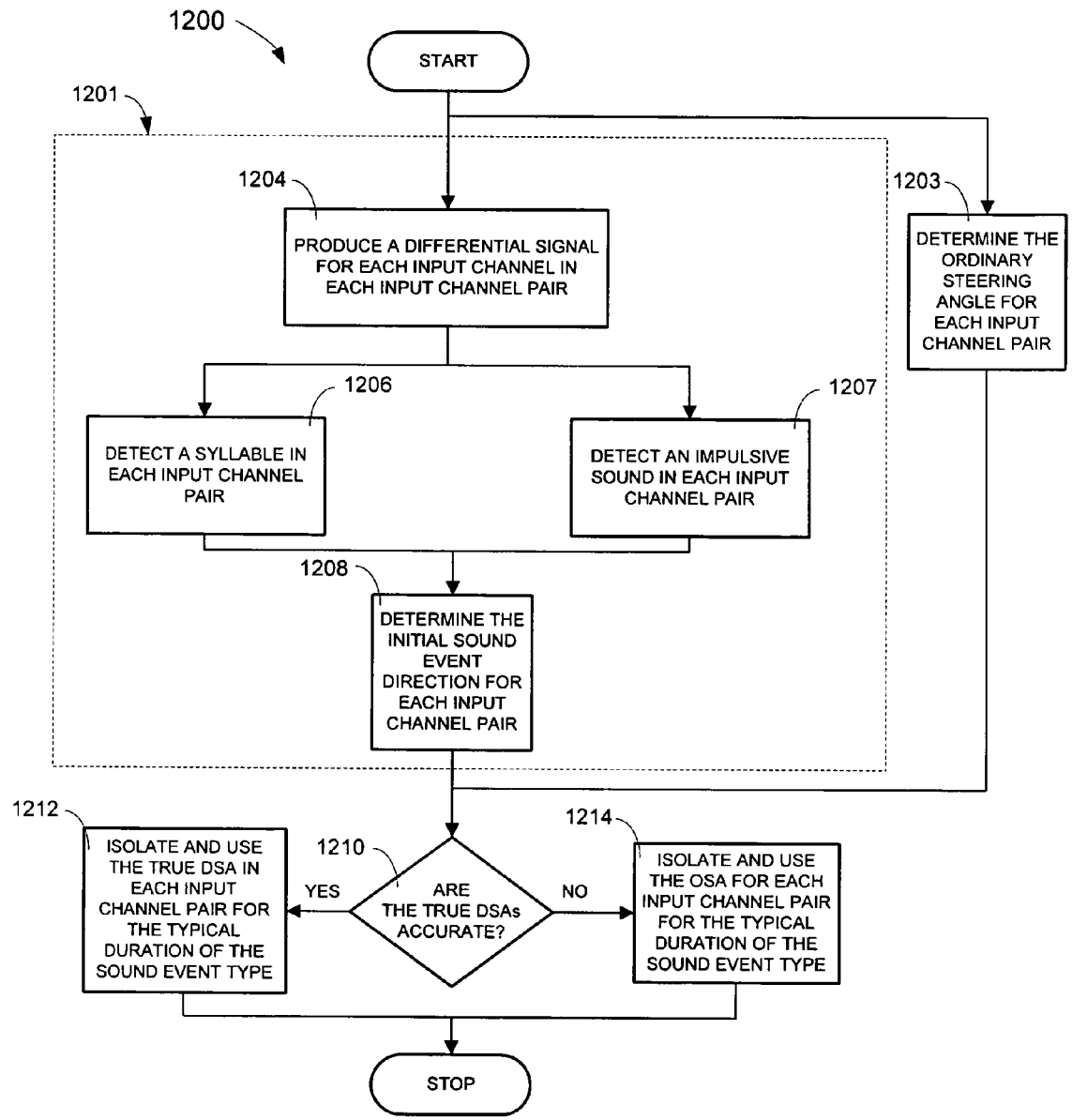
FIG. 12 is a flow chart of a sound event detection and localization method for a single input channel pair and multiple sound event types.

Sound event detection and localization methods may also be implemented to detect and localize multiple sound event types in multiple input channel pairs ("sound event localization methods for multiple input channel pairs and multiple sound event types"). The sound event localization methods for multiple input channel pairs and multiple sound event types generally involve performing a sound event detection and localization method for a single input channel pair and multiple sound event types in a parallel fashion for each input channel pair. Alternately, sound event localization methods for multiple input channel pairs and multiple sound event types may include detecting a sound event, determining the DSA for the sound event, determining whether the DSA is accurate and using the true OSA if the DSA is not accurate. An example of a sound event localization methods for multiple input channel pairs and multiple sound event types that uses the true OSA to indicate the direction of a sound event if the DSA is not accurate is shown in FIG. 12. In this example, syllables and impulsive sounds are detected in two channel pairs. However, this method may be implemented to detect any number of sound event types in any number of channels.

In FIG. 12, the sound event localization methods for multiple input channel pairs and multiple sound event types 1200 includes: producing a differential signal for each input channel in each input channel pair 1204; detecting syllables in each input channel pair 1206; detecting impulsive sounds in each input channel pair 1207; determining the initial direction for each input channel pair 1208; determining whether the DSAs are accurate 1210, where if the DSAs are accurate, the true DSAs are isolated and used for the typical duration of the sound event type detected 1212; where if the DSA is not accurate, the true OSA is isolated and used for the typical duration of the sound event type detected 1214. Collectively, steps 1204, 1206, 1207, and 1208 define a DSA determination method for multiple input channel pairs and multiple sound event types 1201.

Producing a differential signal for each input channel in the input channel pair 1204 includes performing an accommodation method in parallel for each input channel in each input channel pair. Detecting syllables in each input channel pair 1206 includes performing a beginning detection method for a single channel pair and a single sound event type in parallel for each input channel pair to produce a trigger signal for each channel pair indicating the occurrence of syllables in any channel pair. Detecting impulsive sounds in each input channel pair 1207 includes performing a sound event detection method for a single input channel and a single short-duration sound event in parallel for each channel in each channel pair (for each channel pair the resulting two trigger signals may be combined to form a single trigger signal indicating the occurrence of impulsive sounds in the channel pair). Simultaneously, the OSA is determined in each channel pair 1203 using known methods.

The initial sound event direction is then determined in each channel pair 1208 at the moment any trigger signal indicates that a syllable or an impulsive sound is detected. At this moment, an initial direction determination method is used to determine the initial direction of the sound event detected using the differential signals of each input channel in the input channel pair in which the sound event was detected. It is then determined whether the DSAs are accurate 1210 using a beginning detection method and/or a consistency check. If the DSAs are found to be accurate, the true DSAs are isolated 1212. The true DSA is then used for the typical duration of the sound event type that was detected. For example, if the sound event detected was a syllable, the true DSA would be used for the typical duration of a syllable. Conversely, if an impulsive sound was detected, the true DSAs would be used for the typical duration of an impulsive sound. If however, the DSA is not found to be accurate, the true OSAs are isolated 1214. The true OSAs are then isolated from the OSAs during the typical rise time of the sound event type being detected and is used for the typical duration of the sound event type being detected. Additionally, the sound event detection and localization methods for multiple channel pairs and multiple sound event types may further include an accommodation adjustment method and/or an error threshold adjustment method.

In any of the sound event detection and localization methods, the direction of a sound event is used to indicate the direction of the entire sound field for the typical duration of the sound event type that was detected. However, if a subsequent sound event occurs during the typical duration, the direction of the subsequent sound event will be used for all input channels as soon as the subsequent sound event occurs and will continue to be used for the typical duration of the sound event type of the subsequent sound event. This generally means that when multiple sound events overlap, the direction of the most recent sound event will be used.

One application of the sound event detection and localization methods is in methods that determine whether recorded sounds are intended for reproduction in stereo (two channels) or in surround (more than two channels) ("stereo/surround detection methods"). Stereo/surround detection methods generally determine the number of sound events intended to be reproduced behind the listener and whether this number exceeds a predetermined value. These methods have an advantage over known methods that use negative phase as an indicator of sounds that are to be reproduced behind the listener because transients that naturally have negative phase but are not intended for reproduction behind the listener will not falsely indicate a rear direction.

As previously discussed, sound fields intended for reproduction in surround include sound events that are intended to be reproduced behind the listener. Therefore, the stereo/surround detection methods include performing a sound event detection and localization method for a single input channel pair for the center-surround input channel pair for each sound event type being detected, and determining the number of sound events with an associated true differential steering angle of about 0 degrees to about −45 degrees (indicating a rear direction). In order to avoid a false designation of surround caused by inaccurate differential steering angles, the surround detection method also determines whether the number of sound events detected for reproduction in the rear exceeds a predetermined value in a defined time period. Generally, if just a few sound events intended for reproduction in the rear are detected (on the order of 2 or 3) during a time period of about 10 s to about 15 s, it is determined that the sound field at that particular portion of the sound field is intended for reproduction in surround. Additionally, the duration of the sound events may be determined and only those sound events with durations that exceed a predetermined duration will be counted as sound events that are intended for reproduction in the rear. For example, sound events of very short duration, on the order of less than about 50 ms, often provide a poor indication of the intended direction of the sound field. Therefore, only sound events with durations that exceed about 50 ms will be counted as sound events intended for reproduction in the rear. In another example, only sound events with durations of about 200 ms to about 300 ms will be counted as sound events intended for reproduction in the rear.

3. Methods for Localizing Sounds

The properties of the human hearing mechanism may also be used to determine the location of all sounds within a sound field. By combining the sound event detection and localization methods with methods for determining the intended direction of sounds, methods have been developed that localize the individual sounds in the presence of background sounds more accurately for any combination of sounds ("sound localization methods"). The sound localization methods divide the sound field into sound events and non-sound events and localize the sound events in terms of a true differential steering angle (DSA) or a true ordinary steering angle (OSA) and the non-sound events in terms of a filtered ordinary steering angle (OSA). These methods essentially treat the non-sound events as a separate sound for which the direction is separately determined. The sound localization methods can be implemented to specifically localize any number and combination of sound event types, in addition to localizing the remaining sounds, in a sound field generated in any number of input channel pairs. In the following description, the sound localization methods are discussed in order of increasing complexity, with each subsequent sound localization method incorporating the steps of the prior methods, except as indicated.

Generally, in all the sound localization methods, a filtered OSA is used to indicate the direction of the sound field unless a sound event is detected, in which case the true DSA is used. In sound localization methods implemented for a sound field generated in multiple channel pairs (or in a single channel pair from which another channel pair can be generated), the true DSA may be used to indicate the direction of sound events only if the DSA is determined to be accurate. In these cases, if the DSA is not found to be accurate, the true OSA may be used to indicate the direction of the sound events. Additionally, no matter which type of steering angle (OSA or DSA) is selected, that type of steering angle is used for all input channels of the sound field. For example, if a sound event in the presence of noise is detected in only one input channel but the noise is present in every input channel, the DSA (which indicates the direction of the sound event) will be used (in some cases, only if accurate) to define the direction of the entire sound field for the typical duration of the sound event type being detected. Fortunately, the human hearing mechanism, which generally perceives sound events as part of a foreground stream and noise as part of a background stream, will perceive only the sound event as having moved.

Figure 13:
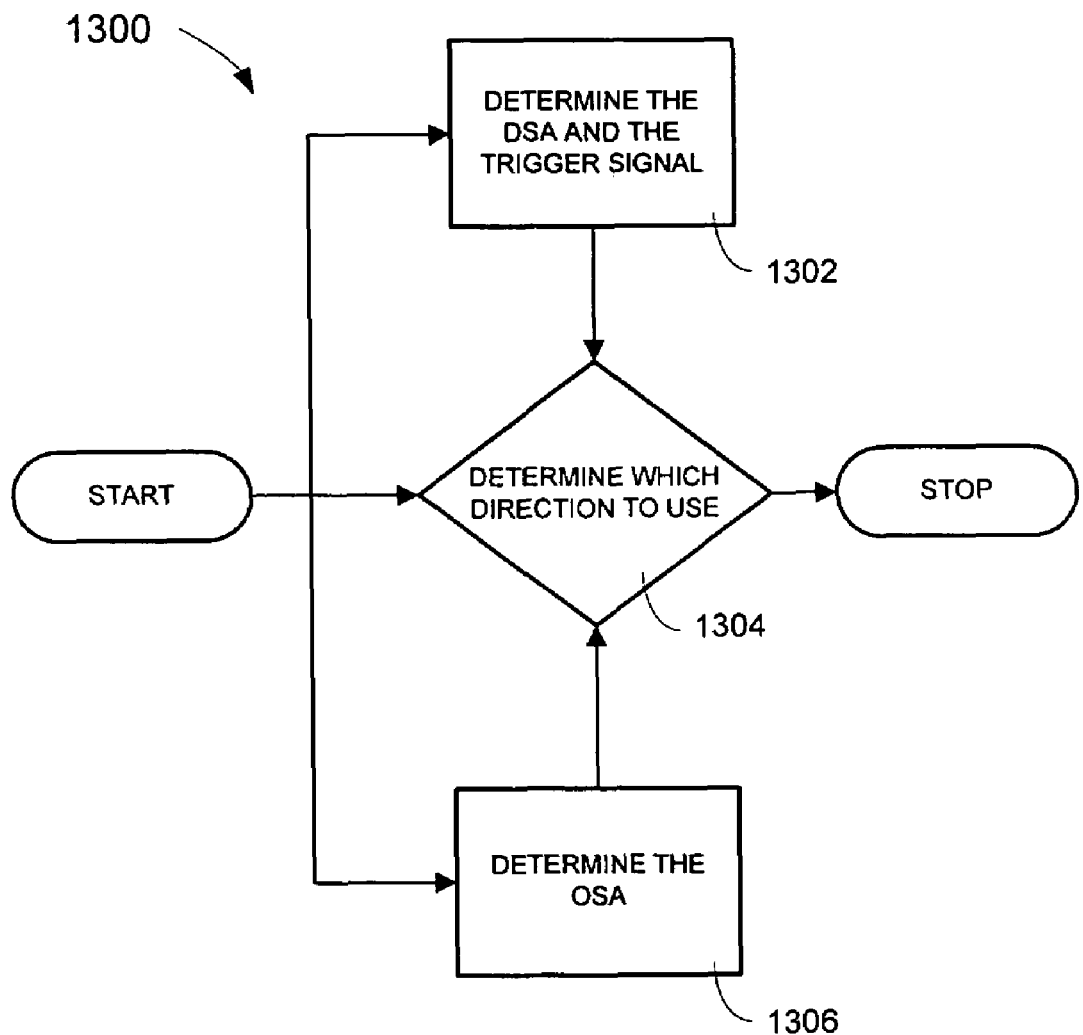
FIG. 13 is a flow chart of a sound localization method.

A sound localization method for detecting a single sound event type in a single input channel pair ("sound localization method for a single input channel pair and a single sound event type") is shown in FIG. 13, indicated by reference number 1300, and generally includes: determining the DSA and the trigger signal 1302; determining the OSA 1306; and determining which direction to use 1304. 1302, 1304 and 1306 are generally performed simultaneously and concurrently, for as long as a sound field is sensed.

Determining the DSA and the trigger signal 1302 is generally accomplished by performing a DSA determination method for a single input channel pair and a single sound event that includes a beginning detection or an alternate beginning detection method to produce a single trigger signal for the input channel pair. Even though sound events only occur whenever a pulse is present in the trigger signal, the DSA may be continuously determined. Alternatively, the trigger signal may be continuously determined and the DSA determined only when a pulse is present in the trigger signal. The OSA is generally determined 1306 continuously using known methods. Determining which direction to use 1304 basically includes: determining when a sound event occurs, using the true DSA for the duration typical of the sound event type detected and decaying to the OSA at the end of the sound event. However, if at any time a subsequent sound event occurs (even during a sound event), the DSA for the subsequent sound event will be used for the duration typical of the subsequent sound event type.

Figure 14:
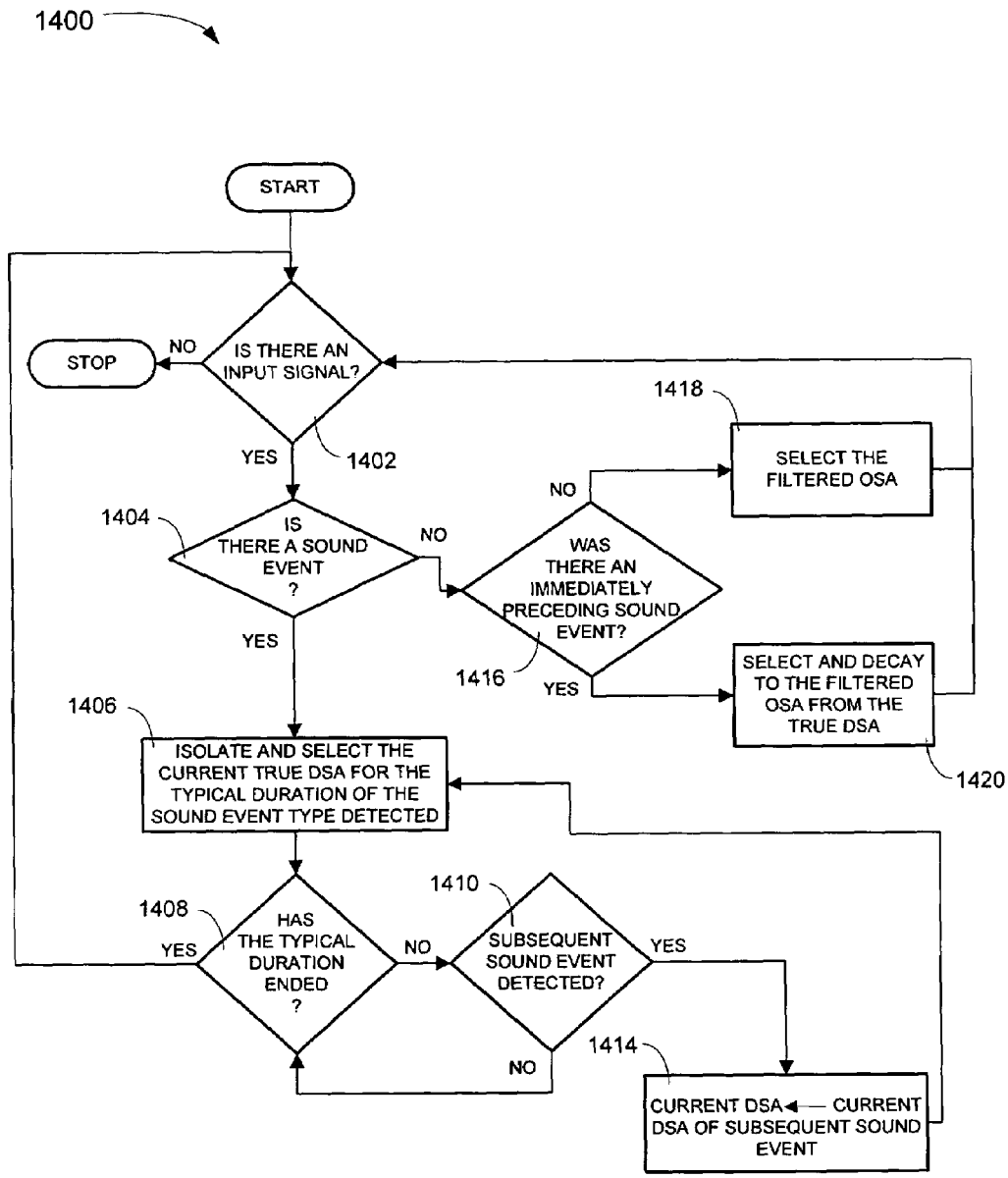
FIG. 14 is a flow chart of a direction selection method for a single input channel pair and a single sound event type.

A method for determining which direction to use (the "direction selection method for a single input channel pair and a single sound event type") is shown in FIG. 14 and indicated by reference number 1400. It generally includes, determining whether there is an input signal 1402; where if there is an input signal, determining whether there is a sound event 1404; where if there is a sound event, isolating and selecting the current true DSA for the typical duration of the sound event type being detected 1406; determining whether the typical duration has ended 1408; where if the typical duration has not ended, determining whether a subsequent sound event is detected 1410, where if a subsequent sound event is not detected, repeating determining whether the typical duration has ended 1408 and whether a subsequent sound event has been detected 1410 until it is determined that either the typical duration has ended in 1408 or that a subsequent sound event has been detected in 1410; where if a subsequent sound event has been detected, defining the current DSA with that of the subsequent sound event 1414 and repeating 1406, 1408, 1410, and 1414 as appropriate; where if it is determined in 1408 that the typical duration has ended, repeating the entire method as appropriate from 1402; where if there is no sound event detected in 1404, determining whether there was an immediately preceding sound event 1416; where if there was no immediately preceding sound event, selecting the filtered OSA 1418; and repeating the entire method as appropriate from 1402; and if there was an immediately preceding sound event, selecting and decaying to the filtered OSA from the true DSA 1420; and repeating the entire method as appropriate from 1402; where the entire method is repeated as appropriate until there is no input signal detected in 1402.

Determining whether there is an input signal 1402 includes determining whether the input power of the sound field in all input channels ("$I^2$") is greater than about zero. Additionally, it may also include determining whether the input power has dropped in all input channels by more than about 30 dB from that of a prior sound event. If it has, it can generally be assumed that the input signal has stopped. If there is an input signal, it is then determined whether there is a sound event 1404 by examining the trigger signal. Whenever the trigger signal contains a pulse or other indication of the occurrence of a sound event, a sound event exists. Conversely, whenever the trigger signal does not contain a pulse or other indication of the occurrence of a sound event, no sound event exists.

If there is a sound event, a current true DSA is isolated from the current DSA (by isolating the DSA during the typical rise time of the sound event type being detected) and selected for the typical duration of the sound event type being detected 1408. As previously discussed, if the sound event type being detected is a syllable, than the typical rise time will be about 20 ms to about 30 ms and the typical duration of the sound event will be about 50 ms to 200 ms (preferably about 150 ms). If the sound event type being detected is an impulsive sound, than the typical rise time will be about 3.3 ms to about 5 ms and the typical duration will be about 50 ms. The true DSA is selected and used for the typical duration regardless of when the sound event being detected actually ends. However, during the typical duration, the input signal is monitored to determine if any subsequent sound events are detected (1408 and 1410). If during the typical duration a subsequent sound event is detected, the current DSA will be redefined by the current DSA of the subsequent sound event 1414, the redefined current DSA will be used to generate a current true DSA that will be selected for the typical duration of the sound event type being detected 1406, and 1408, 1410 and 1414 will be repeated as appropriate. However, if no subsequent sound event is detected during the typical duration (1408 and 1410), then the entire method repeats, as appropriate, from 1402.

In contrast, if it is determined in 1404 that there is no sound event, it is then determined whether there was an immediately preceding sound event 1416. If there was no immediately preceding sound event (a sound event for which the typical duration had just ended), a filtered OSA is selected, or continues to be selected 1418 and the process repeats, as appropriate from 1402. The filtered OSA is the OSA with the fluctuations having rise-times faster than a specified rise-time removed. For example, fluctuations with rise-times faster than approximately 300 ms may be removed. This prevents the OSA from reflecting rapid directional changes when no sound event is detected. If however, there was an immediately preceding sound event (a sound event for which the typical duration had just ended), the filtered OSA is selected and decayed to from the true DSA of the immediately preceding sound event 1420. The decay helps to provide a smooth transition from the true DSA of the immediately preceding sound event to the filtered OSA. The length of decay needed to provide this smooth transition depends on the sound event type of the immediately preceding sound event. If the immediately preceding sound event was a syllable, the decay will generally be about 300 ms seconds. The process then repeats, as appropriate, from 1402 until it is determined in 1402 that the input signal has ended.

Figure 15:
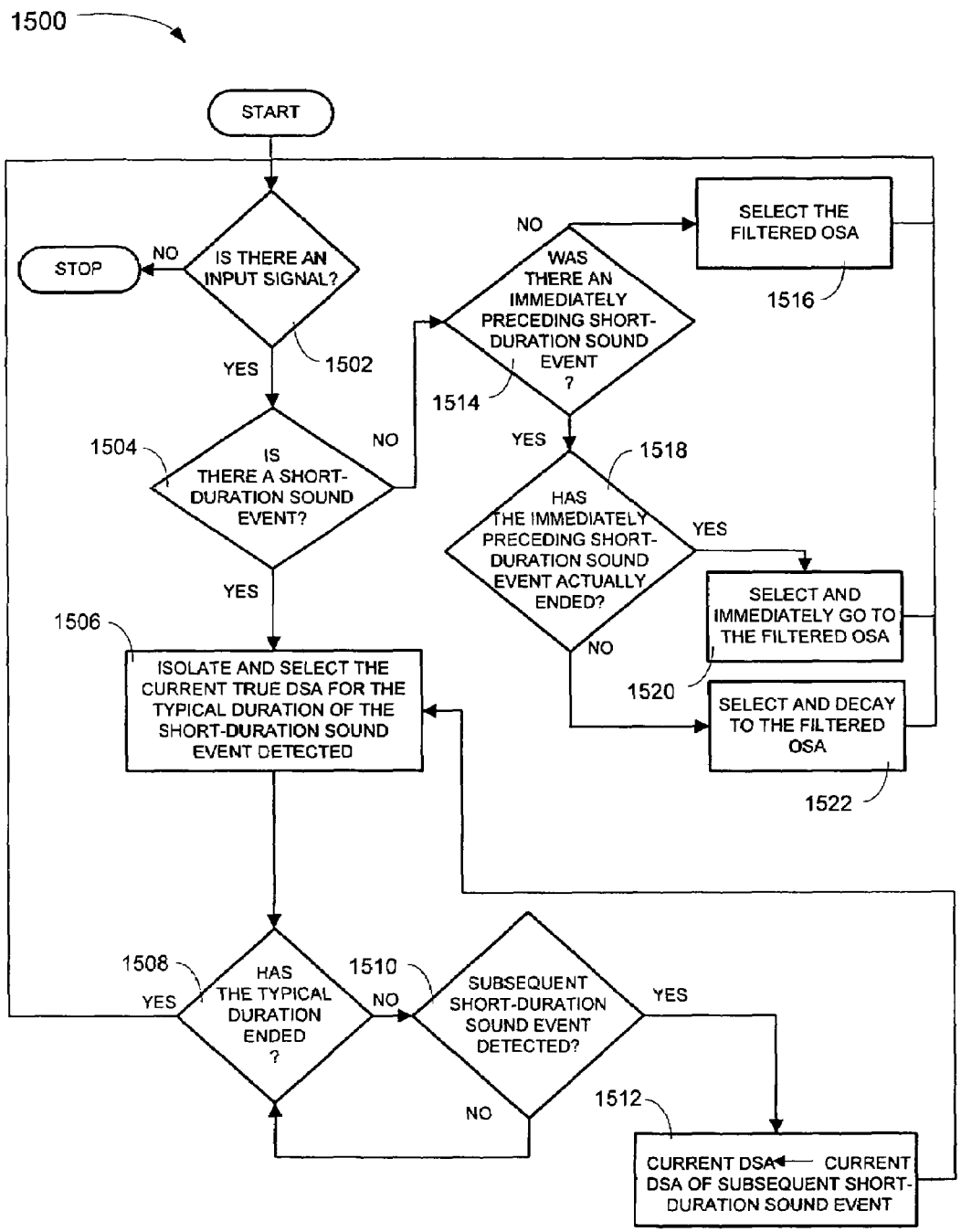
FIG. 15 is a flow chart of a direction selection method for a single channel pair and a single short-duration sound event.

In certain cases, particularly when sound events with a very short-duration are being localized, more accurate results are obtained if the direction selection method includes determining whether the short-duration sound event has actually ended at the end of the typical duration, and immediately selecting the OSA without any decay if it is determined that the short-duration sound event has not actually ended. Such a method (a "direction selection method for a single input channel pair and a short-duration sound event") is shown in FIG. 15 and indicated by reference number 1500. The direction selection method for a single input channel pair and a short-duration sound event 1500 generally includes, determining whether there is an input signal 1502; where if there is an input signal, determining whether there is a short-duration sound event 1504; where if there is a short-duration sound event, isolating and selecting the current true DSA for the typical duration of the short-duration sound event being detected 1506; determining whether the typical duration has ended 1508; where if the typical duration has not ended, determining whether a subsequent short-duration sound event is detected 1510, where if a subsequent short-duration sound event is not detected, repeating determining whether the typical duration has ended 1508 and whether a subsequent short-duration sound event has been detected 1510 until it is determined that either the typical duration has ended in 1508 or that a subsequent short-duration sound event has been detected in 1510; where if a subsequent short-duration sound event has been detected, defining the current DSA with that of the subsequent short-duration sound event 1512 and repeating steps 1506, 1508, 1510 and 1512 as appropriate; where if it is determined in step 1508 that the typical duration has ended, repeating the entire method as appropriate from 1502; where if there is no short-duration sound event detected in 1504, determining whether there was an immediately preceding short-duration sound event 1514; where if there was not an immediately preceding short-duration sound event, selecting or continuing to select the filtered OSA 1516; and repeating the entire method as appropriate from 1502; and if there was an immediately preceding short-duration sound event, determining whether the immediately preceding short-duration sound event has actually ended 1518; where if the immediately preceding short-duration sound event has actually ended, selecting and immediately going to the filtered OSA 1520; and repeating the entire method as appropriate from 1502; where if the immediately preceding short-duration sound event has not actually ended, selecting and decaying to the filtered OSA 1502 and repeating the entire method as appropriate from 1522; where the entire method is repeated as appropriate until there is no input signal detected in 1502.

This direction selection method for a single input channel pair and a short-duration sound event is virtually the same as the previously discussed direction selection methods, except that the direction selection method for a single input channel pair and a short-duration sound event is implemented to detect short-duration sound events. Furthermore, at the end of a typical duration of a short-duration sound event (assuming no new sound event has or is occurring), a determination is made as to whether the sound event has actually ended 1514; and the filtered OSA is selected and used either immediately 1520 or after a decay 1522 depending upon whether the short-duration sound event has actually ended. The direction selection method for a single input channel pair and a short-duration sound event is implemented to detect short-duration sound events by using a sound event detection method for a single channel and a single short-duration sound event for each input channel of the channel pair to produce a trigger signal (or two trigger signals) that indicates whenever a short-duration sound event is detected.

Whether the immediately preceding short-duration sound event has actually ended 1518 may be determined by comparing the power envelope and the accommodation signal in each input channel of the channel pair. If the input power envelope $I^2$ is greater than the accommodation signal AccSig in any input channel of the input channel pair, it may be determined that the short-duration sound event has not actually ended. Therefore, the filtered OSA is decayed to from the true DSA of the immediately preceding sound event. If however, $I^2$ is about equal to or less than AccSig in each input channel of the input channel pair, it may be determined that the short-duration sound event has actually ended and the filtered OSA is immediately selected 1522. The length of decay needed to provide this smooth transition depends on the sound event type being detected. For example, if the immediately preceding sound event is an impulsive sound, the decay will take about 5 ms.

Sound localization methods may also be used to localize the sounds in a sound field when the sound field includes more than one input channel pair ("sound localization methods for multiple input channel pairs and a single sound event type"). The sound localization methods for multiple input channel pairs and a single sound event include the same basic steps as the sound localization method for a single input channel pair and a single sound event type, which generally include: determining the OSA; determining the DSA and trigger signal; and determining which direction to use. However, the step of determining the DSA and a trigger signal includes determining a DSA and a trigger signal for each input channel pair and is accomplished by performing a DSA determination method for multiple input channel pairs and a single sound event that includes a beginning detection or an alternate beginning detection method. Additionally, the step of determining the OSA includes determining an OSA for each channel pair. In addition, the step of determining which direction to use (the "direction selection method for multiple channel pairs and a single sound event type") includes responding to differential signals, trigger signals and DSAs from any of the input channel pairs; and generating and selecting the true differential steering angle for all the input channel pairs when a sound event with an accurate DSA is detected in any input channel pair.

Figure 16:
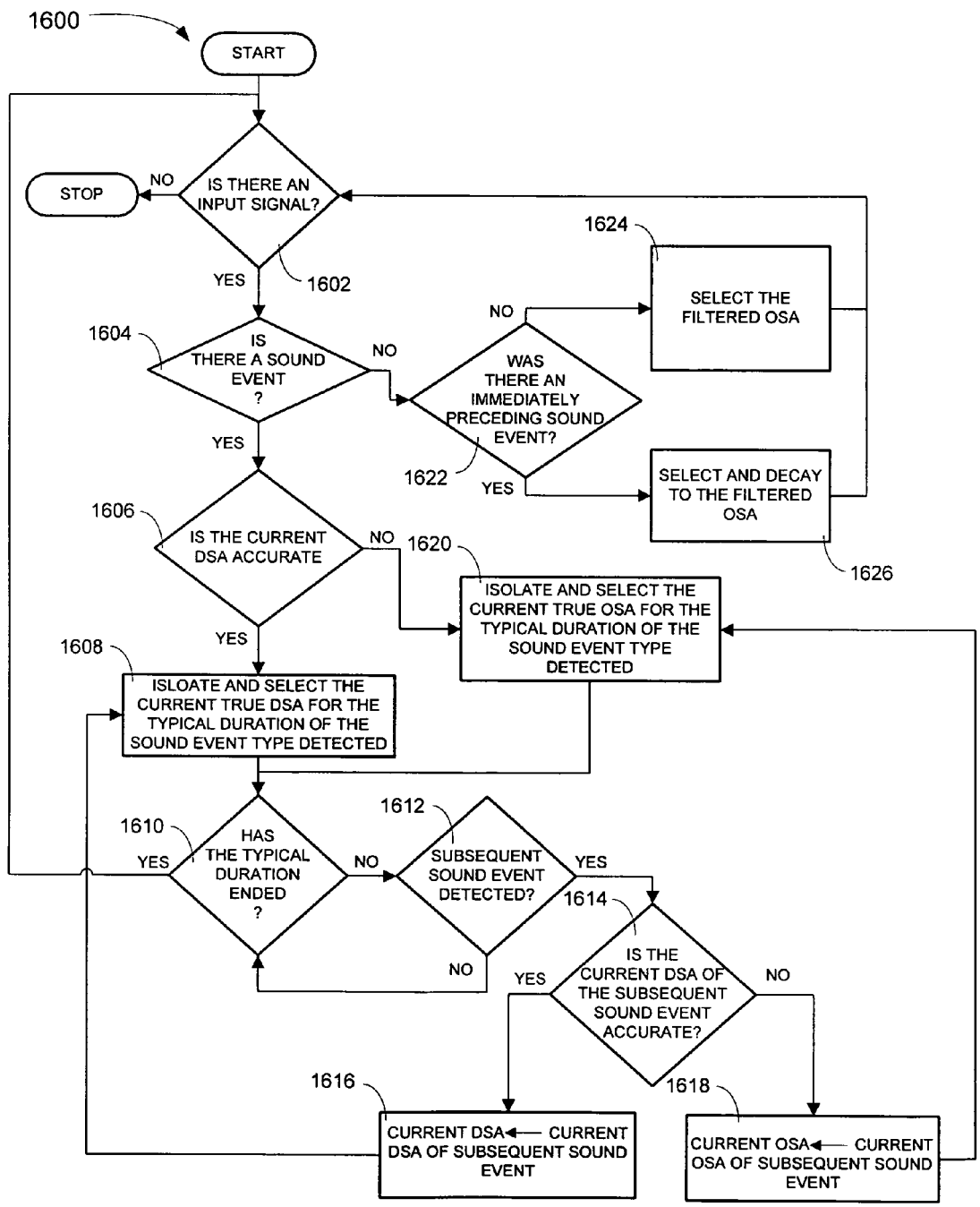
FIG. 16 is a flow chart of a direction selection method for multiple input channel pairs and a single sound event type.

A direction selection method for multiple channel pairs and a single sound event type is shown in more detail in FIG. 16 and is indicated by reference number 1600. Generally, this direction selection method 1600 includes determining whether, at the time any trigger signal indicates the occurrence of a sound event, the DSAs are accurate; and if the DSAs are not accurate, using the true OSAs for the typical duration of the sound event type being detected instead of the DSAs. More specifically, this direction selection method 1600 includes: determining whether there is an input signal 1602; where if there is an input signal, determining whether there is a sound event 1604; where if there is a sound event, determining whether the current true DSA is accurate 1606; where if the current true DSA is accurate, isolating and selecting the current true DSA for the typical duration of the sound event type being detected 1608; where if the current true DSA is not accurate, isolating and selecting the current true OSA for the typical duration of the sound event type being detected 1620; once either the true OSA or DSA is generated and selected, determining whether the typical duration has ended

1610; where if the typical duration has not ended, determining whether a subsequent sound event is detected 1612, where if a subsequent sound event is not detected, repeating determining whether the typical duration has ended 1610 and whether a subsequent sound event has been detected 1612 until it is determined that either the typical duration has ended in 1610 or that a subsequent sound event has been detected in 1612; where if a subsequent sound event has been detected, determining whether the current DSA of subsequent sound event is accurate 1614; where if the current DSA of the subsequent sound event is accurate, defining the current DSA with that of the subsequent sound event 1616 and repeating 1608, 1610, 1612, 1614, 1616 and 1618 as appropriate; where if it is determined in 1614 that the current DSA of the subsequent sound event is not accurate, defining the current OSA with that of the subsequent sound event 1618 and repeating 1620, 1610, 1612, 1614, 1616 and 1618 as appropriate; where if it is determined in 1610 that the typical duration has ended, repeating the entire method as appropriate from 1602; where if there is no sound event detected in 1604, determining whether there was an immediately preceding sound event 1622; where if there was no immediately preceding sound event, selecting or continuing to select the filtered OSA 1624; and repeating the entire method as appropriate from 1602; and if there was an immediately preceding sound event, selecting and decaying to the filtered OSA 1626; and repeating the entire method as appropriate from 1602; where the entire method is repeated as appropriate until there is no input signal detected in 1602.

Figure 17:
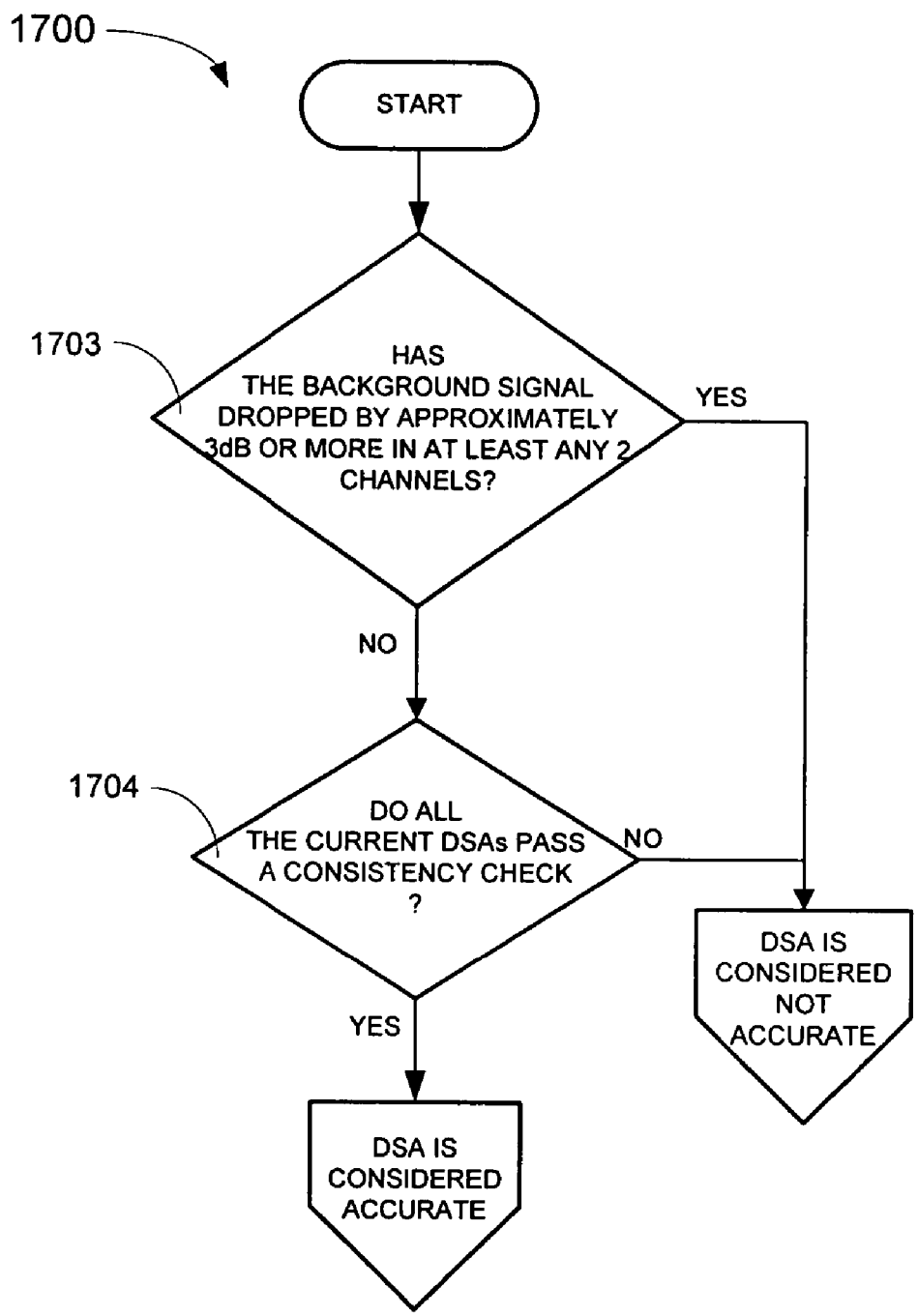
FIG. 17 is a flow chart of an accuracy determination method for multiple input channel pairs.

Determining whether there is an input signal 1602 includes determining whether there is an input signal in any input channel of each channel pair. Determining whether there is a sound event 1604 includes performing a sound event detection method for a single channel pair and a single sound event type for each channel pair to produce a trigger signal that indicates the occurrence of any sound events for each pair. Determining whether the current DSA is accurate 1606 includes determining whether the current DSA (the DSA determined at the moment a trigger signal indicates that a sound event is occurring) from every input channel pair is accurate using a method for determining DSA accuracy for multiple input channel pairs. A method for determining DSA accuracy for multiple input channel pairs is shown in more detail in FIG. 17, is indicated by reference number 1700, and includes: determining whether the background signal has dropped by about 3 dB or more in at least two input channels 1703; and where if the background signal has not dropped by about 3 dB or more in at least two input channels, determining whether all the current DSAs pass a consistency check 1704. Determining whether the background signal has dropped by about 3 dB or more in at least two input channels is accomplished by performing a background signal check on all input channels. If the background signal has dropped by about 3 dB or more in at least two input channels, the DSA is not considered accurate. However, if background signal has not dropped by about 3 dB or more in at least two input channels, the consistency check is performed as previously described. If the DSAs pass the consistency check, they are considered accurate.

As shown in FIG. 16, if the DSAs are considered accurate, the current true DSAs are generated and selected for each channel pair 1608 using a true direction isolation method. However, if the DSAs are not considered accurate, the current true OSAs (the true OSAs for the current sound event) are generated and selected for each channel pair 1620. Either the current true OSAs or the current true DSAs are used for the typical duration of the sound event type being detected 1610, unless a subsequent sound event is detected during the typical duration. As long as it is determined that the typical duration has not ended in 1610, it is determined whether any subsequent sound events are detected 1612. If a subsequent sound event is detected, it is determined whether the current DSAs for the subsequent sound event are accurate 1614 using a method for determining DSA accuracy for multiple input channel pairs. If the DSAs of the subsequent sound event are determined to be accurate, the current DSAs of the subsequent sound event become the current DSAs 1616 to reflect the direction of the subsequent sound event. However, if the DSAs of the subsequent sound event are determined not to be accurate, the current OSAs of the subsequent sound event become the current OSAs 1618 to reflect the direction of the sound event. The process repeats from 1608 or 1620, as appropriate, until the typical duration of any subsequent sound events ends.

Once the typical duration of a sound event or any subsequent sound event ends, the process repeats from 1602. In 1622 it is determined whether there was an immediately preceding sound event. If there was an immediately preceding sound event, the filtered OSAs are selected and the direction of the sound field decays from that indicated by the true DSAs or true OSAs to that indicated by the filtered OSAs 1626. However, if there was no immediately preceding sound event, the filtered OSAs are used, or continue to be used 1624. In addition, any of the sound localization methods for multiple channel pairs and a single sound event type may further include using a consistency check to reduce the occurrence of inaccurate DSAs through use of an accommodation adjustment method and/or an error threshold adjustment method as previously described.

Figure 18:
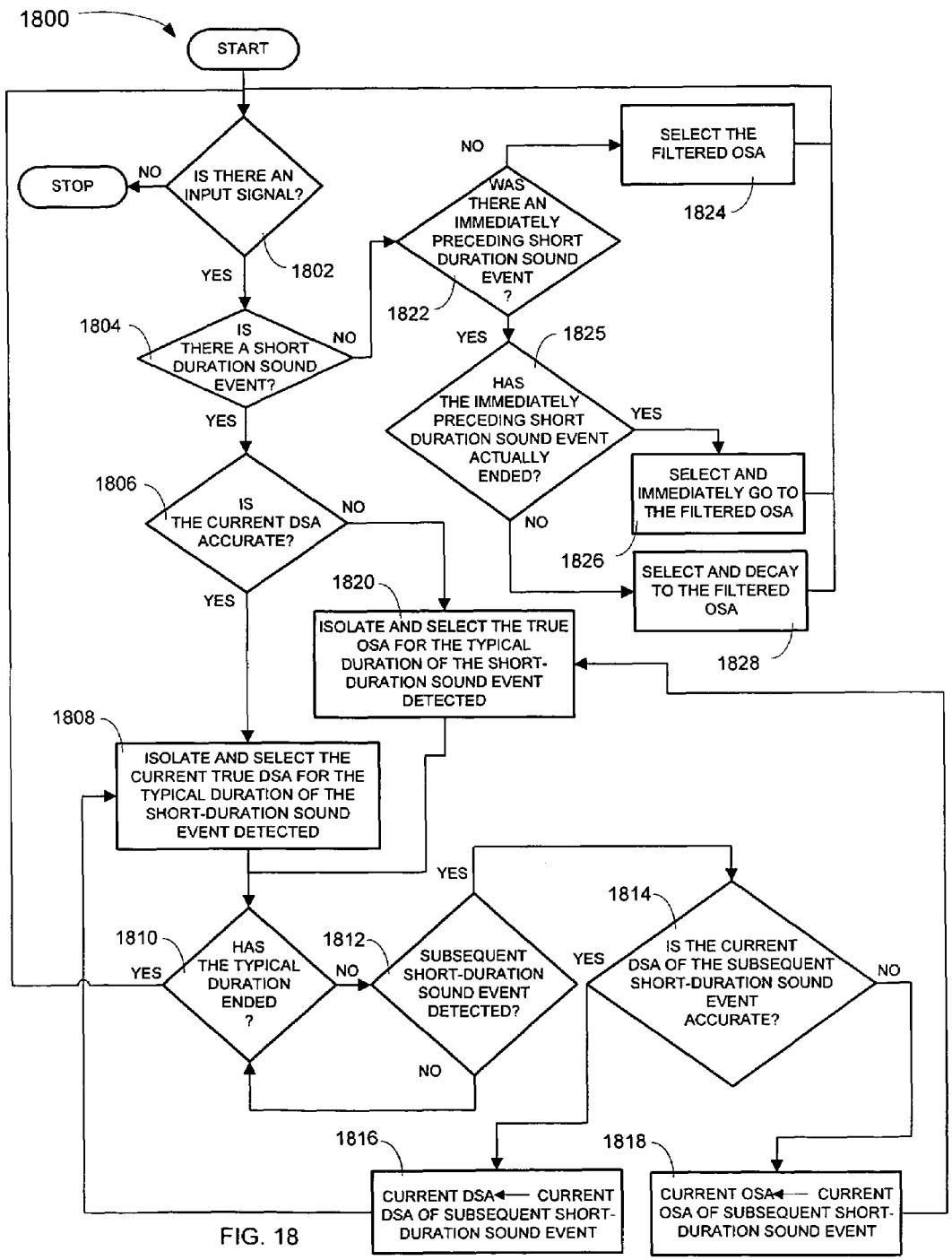
FIG. 18 is a flow chart of a direction selection method for multiple input channel pairs and a single short-duration sound event.

In certain cases, particularly when sound events with a very short-duration are being localized, more accurate results are obtained if the direction selection method for multiple input channel pairs and a single sound event type includes determining whether the short-duration sound event has actually ended at the end of the typical duration of a short-duration sound event, and immediately selecting the filtered OSA without any decay if it is determined that the s hort-duration sound event has not actually ended. Such a method (a "direction selection method for multiple input channel pairs and a short-duration sound event") is shown in FIG. 18 and indicated by reference number 1800. The direction selection method for multiple input channel pairs and a short-duration sound event 1800 generally includes: determining whether there is an input signal 1802; where if there is an input signal, determining whether there is a short-duration sound event 1804; where if there is a short-duration sound event, determining whether the current DSA is accurate 1806; where if the current DSA is accurate, isolating and selecting the current true DSA for the typical duration of the short-duration sound event being detected 1808; where if the current DSA is not accurate, generating and selecting the current true OSA for the typical duration of the short-duration sound event being detected 1820; once either the true OSA or DSA is isolated and selected, determining whether the typical duration has ended 1810; where if the typical duration has not ended, determining whether a subsequent short-duration sound event is detected 1812, where if a subsequent sound event is not detected, repeating determining whether the typical duration has ended 1810 and whether a subsequent sound event has been detected 1812 until it is determined that either the typical duration has ended in 1810 or that a subsequent sound event has been detected in 1812; where if a subsequent sound event has been detected, determining whether the true DSA of a subsequent short-duration sound event is accurate

1814; where if the current DSA of the subsequent sound event is accurate, defining the current DSA with that of the subsequent sound event 1816 and repeating 1808, 1810, 1812, 1814, 1816 and 1818 as appropriate; where if it is determined in 1814 that the true DSA of the subsequent sound event is not accurate, defining the current OSA with that of the subsequent sound event 1818 and repeating 1808, 1810, 1812, 1814, 1816 and 1818 as appropriate; where if it is determined in 1810 that the typical duration has ended, repeating the entire method as appropriate from 1802; where if there is no sound event detected in 1804, determining whether there was an immediately preceding sound event 1822; where if there was no immediately preceding sound event, selecting or continuing to select the filtered OSA 1824; and repeating the entire method as appropriate from 1802; and if there was an immediately preceding short-duration sound event, determining if the immediately preceding sound event has actually ended 1825; where if the immediately preceding sound event has actually ended, selecting and immediately going to the filtered OSA 1826; and repeating the entire method as appropriate from 1802; where if the immediately preceding sound event has not actually ended, selecting and decaying to the filtered OSA 1828 and repeating the entire method as appropriate from 1802; where the entire method is repeated as appropriate until there is no input signal detected in 1802.

This direction selection method for multiple input channel pairs and a short-duration sound event 1800 is virtually the same as the previously discussed direction selection method for multiple input channels and a single sound event type, except that the direction selection method for multiple input channel pairs and a short-duration sound event 1800 is implemented to detect short-duration sound events. Furthermore, at the end of a typical duration of a short-duration sound event (assuming no new sound event has or is occurring), a determination is made as to whether the sound event has actually ended 1825; and the filtered OSA is used either immediately 1826 or after a decay 1828 depending upon whether the short-duration sound event has actually ended. The direction selection method for multiple input channel pairs and a short-duration sound event is implemented to detect short-duration sound events by using a sound event detection method for multiple input channels and a single short-duration sound event for each input channel pair to produce a trigger signal (or two trigger signals) for each channel pair that indicates whenever a short-duration sound event is detected.

Whether the immediately preceding sound event has actually ended may be determined 1825 by determining whether the input power envelope is greater than the accommodation signal for the short-duration sound event in any input channel. If the input power envelope is greater than the accommodation signal for the short-duration sound event in any input channel, it is determined that the short-duration sound event has not actually ended. Therefore, a decay is made from the true DSAs or true OSAs of the immediately preceding short-duration sound event to the filtered OSA 1828. If however, in each input channel, the power envelope is about equal to the accommodation signal, it is determined that the short-duration sound event has actually ended and the filtered OSA is immediately selected 1826. The length of decay needed to provide this smooth transition depends on the sound event type being detected. For example, if the immediately preceding sound event is an impulsive sound, the decay will take about 5 ms.

Sound localization methods may also be used to localize the sounds in a sound field by distinguishing more than one sound event type ("sound localization methods for a single input channel pair and multiple sound event types"). The sound localization methods for a single input channel pair and multiple sound event types include the same basic steps as the sound localization method for a single input channel pair and a single sound event type, which generally include: determining the OSA; determining the DSA and trigger signal; and determining which direction to use. However, determining the DSA and the trigger signal includes determining the DSA and trigger signal for each sound event type by performing a DSA determination method for a single input channel pair and multiple sound event types that uses a beginning detection or an alternate beginning detection method. In addition, determining which direction to use includes performing a direction selection method for a single input channel pair (either for a single sound event type or a short-duration sound event) in parallel for each sound event type being detected. However, whenever an accurate sound event of any type is detected in the channel pair, the true DSA is used for the typical duration of the sound event type that was detected.

Sound localization methods may also be used to localize the sounds in a sound field with more than one input channel pair by distinguishing more than one sound event type ("sound localization methods for multiple input channel pairs and multiple sound event types"). The sound localization methods for multiple channel pairs and multiple sound event types include the same basic steps as the sound localization method for multiple input channel pairs and a single sound event type, which generally includes: determining the OSA; determining the DSA and trigger signal and determining which direction to use according to a direction selection method for multiple input channel pairs and a single sound event type. However, in the method for detecting multiple sound events, determining the DSA and trigger signal for each channel pair includes determining a DSA and trigger signal for each sound event type in each input channel pair. Determining a DSA and trigger signal for each sound event type in each input channel pair is accomplished by performing a DSA determination method for multiple input channel pairs and multiple sound event types. Further, determining the OSA includes determining the OSA for each input channel pair. In addition, performing the direction selection method for multiple input channel pairs and a single sound event type in parallel for each sound event includes, responding to the trigger signals from any sound event type; generating and selecting the current true DSA for all the input channel pairs if a sound event of any type with an accurate DSA is detected in any input channel pair; or selecting the current true OSA for all the input channel pairs if a sound event of any type with an inaccurate DSA is detected in any channel. Alternatively, the sound localization methods for multiple input channel pairs and multiple sound event types may also include using the accommodation adjustment methods and/or the error threshold adjustment methods as previously described.

Determining which direction to use in this manner works well for simple and more complicated sound events. For example, consider a sound field that contains popular music that includes prominent drum hits, where the bulk of the music originates from the front (the center input channel) and the drum hits originate from the rear (the surround input channel). The direction of the bulk of the music will generally be defined by the filtered OSA as localized in the center input channel (assuming the music contains no other sound events). However, when a drum hit occurs, the method will detect an impulsive sound and (assuming the DSA is accurate) will use the direction indicated in the true DSA to move the entire sound field to the rear. At the end of the typical duration of an impulsive sound, the method will determine if the drum hit has actually ended, and if it has, the method will immediate revert to using the direction indicated by the filtered OSA and move the entire sound field back to the center input channel. When the direction is determined in this manner, the human hearing mechanism will perceive the drum hit as originating from the rear and the bulk of the music as continually originating from the front as if the bulk of the music had never moved. If however, the DSA is used for longer than the typical duration of the drum hit, or the drum hit actually ends prior to the end of the typical duration and a decay is used at the end of the typical duration to revert to the filtered OSA, the entire sound field, including the bulk of the music; will be perceived as having moved to the rear.

In a more complicated example, consider a sound field that contains a speech sound that has a very sharp attack, such as a shout, in the presence of ambient noise. This speech sound is complex because it contains both an impulsive sound (the attack) and a syllable (the remainder of the shout). The beginning of the shout will be detected as an impulse, and assuming the current DSA is correct, the DSA will be selected for the typical duration of an impulsive sound, however, either during the typical duration of an impulsive sound or immediately after, the syllable portion of the shout will be detected and assuming the DSA of the syllable is correct, the DSA of the syllable will be selected and used for the typical duration of a syllable. Because at the moment the syllable is detected, the DSA of the previously detected impulsive sound will equal that of the syllable, no change in direction will occur. Therefore, the direction indicated in the sharp onset of the shout will be quickly captured according to its impulsive nature and the direction will be used for time characteristic of its syllabic nature.

4. Sound Event Device

Figure 19:
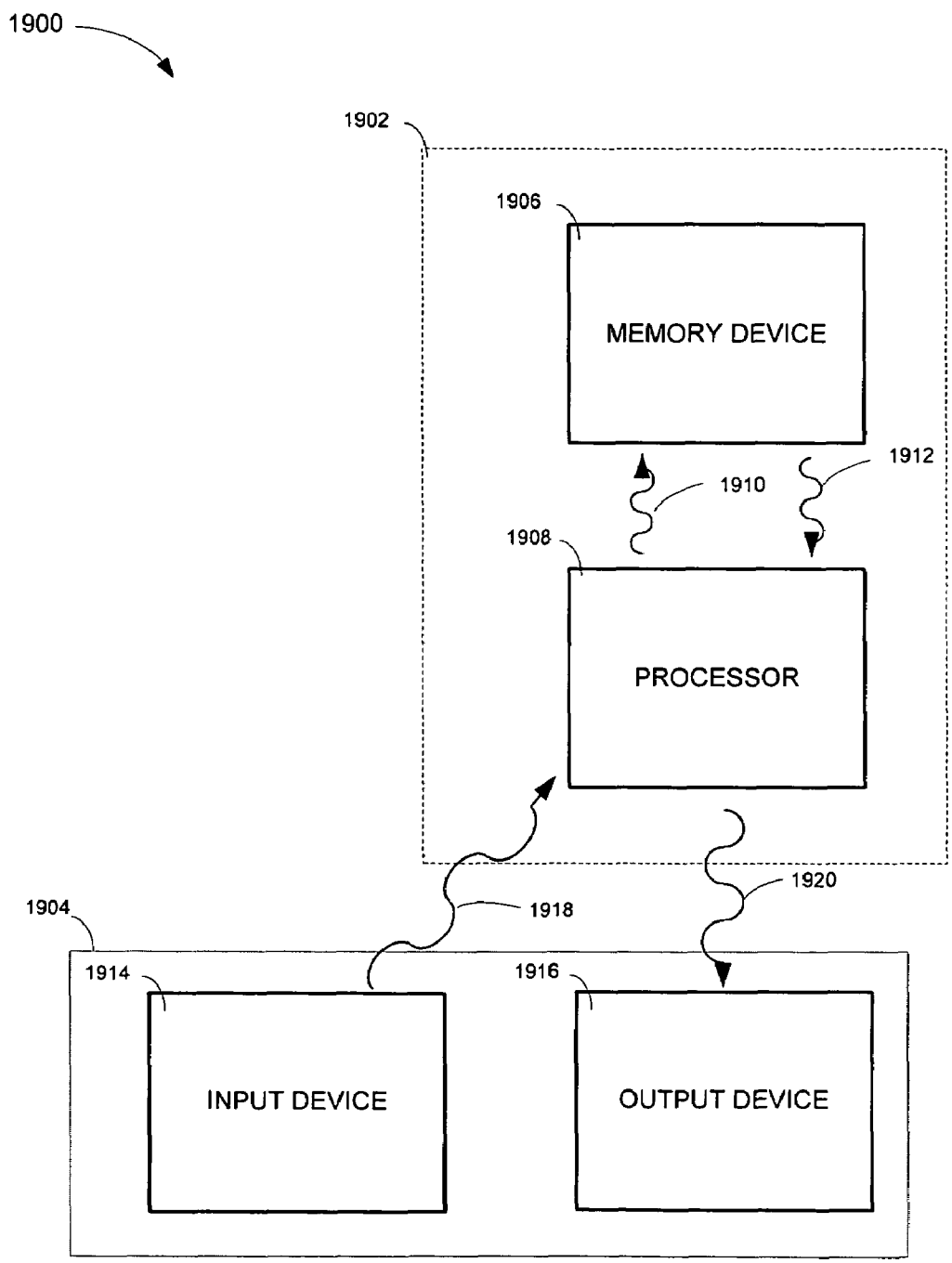
FIG. 19 is block diagram of a sound event device.

The sound event detection methods, sound event detection and localization methods, sound localization methods any methods included in any of these methods, sound event detectors, sound event detectors and localizers and sound localizers may be implemented in a sound event device as shown in FIG. 19 and indicated as reference number 1900. The sound event device 1900 generally includes a detection unit 1902 and may also include an interface unit 1904. The detection unit 1902 includes a processor 1908 coupled to a memory device 1906. The memory device 1908 may be any type of fixed or removable digital storage device and (if needed) a device for reading the digital storage device including, floppy disks and floppy drives, CD-ROM disks and drives, optical disks and drives, hard-drives, RAM, ROM and other such devices for storing digital information. The processor 1908 may be any type of apparatus used to process digital information. The memory device 1906 may store the sound field and at least one of the following methods: the sound event detection methods, sound event detectors, sound event detection and localization methods, sound event detector and localizers, sound localization methods, any methods included in any of these methods and sound localizers (collectively, the "detection and/or localization methods"). Upon the relevant request from the processor 1908 via a processor signal 1910, the memory communicates one of the detection and/or localization methods, and, if necessary, the sound field via a memory signal 1912 to the processor 1908. The processor 1908 then performs the detection and/or localization method.

The interface unit 1904 generally includes an input device 1914 and an output device 1916. The output device 1916 is any type of visual, manual, audio, electronic or electromagnetic device capable of communicating information from a processor or memory to a person or other processor or memory. Examples of output devices include, but are not limited to, monitors, speakers, liquid crystal displays, networks, buses, and interfaces. The input device 1914 is any type of visual, manual, mechanical, audio, electronic, or electromagnetic device capable of communicating information from a person or processor or memory to a processor or memory. Examples of input devices include keyboards, microphones, voice recognition systems, trackballs, mice, networks, buses, and interfaces. Alternatively, the input and output devices 1914 and 1916, respectively, may be included in a single device such as a touch screen, computer, processor or memory coupled to the processor via a network. The sound field may be communicated to the memory device 1906 from the input device 1914 through the processor 1908. Additionally, the results of the detection and/or localization methods may be communicated from the processor 1908 to the output device 1916.

6. Sound Event Detector

The properties of the human hearing mechanism have been modeled to create electronic circuitry that detects sound events in the presence of a background signal (collectively, "sound event detectors"). Sound event detectors may be used for a variety of applications for which the detection of specific types of sound events is helpful. For example, a sound event detector that detects syllables may be used as part of a phonic detector or as part of a speech recognition or speech coding system. In another example, a sound event detector that detects syllables may be used in conjunction with an audio amplification device, such as a microphone. This allows the microphone to remain off until a syllable is detected from a speaker, thus preventing the microphone from amplifying undesired sounds and feedback through the microphone itself when the speaker is silent. Sound event detectors, like the sound event detection methods, generally produce a trigger signal that includes some flag or marker, such as a pulse, that indicates the occurrence of a sound event. Also, like the sound event detection methods, the sound event detectors can be implemented to detect any number and combination of sound event types in a sound field that is generated in any number of input channels. In the following description, the sound event detectors are discussed in order of increasing complexity, with each subsequent sound event detector incorporating the elements of the prior sound event detectors, except as indicated.

Figure 20:
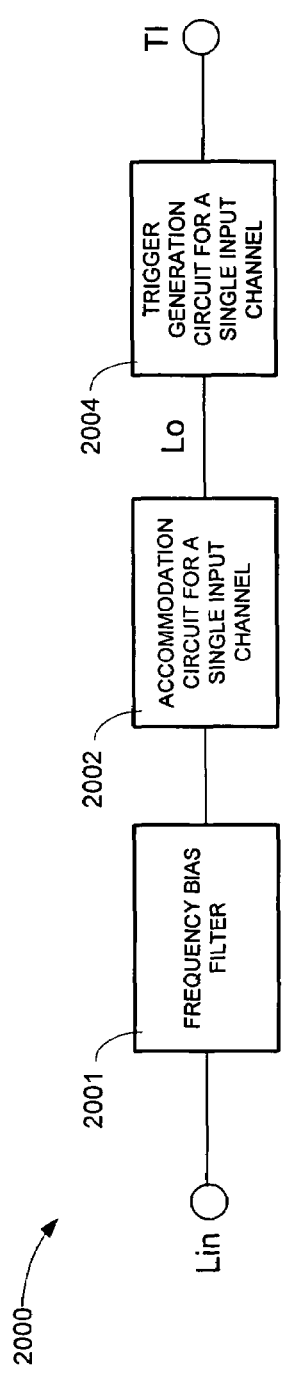
FIG. 20 is a block diagram of a sound event detector for a single input channel and a single sound event type.

One example of a sound event detector that detects a single type of sound event in a sound field generated in only one input channel (a "sound event detector for a single input channel and a single sound event type") is shown in FIG. 20 and indicated by reference number 2000. However, the sound event detector 2000 may be implemented to detect any number of sound event types in any number of input channels. In the present example, the entire sound field is generated through a left input channel. The term "left" as used in this example, does not have any directional meaning because the entire sound field is contained in a single input channel, and is used simply for the purposes of explanation. A sound event detector for a single input channel and a single sound event type 2000 generally includes a frequency bias filter 2001; an accommodation circuit for a single input channel 2002; and a trigger generation circuit for a single input channel 2004. In general, the accommodation circuit for a single input channel 2002 uses the sound field to produce a differential signal in the left input channel "Lo" for the sound event type being detected and the trigger generation circuit for a single input channel 2004 uses the differential signal Lo to produce a trigger signal "Tl" that indicates whenever a sound event of the type being detected is detected.

Figure 21:
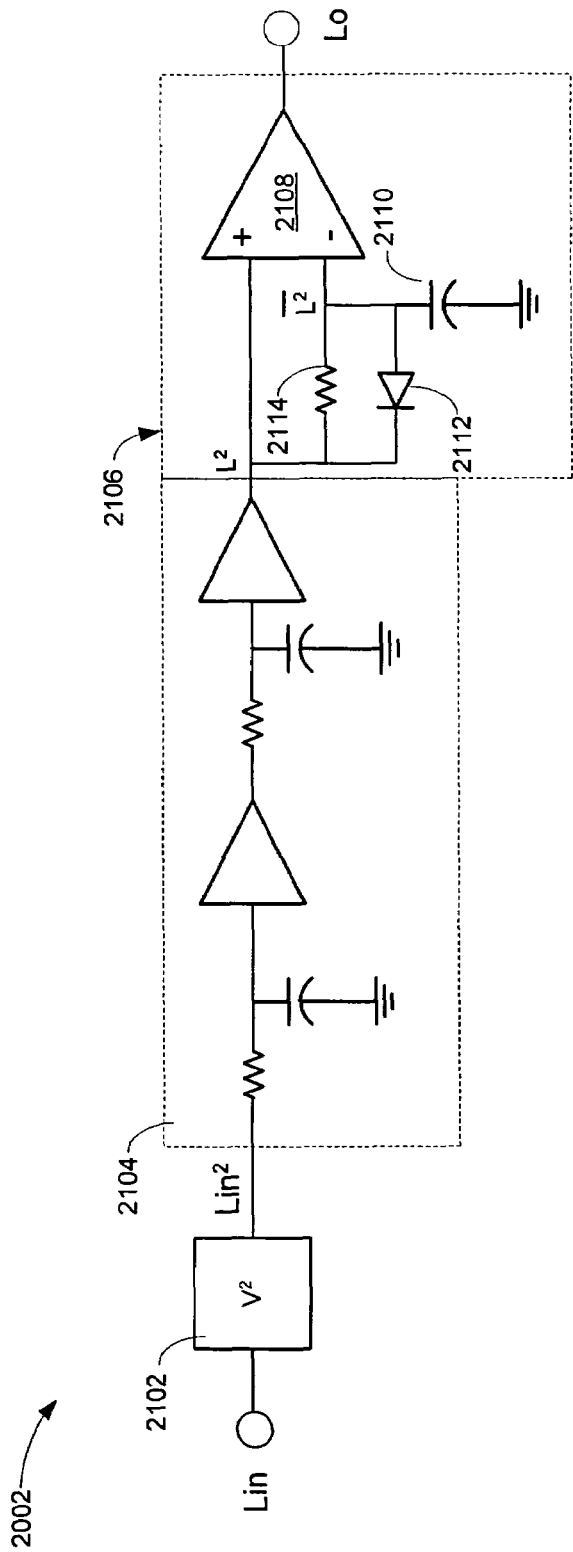
FIG. 21 is a circuit diagram of an accommodation circuit for a single input channel.

The frequency bias filter 2001 models the frequency bias of the human hearing mechanism by emphasizing frequencies in the sound field from about 500 Hz to about 4000 Hz. The accommodation circuit for a single input channel 2002 separates sound events from any background signals in the sound field by modeling accommodation. The accommodation circuit 2002 is shown in more detail in FIG. 21 and generally includes: a multiplier 2102; a low-pass filter 2104; and an accommodation signal circuit 2106. The multiplier 2102 converts the sound field, as generated in the left input channel (the input signal), into a power signal "$Lin^2$." The input signal is generally a voltage signal and can generally be converted into a power signal by being squared. The resulting power signal $Lin^2$ includes many fluctuations, some of which indicate sound events, and some of which indicate noise. In order to reduce the fluctuations due to noise, the low-pass filter removes the fluctuations with rise times faster than typical for the sound event type being detected from the power signal $Lin^2$ to produce a filtered power signal $L^2$. For example, if the sound event type being detected is a syllable, fluctuations with rise times faster than about 30 ms will be removed. The low-pass filter 2104 may be of any type, such as a filter with a roll-off of 12 dB/octave.

It is from the filtered power signal $L^2$ that the accommodation signal circuit 2106 creates and subtracts the accommodation signal (which represents the long-term average power in the sound field as it is accommodated to) to create the differential signal Lo. The accommodation signal circuit 2106 generally includes an operational amplifier 2108; a resistor 2114; a diode 2112 and a capacitor 2110. The filtered power signal $L^2$ is coupled to the positive terminal of the operational amplifier 2108 or, alternatively any device capable of determining a difference between two signals. When the filtered power signal $L^2$ does not include a sound event, capacitor 2110 will act as an open circuit resulting in an accommodation signal $\overline{L^2}$ that is about equal the filtered power signal $L^2$. Therefore, operational amplifier 2108 produces a differential signal Lo about equal to zero.

However, when the filtered power signal $L^2$ does contain a sound event, the filtered power signal $L^2$ will rapidly increase according to the rise time of the sound event. This rapid increase in $L^2$ will cause a corresponding spike in the differential signal Lo. After the rise-time of the sound event, capacitor 2110 will charge causing the accommodation signal $\overline{L^2}$ to gradually rise according to time constant defined by resistor 2114 and capacitor 2110. This time constant is generally made equal to the accommodation rate of the human hearing mechanism, determined experimentally to be about 300 ms. $\overline{L^2}$ will continue to rise until the voltage across capacitor 2110 (and thus $\overline{L^2}$) equals $L^2$ or until the sound event ends or starts to decay. This increasing $\overline{L^2}$ is subtracted from $L^2$ resulting in a gradual decay in Lo that models the accommodation property of the human hearing mechanism. When the sound event decays, the power envelope $L^2$ will quickly drop according to the fall-time of the sound event. As $L^2$ approaches the value of $\overline{L^2}$, capacitor 2110 will discharge through diode 2112 preventing the accommodation signal $\overline{L^2}$ from exceeding the filtered power signal $L^2$. This prevents the production of a negative pulse in Lo at the end of the sound event.

The differential signal Lo, therefore, includes a series of fluctuations with on-times equal to or less than those characteristic of the sound event type being detected and with fall-times defined by the accommodation signal, and/or the end of the sound event. The trigger generation circuit for a single input channel 2004 (shown in FIG. 20) then detects the sound events to produce a trigger signal Tl that includes a pulse whenever a sound event is detected. A trigger generation circuit for a single input channel 2004 is shown in more detail in FIG. 22 and includes: a high-pass filter 2202; a normalization circuit 2206, a high-pass filter 2208, and a threshold detector 2218.

The goal of the trigger generation circuit 2204 is to remove as many fluctuations caused by noise as possible and to deemphasize those that are not removed. As explained previously in connection with the sound event detection methods, this is accomplished by removing the fluctuations that have frequencies higher than those characteristic of the sound event being detected and by normalizing the differential signal Lo with the short-term high frequency power in the differential signal. Normalization is accomplished using an automatic gain control circuit which includes the high-pass filter 2202 and the normalization circuit 2206. The high-pass filter produces a high-frequency component of Lo ("HFl") and includes a capacitor/resistor pair 2216 that defines a cutoff frequency as that which is characteristic of the sound event being detected. Additionally, a rectifier (not shown) may be included between the high-pass filter 2202 and the normalization circuit 2206 to rectify any negative pulses or fluctuations. The normalization circuit 2206 includes an integrator 2210 and a divide by circuit 2212. The integrator 2210 averages the high-frequency component of Lo over a short time period defined by the integrator 2210. The short time period defined by the integrator may equal about 160 ms, however, this time period may be adjusted as a function of the type of sound field. The divide-by circuit 2212 then divides Lo by the averaged HFl to yield the normalized differential signal Nl. Additionally, a rectifier (not shown) may be included between the normalization circuit 2206 and the high-pass filter 2208 to rectify any negative pulses or fluctuations.

The normalized differential signal Nl is then filtered by a high-pass filter 2208 to remove fluctuations with frequencies higher than are characteristic of the sound event being detected to yield a filtered normalized differential signal Nl'. Although not shown, additional noise can be removed from Nl' by including circuitry that detects and removes fluctuations that occur more often than is characteristic of the sound event being detected and that remove any fluctuations that occur when a decrease in the sound field of at least 10 dB is detected. Nl', therefore, includes a series of pulses of varying amplitudes representing the occurrence of sound events and fluctuations due to noise.

In order to detect the sound events in the filtered normalized differential signal Nl', a threshold detector 2218 detects only those pulses with an amplitude greater than a threshold. This helps to distinguish pulses indicating sound events from fluctuations due to noise. The output of the threshold detector is a trigger signal "Tl" that indicates, generally by pulses, the occurrence of a sound event in the sole (left) input channel of the sound field. Alternatively, the sound event detector for a single input channel and a single sound event type may also include a threshold adjustment circuit (not shown). The threshold adjustment circuit adjusts the threshold of the threshold detector in order to adjust the sensitivity of the sound event detector. The threshold detector may allow manual adjustment of the threshold and may include a voltage source and a variable resistor coupled to the threshold detector in the trigger generation circuit. The resistance of the resistor may be manually controlled by a knob or switch or other such device to control the voltage supplied by the voltage source to the threshold detector. This voltage is used by the threshold detector to define the threshold. Alternatively, the threshold detector provides automatic adjustment of the threshold and includes (not shown) a counter coupled to the output of the trigger generation circuit and a comparator coupled to the counter and the threshold detector in the trigger generation circuit. The counter counts the number of sound events that occur in a specified time period and communicates this number to the comparator. This specified time period is generally on the order of about a few seconds. The comparator then produces a voltage, which is inversely proportional to the number of sound events and communicates this voltage to the threshold detector, which uses the voltage to define the threshold. Generally, the threshold is decreased when there are more sound events detected so that the sensitivity of the sound event detector is increased.

Figure 23:
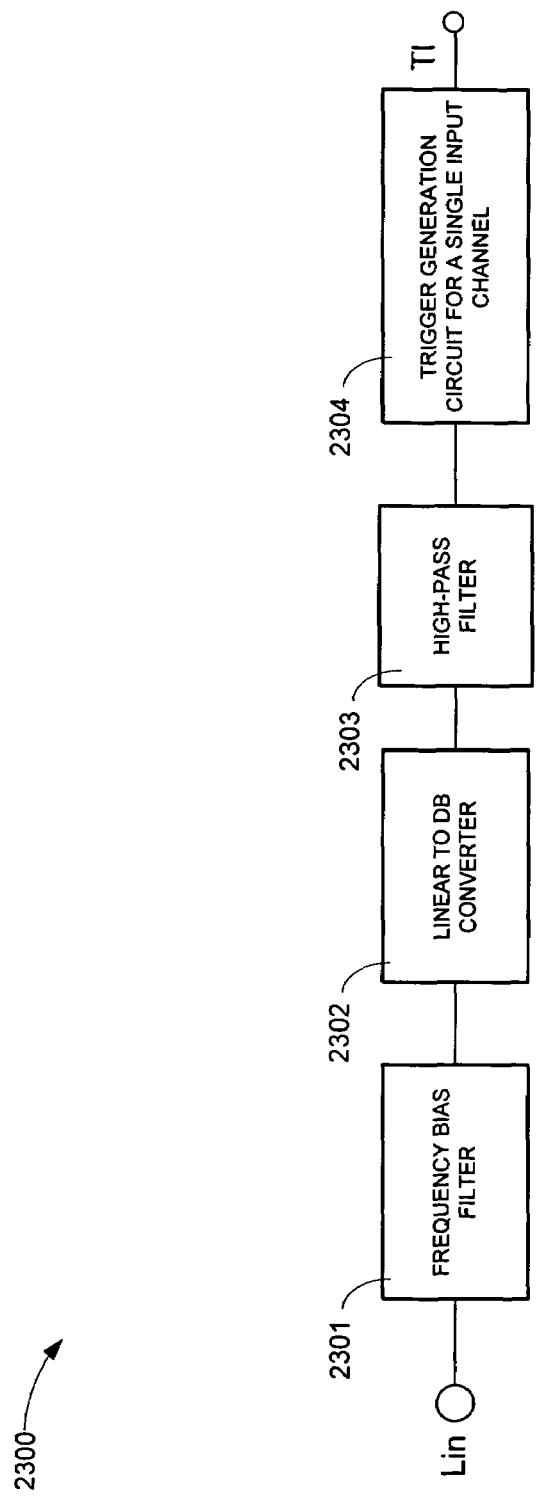
FIG. 23 is a circuit diagram of a sound event detector for a single input channel and a short-duration sound event type.

Any of the sound event detectors may not include an accommodation signal circuit, which is of particular use when detecting short-duration sound events, such as impulsive sounds. An example of a sound event detector that does not include an accommodation circuit (the "sound event detectors for short-duration sound events") is shown in FIG. 23. This sound event detector for short-duration sound events 2300 includes: a frequency bias filter 2301; a linear to dB converter 2302; a high-pass filter 2303; and a trigger generation circuit for a single input channel 2304. The frequency bias filter 2301 emphasizes the frequencies in the input signal from about 500 Hz to about 4000 Hz to produce a filtered input signal. The filtered input signal is then converted into decibels by the linear to dB converter 2302 to produce a decibel filtered input signal. The filtered decibel input signal is again filtered, this time by the high-pass filter 2303. The high-pass filter 2303 removes any fluctuations with rise-times slower than are characteristic of the short-duration sound event type being detected. The trigger generation circuit for a single input channel 2304 then uses this twice filtered decibel input signal to create a trigger signal Tl that indicates the occurrence of short-durations sound events. Alternately, the sound event detectors for short-duration sound events may also include a threshold adjustment circuit.

Figure 24:
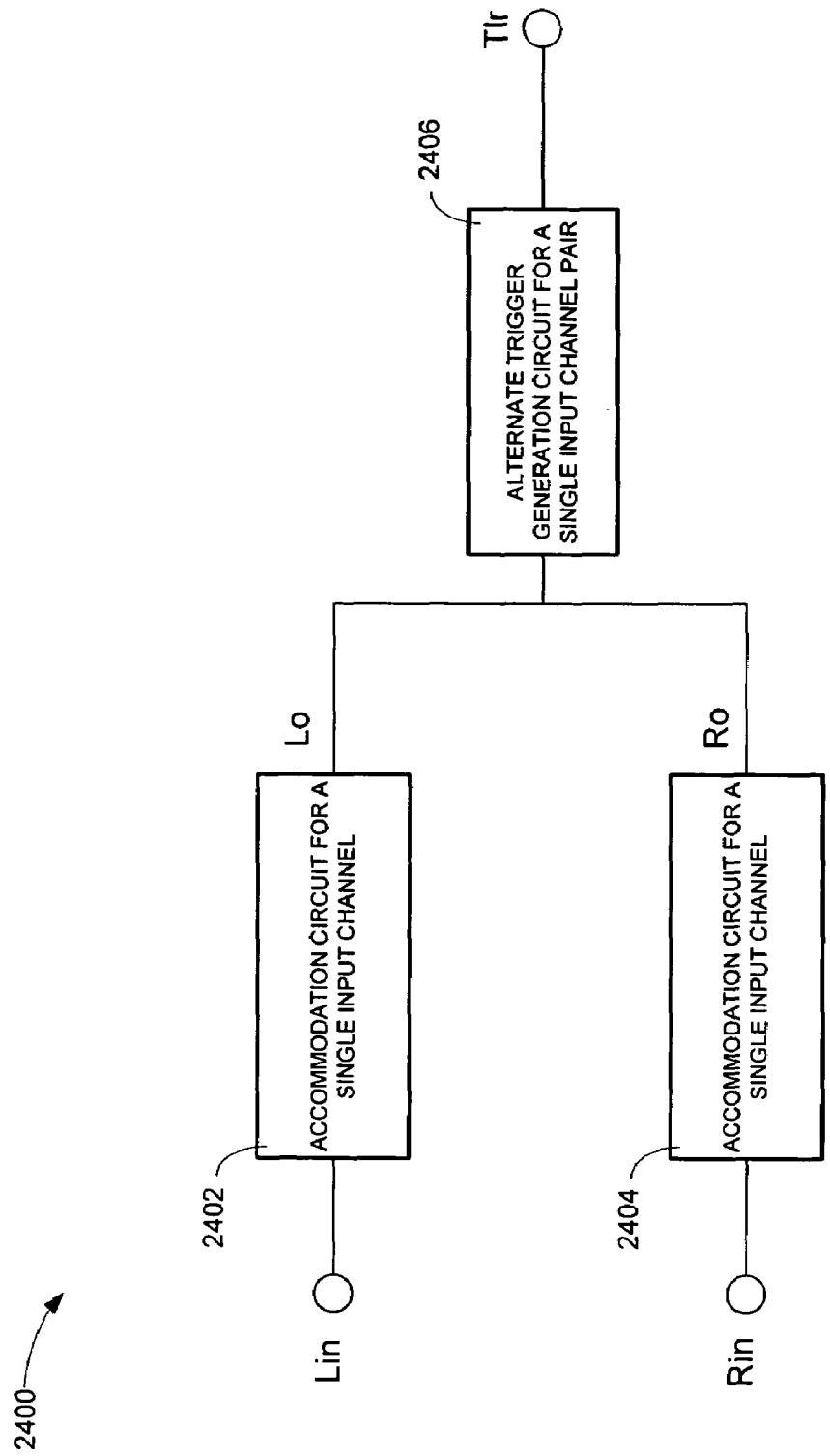
FIG. 24 is a block diagram of a sound event detector for multiple input channels and a single sound event type.

Sound event detectors may also be implemented when the sound field is generated in two or more input channels. A sound event detector that detects a single sound event type in a sound field generated in two or more input channels (a "sound event detector for multiple input channels and a single sound event type") may include a sound event detector for a single channel for each input channel so that the sound event detector produces a trigger signal for each input channel. Alternatively, the trigger signals may be combined to form a single trigger signal that indicates the occurrence of a sound event in any input channel. Alternatively, a sound event detector for multiple input channels and a single sound event type may produce only a single trigger signal for each channel pair from a difference signal. An example of a sound event detector for multiple input channels and a single sound event type is shown in FIG. 24. In this example, the entire sound field is generated in a single input channel pair including a left input channel and a right input channel. However, this method is applicable for any number of input channels or input channel pairs.

The sound event detector for multiple input channels and a single sound event type 2400 includes: a first accommodation circuit for a single input channel 2402; a second accommodation circuit for a single input channel 2404; and an alternate trigger generation circuit for a single input channel pair 2406. The first and second accommodation circuits 2402 and 2404, respectively, are generally identical. The first accommodation circuit 2402 uses the left input channel ("Lin") to produce a differential signal for the left input channel (the "left differential signal" or "Lo"). The second accommodation circuit 2404 uses the right input channel ("Rin") to produce a differential signal for the right input channel (the "right differential signal" or "Ro").

Figure 22:
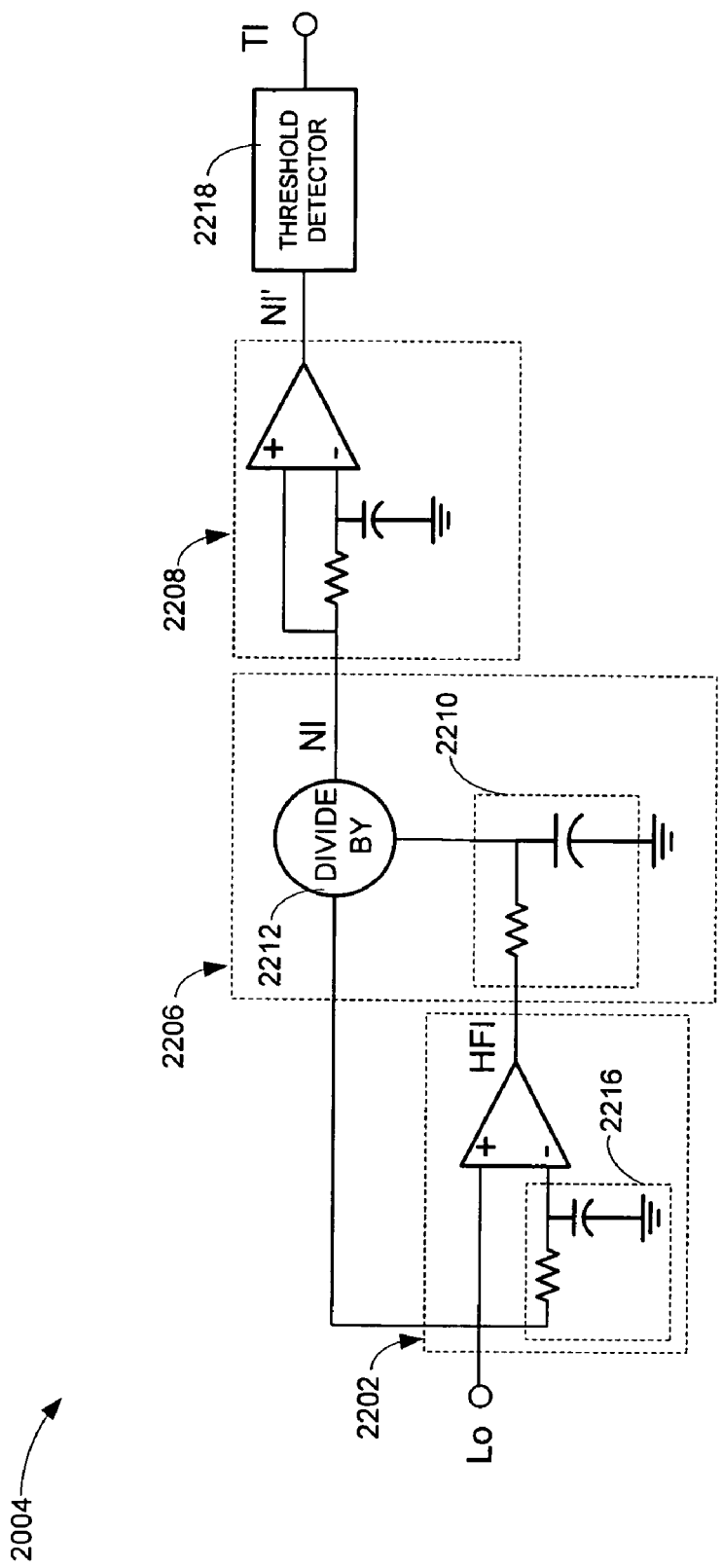
FIG. 22 is a circuit diagram of a trigger generation circuit for a single input channel.
Figure 25:
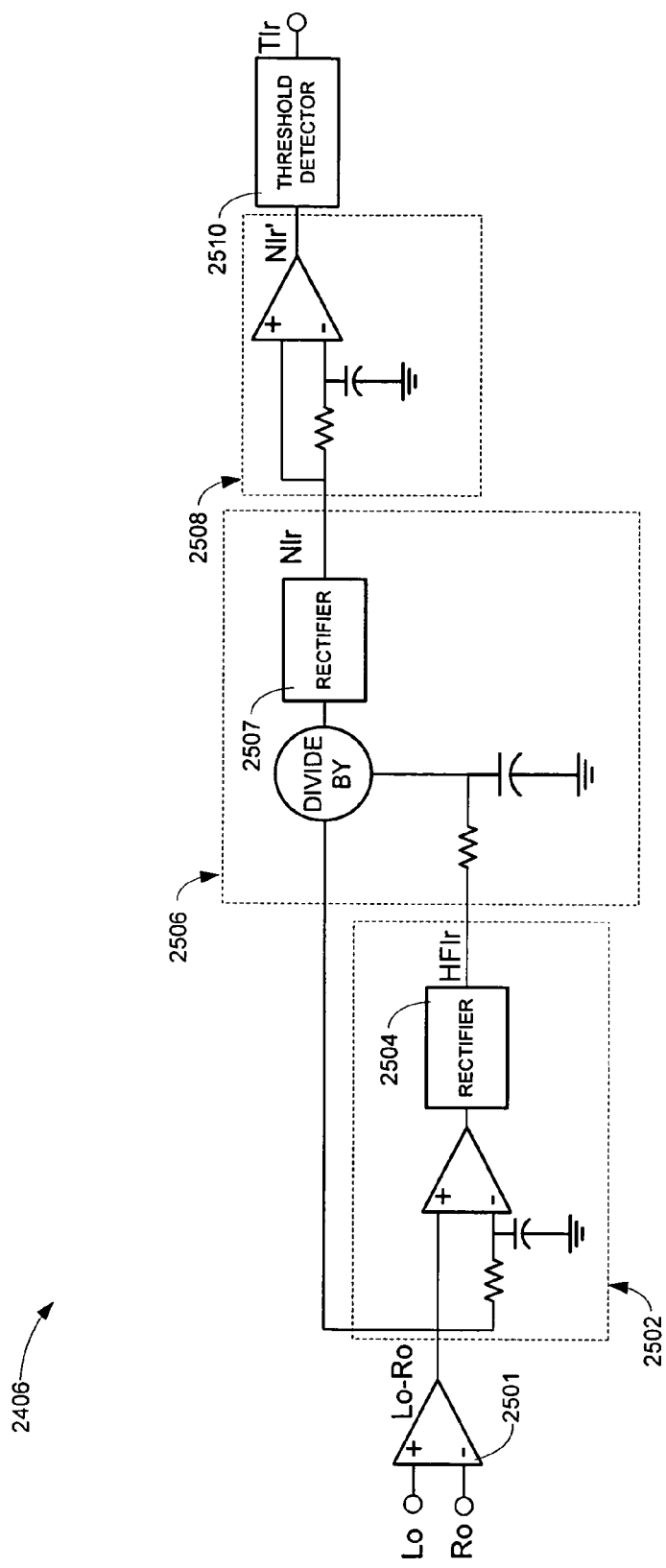
FIG. 25 is a circuit diagram of an alternate trigger generation circuit for multiple input channel pairs.

The alternate trigger generation circuit for a single input channel pair 2406 uses both the right and left differential signals to produce a trigger signal that indicates the occurrence of sound events in either input channel (the "left-right trigger signal" or "Tlr"). The trigger generation circuit for a single input channel pair 2406 is shown in more detail in FIG. 25 and includes: an operational amplifier 2501; a rectified high-pass filter 2502; a rectified normalization circuit 2506; a low-pass filter 2508 and a threshold detector 2510. Although similar to the trigger generation circuit for a single input channel (as shown in FIG. 22), the trigger generation circuit for a single input channel pair 2406 also includes an operational amplifier 2501 (or other device capable of determining a difference) that creates a signal equal to the difference between the left and right differential signals (the "left-right difference signal" or "Lo-Ro") and uses the left-right difference signal to create a trigger signal for the left-right input channel pair (the "left-right trigger signal" or "Tlr"). Although, in this example, the left-right difference signal is obtained by subtracting Ro from Lo, it may alternatively be determined by subtracting Lo from Ro. The left-right difference signal Lo-Ro includes a series of pulses and other fluctuations that indicated the occurrence of sound events and noise in either input channel of the input channel pair. However, because fluctuations that occur equally in both input channels are removed, many fluctuations due to noise are removed. The pulses and fluctuations in the difference signal may have a positive or a negative amplitude depending on whether the power in the transient is greater in the left input channel or the right input channel, respectively.

In order to produce a trigger signal that includes only positive pulses, a first rectifier 2504 is included in the rectified high-pass filter 2502 and a second rectifier 2507 is included in the normalization circuit 2506. The rectified high-pass filter 2502 produces a rectified high-pass left-right difference signal ("HFlr"). This rectified high-pass left-right difference signal is used by the normalization circuit 2506 to normalize the difference signal Lo-Ro, the result of which is rectified by the second rectifier 2507 to produce a normalized left-right signal ("Nlr"). The low-pass filter 2508 removes fluctuations due to noise with rise-times faster than those characteristic of the sound event type being detected to produce a filtered normalized left-right signal ("Nlr'"). Just as in the trigger generation circuit for a single input channel, additional noise can be removed from Nlr' by including circuitry that detects and removes fluctuations that occur more often than is characteristic of the sound event being detected and that remove any fluctuations that occur when a decrease in the sound field of at least 10 dB is detected (not shown). Nlr', therefore, includes a series of positive pulses of varying amplitudes representing the occurrence of sound events and fluctuations due to the remaining noise. The threshold detector 2510 then detects the sound events as those pulses that have an amplitude greater than a threshold to create the left-right trigger signal Tlr.

The sound event detector 2400 (FIG. 24) may be repeated in parallel for multiple input channel pairs to produce a trigger signal for each input channel pair. Alternatively, this sound event detector for multiple input channels and a single sound event 2400 may also include a threshold adjustment circuit for each trigger generation circuit. The sound event detectors for multiple input channels and a single sound event implemented to produce one or more trigger signals for each channel pair may also be referred to as "sound event detectors for a single channel pair and a single sound event type." Additionally, any of the sound event detectors for multiple input channels (or a single input channel pair) and a single sound event may include a threshold adjustment circuit for each trigger generation circuit.

Figure 26:
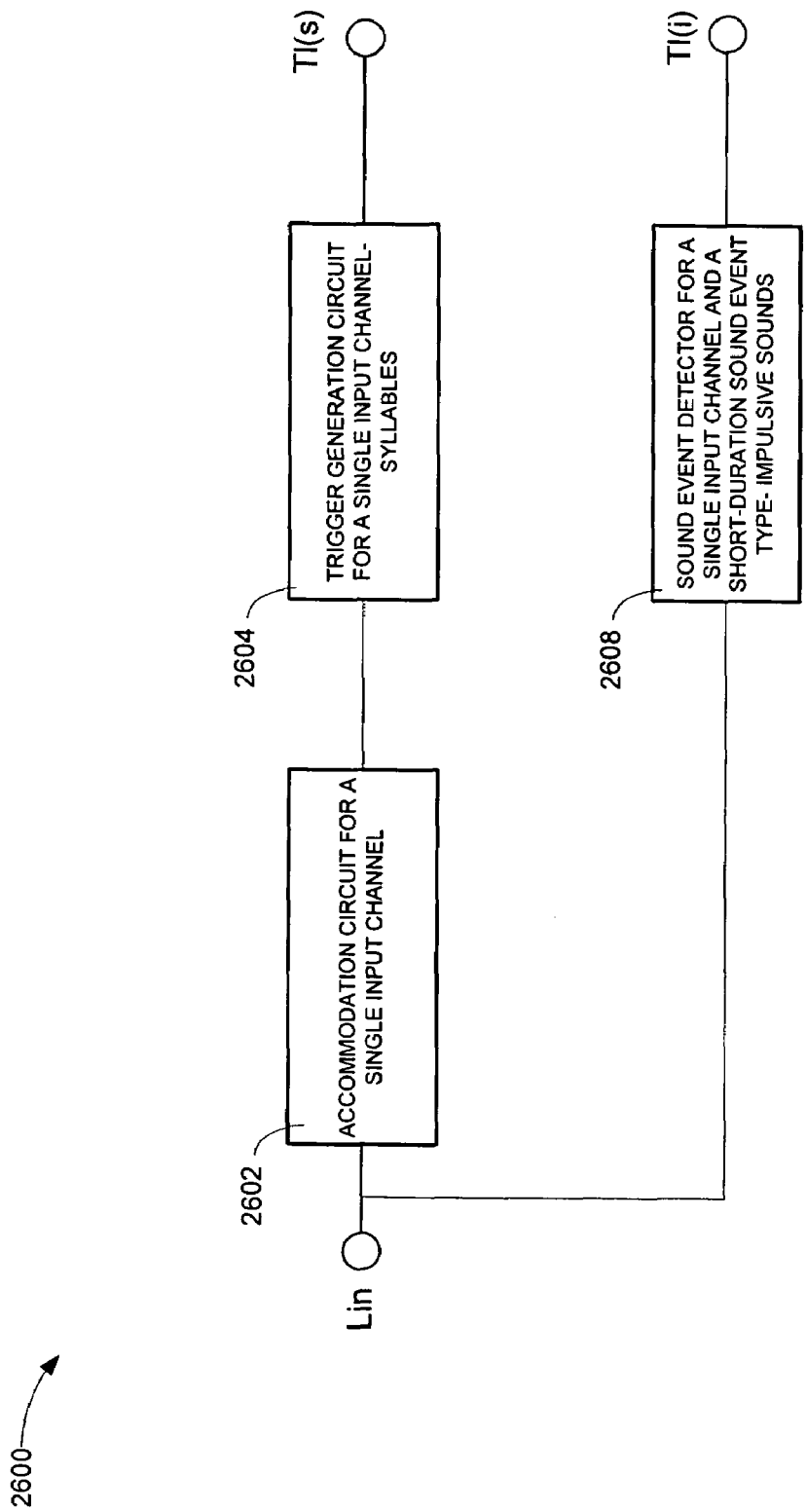
FIG. 26 is a block diagram of a sound event detector for a single input channel and multiple sound event types.

Sound event detectors may also be implemented so that more than one type of sound event is detected. These "sound event detectors for a single input channel and multiple sound event types" generally include a sound event detector for a single input channel and a single sound event type implemented in parallel for each sound event type being detected to produce a trigger signal for each sound event type being detected. An example of such a sound event detector for a single input channel and multiple sound event types is shown in FIG. 26 and indicated by reference number 2600. In this example, the entire sound field is generated through a left input channel. The term "left" as used in this example, does not have any directional meaning because the entire sound field is contained in a single input channel and, in fact, the input channel can be given any designation. Also, in this example, the sound event detector for a single input channel and multiple sound event types 2600 is implemented to detect syllables and impulsive sounds. However, any number or combination of sound events may be detected.

In this example, the sound event detector for a single input channel and multiple sound event types 2600 generally includes: an accommodation circuit for a single input channel 2602; a trigger generation circuit for a single input channel implemented for syllables 2604; and a sound event detector for a single input channel and a single short-duration sound event implemented for impulsive sounds 2608. The accommodation circuit for a single input channel 2602 uses the input signal Lin to produce a differential signal. The trigger generation signal for a single input channel implemented to detect syllables 2604 uses the differential signal to produce a trigger signal that indicates the occurrence of syllables in the sole input channel (left) of the sound field ("Tl(s)"). The trigger generation signal for a single input channel implemented to detect syllables 2604 includes filters (see FIG. 22) for which the rise time at the cut-off frequency is about 33 ms. The sound event detector for a single short-duration sound event type implemented to detect impulsive sounds 2608 uses the input signal Lin to produce a trigger signal that indicates the occurrence of impulsive sounds in the sole input channel (left) of the sound field ("Tl(i)"). This sound event detector for a single short-duration sound event type implemented to detect impulsive sounds 2608 includes a high-pass filter (see 2303 in FIG. 23) for which the rise time at the cut-off frequency is about 3 ms. Alternatively, the sound event detectors for a single input channel and multiple sound event types may include a threshold adjustment circuit for each trigger generation circuit.

Figure 27:
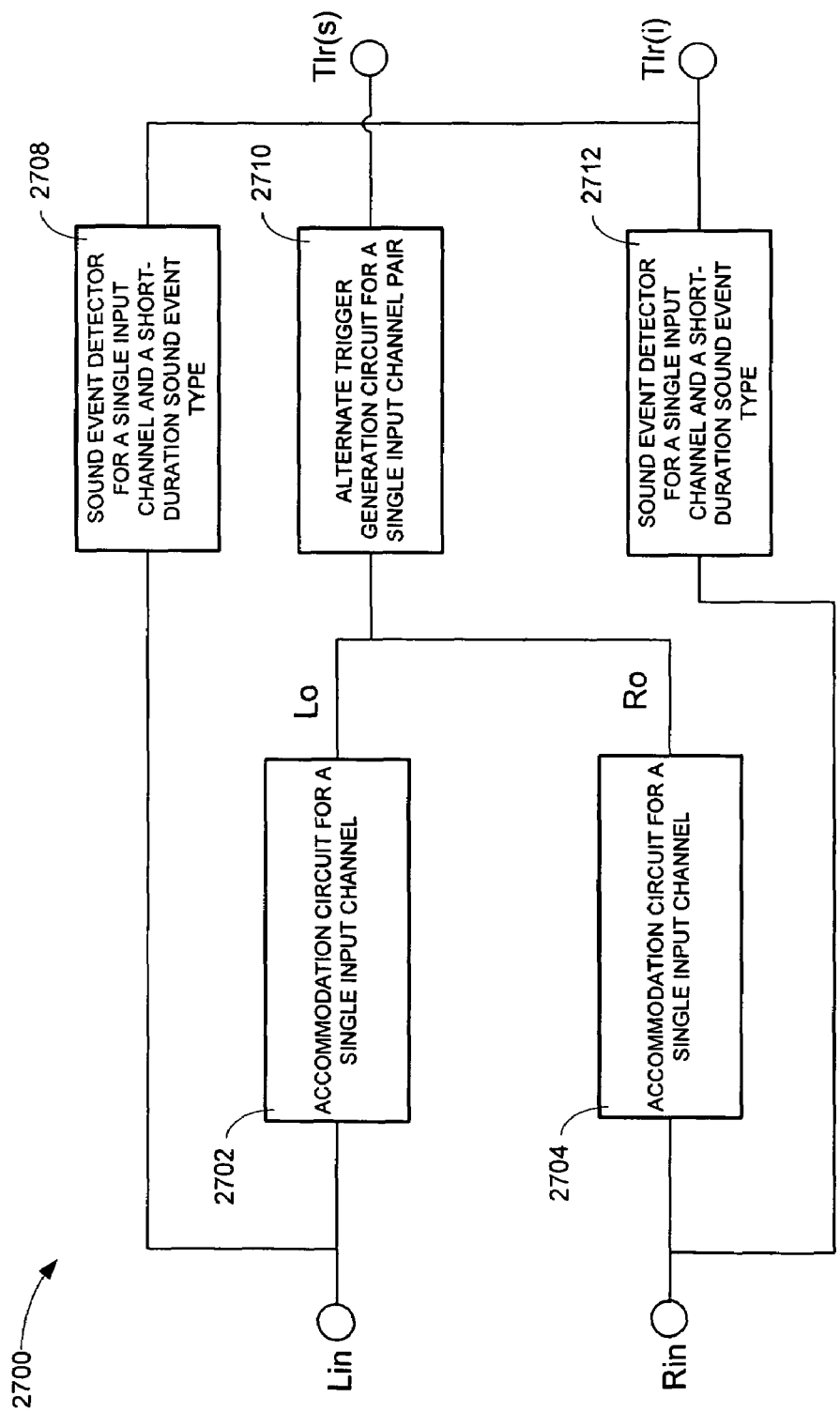
FIG. 27 is a block diagram of a sound event detector for multiple input channels and multiple sound event types.

Sound event detectors may also be implemented so that more than one type of sound event is detected in more than one input channel. These "sound event detectors for multiple input channels and multiple sound event types" may produce a trigger signal for each sound event type in each input channel pair. Alternatively, trigger signals in each channel pair may be combined in almost any manner to reduce the number of trigger signals. An example of such a sound event detector for multiple input channels and multiple sound event types is shown in FIG. 27 and indicated by reference number 2700. In this example, the entire sound field is either detected in or reproduced through a left and a right input channel. However, the method may be implemented for any number and combination of input channels. Additionally, in this example, the sound event detector for multiple input channels and multiple sound event types 2700 is implemented to detect syllables and impulsive sounds. However, any number or combination of sound events may be detected.

The sound event detector for multiple input channels and multiple sound event types 2700 generally includes, a first accommodation circuit for a signal input channel 2702; a second accommodation circuit for a signal input channel 2704; a first sound event detector for a single input channel and a short-duration sound event type 2708; an alternate trigger generation circuit for a single input channel pair 2710; and a second sound event detector for a single input channel and a short-duration sound event type 2712.

The first and second accommodation circuits for a single channel 2702 and 2703, respectively, may be identical to each other. The first accommodation circuit for a single input channel 2702 produces a differential signal for the left input channel "Lo." The second accommodation circuit for a single input channel 2704 produces a differential signal for right input channel "Ro." The alternate trigger generation circuit for a single channel pair 2710 uses Lo and Ro to produce a trigger signal that indicates the occurrence of syllables in the left-right channel pair Tlr(s). The alternate trigger generation circuit for a single channel pair 2710 (an example of which is shown in more detail in FIG. 25, indicated by reference number 2406) includes filters with a rise time at the cut-off frequency of about 33 ms. The first and second sound event detector for a single input channel and short-duration sound event type 2708 and 2712, respectively, use Lin and Rin, respectively, to produce a trigger signal indicating the occurrence of impulsive sounds in the left and right input channels, respectively. These trigger signals may then be combined to produce a single trigger signal indicating the occurrence of trigger signals in the left-right input channel pair. Both the first and second sound event detectors for a single input channel and a short-duration sound event type 2708 and 2712, respectively, include a high-pass filter (for example, see 2303 in FIG. 23) with a rise time at the cut-off frequency of about 3 ms.

Alternatively, the sound event detector for multiple input channels and multiple sound event types includes a sound event detector for a single input channel and a single sound event type implemented in parallel for each sound event type being detected in each input channel. This sound event detector produces a trigger signal for each sound event in each input channel. Alternatively, the sound event detector for multiple input channels and multiple sound event types may include a sound event detector for a single input channel and multiple sound event types implemented in parallel for each input channel. This sound event detector for multiple input channels and multiple sound event types also produces a trigger signal for each sound event in each input channel. Alternatively, any of the sound event detectors for multiple input channels and multiple sound event types may also include a threshold adjustment circuit for each trigger generation circuit.

7. Sound Event Detectors and Localizers

The properties of the human hearing mechanism have been modeled to create electronic circuitry that detects and localizes sound events in the presence of a background signal (collectively, "sound event detectors and localizers"). Sound event detectors and localizers, like the sound event detection and localization methods, determine the direction of sound events in relation to one or more input channel pairs in terms of a differential steering angle or an ordinary steering angle and in some cases, verify the accuracy of the steering angles.

Also, like the sound event detection and localization methods, the sound event detectors and localizers can be implemented to detect any number and combination of sound event types in a sound field generated in any number of input channels. In the following description, the sound event detectors and localizers are discussed in order of increasing complexity, with each subsequent sound detector and localizer incorporating the elements of the prior sound event detectors and localizers, except as indicated.

Figure 28:
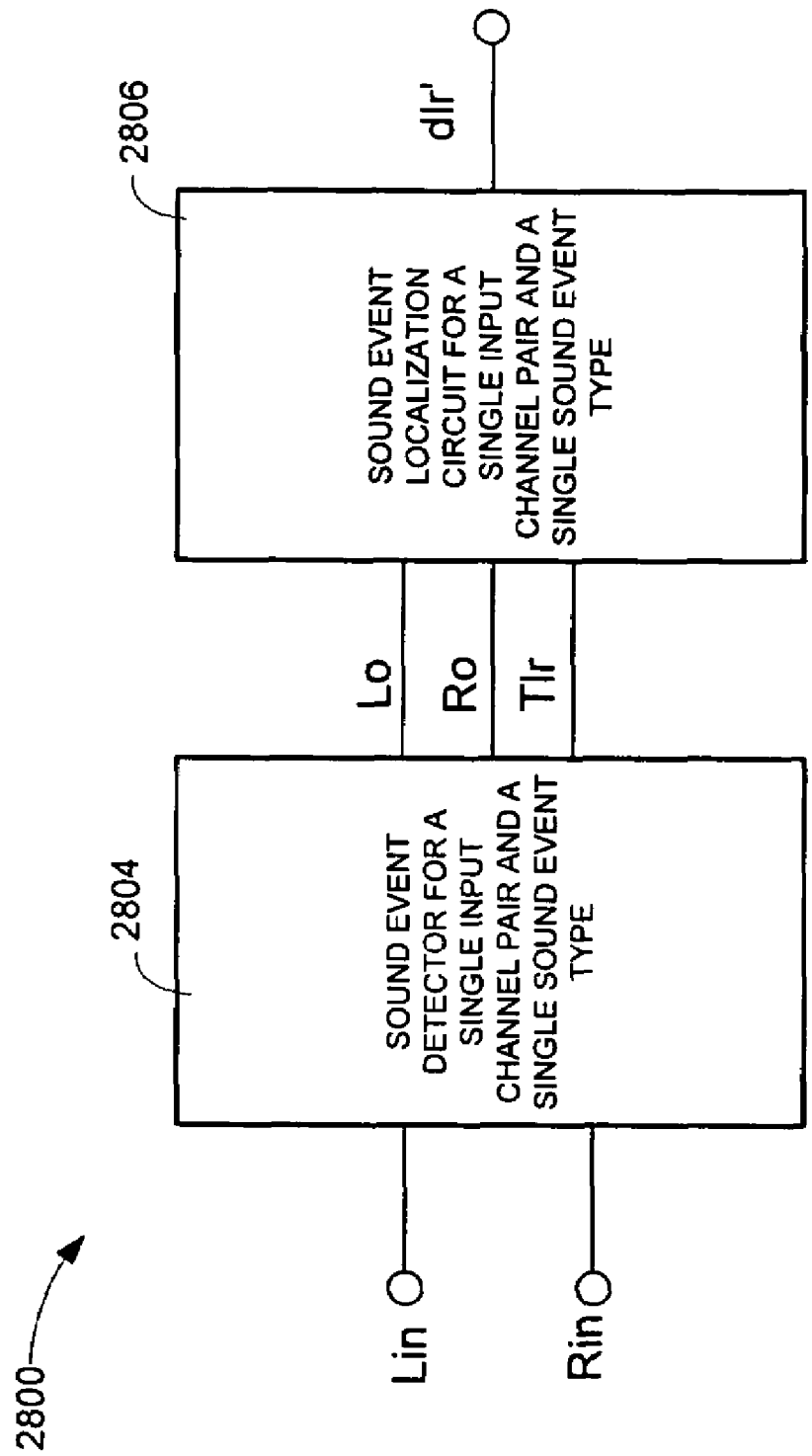
FIG. 28 is a block diagram of a sound event detector and localizer for a single input channel pair and a single sound event type.

One example of a sound event detector and localizer implemented to detect a single sound event type in a single input channel pair is shown in FIG. 28 (a "sound event detector and localizer for a single input channel pair and a single sound event type"). In this example, sound events are detected and localized with respect to a right input channel and a left input channel. However this method is applicable to any combination of input channels with left and right being used here solely for the purposes of explanation. The sound event detector and localizer for a single input channel pair and a single sound event type 2800, shown in FIG. 28 generally includes: a sound event detector for a single input channel and a single sound event type 2804; and a sound event localization circuit for a single input channel pair and a single sound event type 2806.

The sound event detector for a single input channel pair and a single sound event type 2804 includes any of the sound event detectors for multiple input channels and a single sound event that and is implemented for whatever sound event type is being detected. The sound event detector for a single input channel pair and a single sound event type 2804 uses the left input signal Lin and a right input signal Rin to produce a differential signal for the left input channel Lo, a differential signal for the right input channel Ro, and a trigger signal that indicates the occurrence in either input channel of whatever sound event type is being detected Tlr. The sound event localization circuit for a single input channel pair and a single sound event type 2806 then uses Lo, Ro and Tlr to produce a true differential steering angle indicating the direction of the detected sound events relative to the right and left input channel dlr'.

Figure 29:
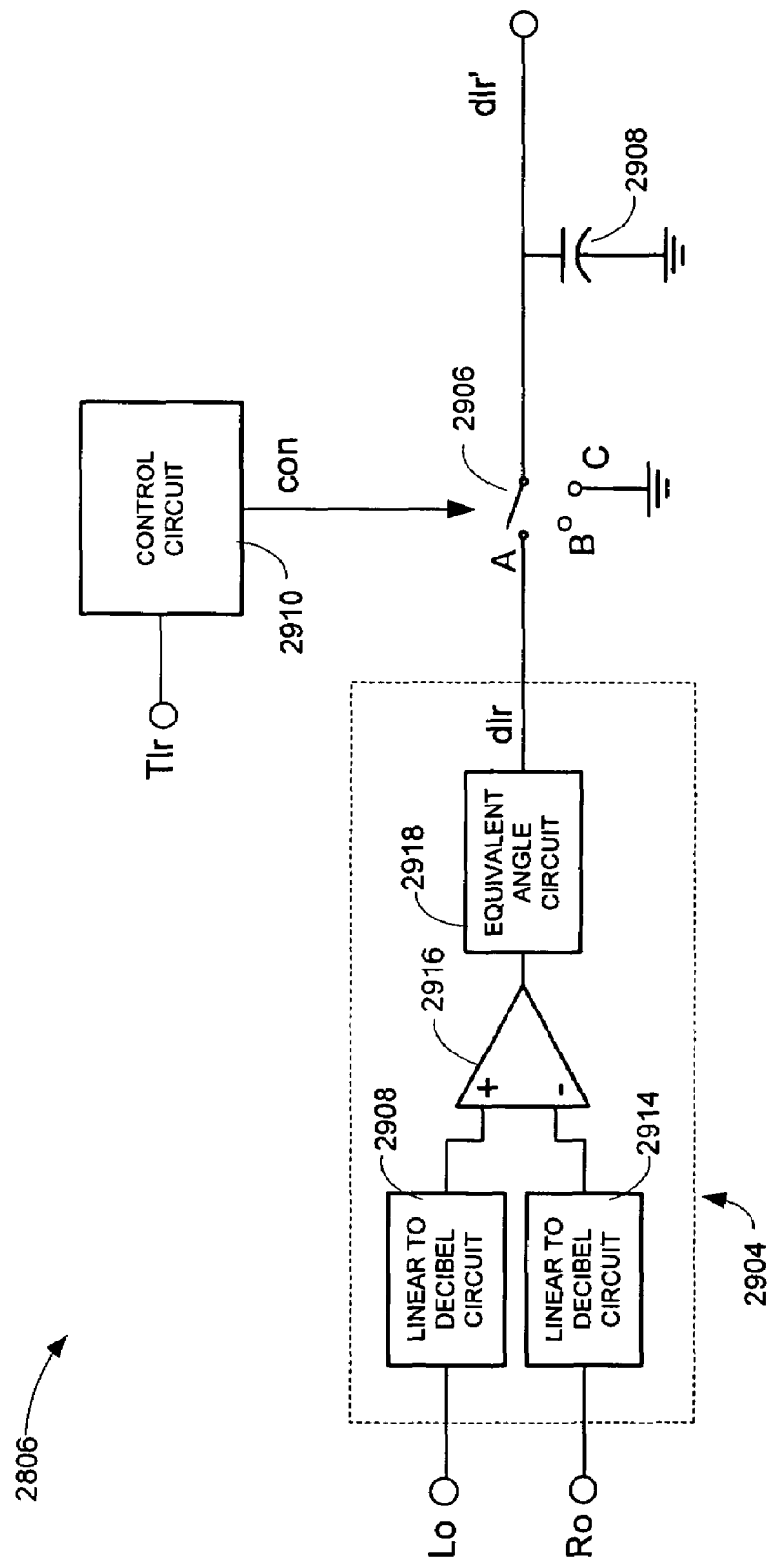
FIG. 29 is a circuit diagram of a sound event localization circuit for a single input channel pair and a single sound event type.

The sound event localization circuit for a single input channel pair and a single sound event type 2806 is shown in more detail in FIG. 29 and generally includes a DSA circuit 2904, a switch 2906; a capacitor 2908; and a control circuit 2910. The DSA circuit 2904 uses the left accommodation signal Lo and the right accommodation signal Ro to determine the differential steering angle dlr. The DSA circuit 2904 includes a first linear to decibel circuit 2908; a second linear to decibel circuit 2914; an operational amplifier 2916 and a decibel to equivalent angle circuit 2918. The first and second linear to decibel circuits 2908 and 2914, respectively, convert the left and right accommodation signals, respectively, from a power signal into a decibel signal. The operational amplifier 2916 (or alternatively, any circuit that can determine a difference) determines the ratio between the left and right decibel signals by determining the difference between the two signals. This ratio is then converted into an equivalent angle by the decibel to equivalent angle circuit 2918 to produce the differential steering angle dlr.

The control circuit 2910, the switch 2906 and the capacitor 2908 generally form a sample-and-hold circuit and can therefore be replaced with any device or circuit that performs a similar function. In general, when a sound event is detected, the control circuit 2910 causes the switch 2906 to close and the capacitor 2908 to capture dlr during the rise time of the sound event. In this manner, the sound event localization circuit 2806 produces the true DSA ("dlr'") for the typical duration of the sound event type being detected. More specifically, the control circuit 2910 receives the trigger signal Tlr and produces a control signal "con" that controls switch 2906. Switch 2906 is a three position switch and is generally in position C when no sound events are detected. When in position A, the switch 2906 is closed, when in position B, the switch is open, and when in position C, the switch 2906 is grounded. When the control circuit 2910 receives an indication from trigger signal Tlr that a sound event is occurring, it communicates to switch 2906 via a signal "con" a command to close (go to position A). In response, the switch 2906 closes. At the end of the rise-time typical for the sound event type being detected, the control circuit 2910 communicates to switch 2906 via con a command to open (go to position B). After the typical duration of the sound event type being detected, the control circuit 2910, communicates to switch 2906 a command via con to go to ground (go to position C). During the time that switch 2906 is closed (the rise-time of the sound event), the left-right differential steering angle dlr is captured by the capacitor 2908 to create the true DSA dlr'. The true DSA is held until the end of the typical duration of the sound event, even if the sound event has not actually ended. For example, if the sound event being detected is a syllable, the true DSA will be held for about 50 ms to about 200 ms, preferably about 150 ms. In another example, if the sound event being detected is an impulsive sound, the true DSA will be held for about 50 ms. At the end of the typical duration of the sound event type being detected, the capacitor is grounded through switch C causing the voltage held by capacitor 2908, and thus dlr', to go to zero. The capacitor 2908 is chosen so that it can sufficiently capture dlr during the rise time of the sound event being detected. For example, if the sound event being detected is a syllable, the capacitor must be able to capture dlr in 20 ms to about 30 ms. In another example, if the sound event being detected is an impulsive sound, the capacitor must be able to capture dlr in about 5 ms.

Alternatively, the sound event detector and localizer for a single input channel pair and a single sound event type is optimized for sound events with very short durations such as impulsive sounds. In some cases, it is very difficult to obtain an accurate DSA for short-duration sound events. Therefore it is beneficial to use an average of the directions of all the short-duration sound events that occur in a given time period (generally, about 3 ms) as the direction for all the short-duration sound events in that time period. Therefore, this optimized sound event detector and localizer for a single input channel pair and a single sound event type further includes a circuit for determining the average DSA of all sound events detected in an about 3 ms time frame (the "DSA averaging circuit"). The DSA averaging circuit is generally implemented in the sound event localization circuit 2806 between the DSA circuit 2904 and the switch 2906.

Figure 30:
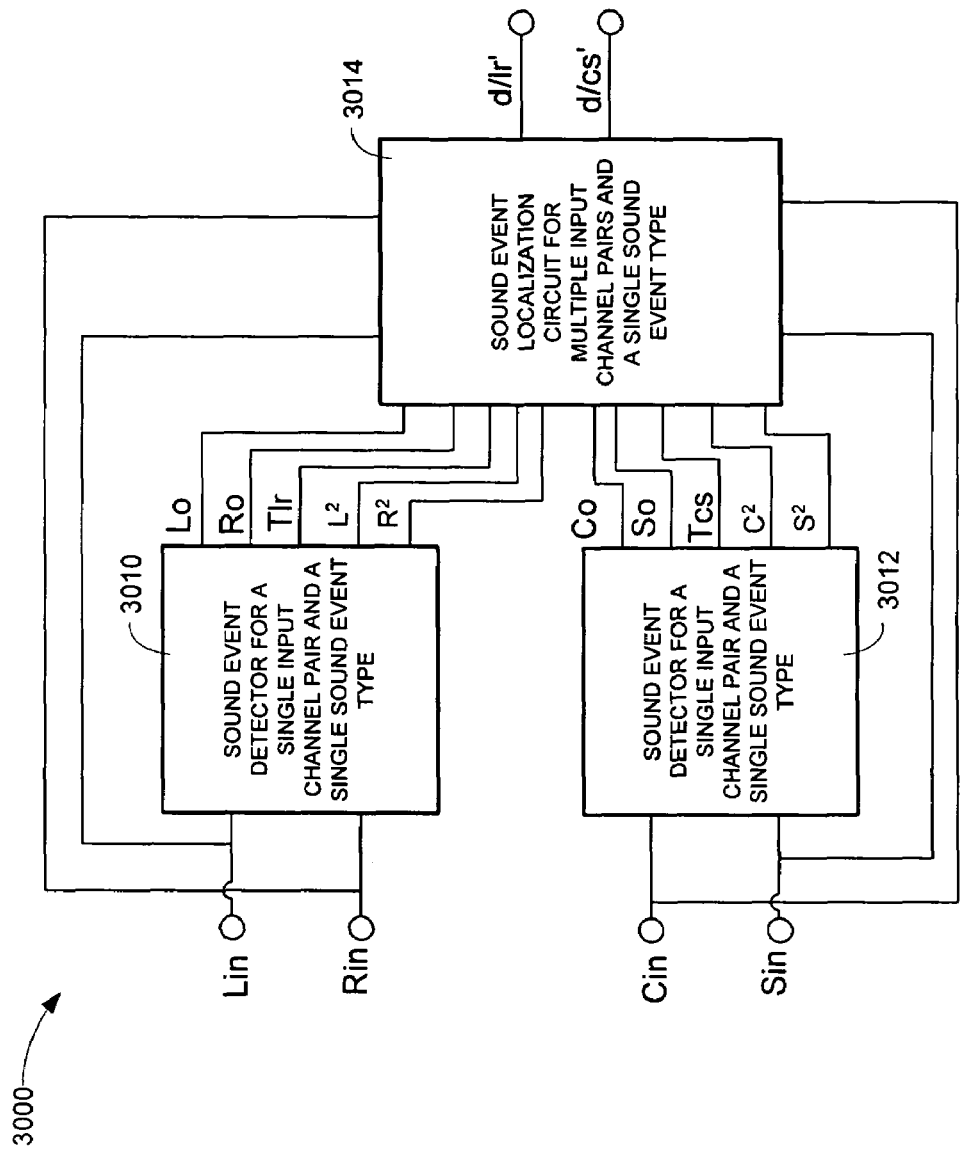
FIG. 30 is a block diagram of a sound event detector and localizer for multiple input channel pairs and a single sound event type.

The sound event detector and localizer may also be implemented to detect a single sound event type in a sound field generated in multiple input channel pairs (a "sound event detector and localizer for multiple input channel pairs and a single sound event type"). An example of a sound event detector and localizer for multiple input channel pairs and a single sound event type implemented to detect and localize a single sound event in both a right-left input channel pair ("LR input channel pair") and a center-surround input channel pair ("CS input channel pair") is shown in FIG. 30 and designated by reference number 3000. This detector and localizer may be implemented for any combination of input channel pairs with the LR input channel pair and the CS input channel pair used in this instance only for the purpose of example. The sound event detector and localizer for multiple input channel pairs and a single sound event type 3000 produces an angle indicating the direction in the LR input channel pair and the CS input channel pair, and generally includes: a first and second sound event detector for a single input channel pair and a single sound event 3010 and 3012, respectively; and a sound event localization circuit for multiple input channel pairs and a single sound event type 3014.

The first and second sound event detectors for a single input channel pair and a single sound event type 3010 and 3012 are both implemented to detect the same sound event. The first sound event detector for multiple input channels 3010 uses the input signals in the left and right input channels, Lin and Rin, respectively, to produce a left differential signal Lo, a right differential signal Ro, a left power envelope $L^2$, a right power envelope $R^2$, and a left-right trigger signal Tlr. Similarly, the second sound event detector for multiple input channels 3012 uses the input signals in the center and surround input channels, Cin and Rin, respectively, to produce a center differential signal Co, a surround differential signal So, a center power envelope $C^2$, a surround power envelope $S^2$, and a center-surround trigger signal Tcs.

The sound event localization circuit for multiple input channel pairs and a single sound event type 3014 uses the left differential signal Lo, the right differential signal Ro, and the trigger signals to produce an angle indicating the direction of a detected sound event that equals either a true OSA or a true DSA for the left-right input channel pair (the "left-right sound event angle" or "d/lr'"), and the center differential signal Co, the surround differential signal So and the trigger signals to produce an angle indicating the direction of a detected sound event that equals either a true OSA or a true DSA for the center-surround input channel pair (the "center-surround sound event angle" or "d/cs'"). Additionally, circuit 3014 may use all the power envelopes, dlr and dcs to verify the accuracy of the DSA. The sound event localization circuit for multiple input channel pairs and a single sound event type 3014 is shown in more detail in FIG. 31 and generally includes: a first OSA circuit 3102; a first DSA circuit 3104; a second DSA circuit 3106; a second OSA circuit 3108; a verification circuit 3116; a control circuit 3118; a first two-position switch 3110; a first three-position switch 3112; a first capacitor 3114; a second two-position switch 3120; a second three-position switch 3122; and a second capacitor 3124.

d/lr' is produced by the first OSA circuit 3102, first DSA circuit 3104, first two-position switch 3110, first three-position switch 3112 and the first capacitor 3114. Similarly, d/cs' is produced by the second OSA circuit 3108, second DSA circuit 3106, second two-position switch 3120, second three-position switch 3122 and the second capacitor 3124. The first and second OSA circuits 3102 and 3108, respectively, convert Lin and Rin, and Cin and Sin, respectively, into ordinary steering angles, "lr" and "cs," respectively, using known methods. The control circuit 3118, the first three-way switch 3112, and the first capacitor 3114 form a first sample and hold circuit, while the control circuit 3118, the second three-way switch 3122, and the second capacitor 3124 form a second sample and hold circuit. Both the first and second three way switches 3112 and 3122, respectively, are normally in position C when no sound events are detected and controlled by the control circuit 3118 so that each switch 3112 and 3122 is closed when a sound event is detected (moved to position A), opened at the end of the typical rise time of the sound event type being detected (moved to position B) and grounded at the end of the typical duration of the sound event type being detected (move to position C). The control circuit 3118 produces a control signal "con" that is communicated to the three-way switches 3112 and 3122. The control signal causes the three-way switches 3112 and 3122 to move to (or stay in) position A whenever either trigger signal (Tlr or Tcs) indicates that a sound event is being detected in either input channel pair. Subsequently, con causes the three-way switches 3112 and 3122 to move to position B at the end of the typical duration of the rise-time of the sound event type being detected. Then con causes the three-way switches 3112 and 3122 to move to position C at the end of the typical duration of the sound event type being detected.

Both two-way switches 3110 and 3120 include positions D and E. When a sound event is detected and both two-way switches 3110 and 3120 are in position D, the DSA for each channel pair is used to indicate the direction of the sound event. However, when a sound event is detected and both two-way switches 3110 and 3120 are in position E, the OSA for each channel pair is used to indicate the position of the sound event. The verification circuit 3116 controls both two-way switches 3110 and 3120 via a verification signal "vs" according to whether the DSAs are correct when a sound event is detected. When either trigger signal (Tlr or Tcs) indicates that a sound event is being detected, the verification circuit determines whether at least two of the power envelopes ($L^2$, $R^2$, $C^2$, $S^2$) have dropped by at least 3 dB or more. If at least two of the power envelopes have dropped by at least 3 dB or more from the last sound event, the verification circuit will communicate to both two-way switches 3110 and 3120 via vs causing them to move or stay in position E. However, if at least two of the power envelopes have not dropped by at least 3 dB or more, the verification circuit will communicate to both two-way switches 3110 and 3120 via vs causing them to move or stay in position D.

Alternatively, the verification circuit of the sound event localization circuit 3116 also includes a circuit for performing a consistency check (a "consistency check circuit"). The consistency check circuit is coupled to both DSA circuits and uses the differential steering angles produced by each to make a further determination of the accuracy of the differential steering angles. The consistency check circuit uses a known circuit for determining the sum of the absolute values of dlr and dcs at the moment any trigger signal indicates that a sound event has been detected and then determines whether the sum is less than or equal to 45 degrees. If the sum is less than or equal to 45 degrees, and at least two of the power envelopes have not dropped by about 3 dB or more, the verification signal will communicate to both of the two-way switches 3110 and 3120 causing then to move to position D.

Furthermore, additional circuitry may be added to adjust the degree of accommodation (an "accommodation adjustment circuit") and the threshold as a function of the consistency check (an "error threshold circuit"). Both the accommodation adjustment circuit and the error threshold circuit (not shown) are coupled to the consistency check circuit and include a counter that counts the number of errors detected by the consistency check in a time period of about several seconds. The accommodation adjustment circuit is also coupled to the accommodation signal in the accommodation circuits and further includes an accommodation voltage source that is adjusted according to the number of errors counted by the counter. As the number of errors increases, the voltage produced by the accommodation voltage source will increase to reduce the degree of accommodation. In contrast, the error threshold circuit is also coupled to the threshold detector in the trigger generation circuits and further includes an error voltage source that is adjusted according to the number of errors counted by the counter. As the number of errors increases, the voltage produced by the error voltage source will increase to cause the threshold voltage to increase so that fewer sound events are detected.

The sound event detector and localizer may also be implemented to detect multiple sound event types in a sound field generated in a single input channel pair (a "sound event detector and localizer for a single input channel pair and multiple sound event types"). A sound event detector and localizer for a single input channel pair and a multiple sound event types generally includes a sound event detector and localizer for a single input channel pair and a single sound event type implemented in parallel for each sound event type being detected to produce a differential steering angle for each sound event type in the input channel pair. Alternatively, the sound event detector and localizer for a single input channel pair and multiple sound event types may include a sound event detector for a single channel pair and a single sound event type implemented for each sound event type being detected and a sound event localization circuit for a single channel pair and a single sound event type that produces a differential steering angle indicating the direction of all types of sound events being detected. An example of such a sound event detector and localizer for a single input channel pair and multiple sound event types that detects syllables and impulsive sounds is shown in FIG. 32.

Figure 32:
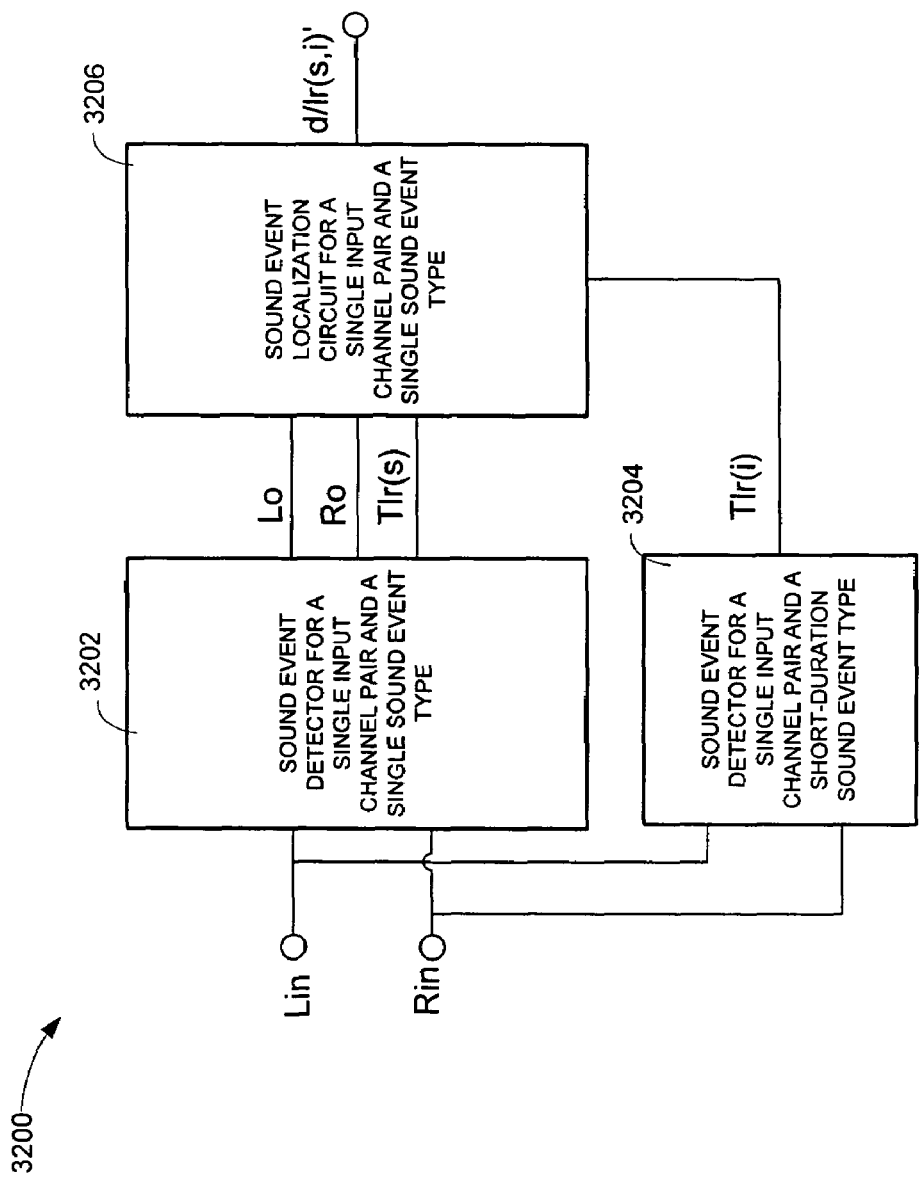
FIG. 32 is a block diagram of a sound event detector and localizer for a single input channel pair and multiple sound event types.

In FIG. 32, the sound event detector and localizer for a single input channel pair and multiple sound event types 3200 includes: a sound event detector for a single input channel pair and a single sound event type 3202; a sound event detector for a single input channel pair and a short-duration sound event type 3204; and a sound event localization circuit for a single input channel pair and a single sound event type 3206. The sound event detector for a single channel pair and a single sound event type 3202 may include the sound event detector for multiple channels and a single sound event type shown in FIG. 24 implemented to detect syllables and to produces a left differential signal Lo, a right differential signal Ro and a left-right trigger signal indicating the occurrence of syllables "Tlr(s)." The sound event detector for a single channel pair and a short-duration sound event type 3204 may include the sound event detector for a single input channel pair and a short-duration sound event shown in FIG. 23 implemented in parallel for each input channel to detect impulsive sounds and to produce a left-right trigger signal (as a combination of a left trigger signal and a right trigger signal) indicating the occurrence of impulsive sounds "Tlr(i)." The sound event localization circuit for a single channel pair and a single sound event type 3206 may include the sound event localization circuit for a single channel pair and a single sound event type as shown in FIG. 29 implemented to produce a true left-right differential steering angle indicating the direction of a detected syllable or impulsive sound whenever either trigger signal (Tlr(s) or Tlr(i)) indicates that a sound event is occurring. Although this sound event detector and localizer is implemented to detect and localize syllables and impulsive sounds in a left-right input channel pair, it may be implemented to detect any number of sound event types in any channel pair simply by adding additional sound event detectors for a single channel pair implemented to detect the desired sound event type and having the sound event localization circuit for a single channel pair and a single sound event type respond to any of the trigger signals produced by the sound event detectors for a single channel pair.

Figure 33:
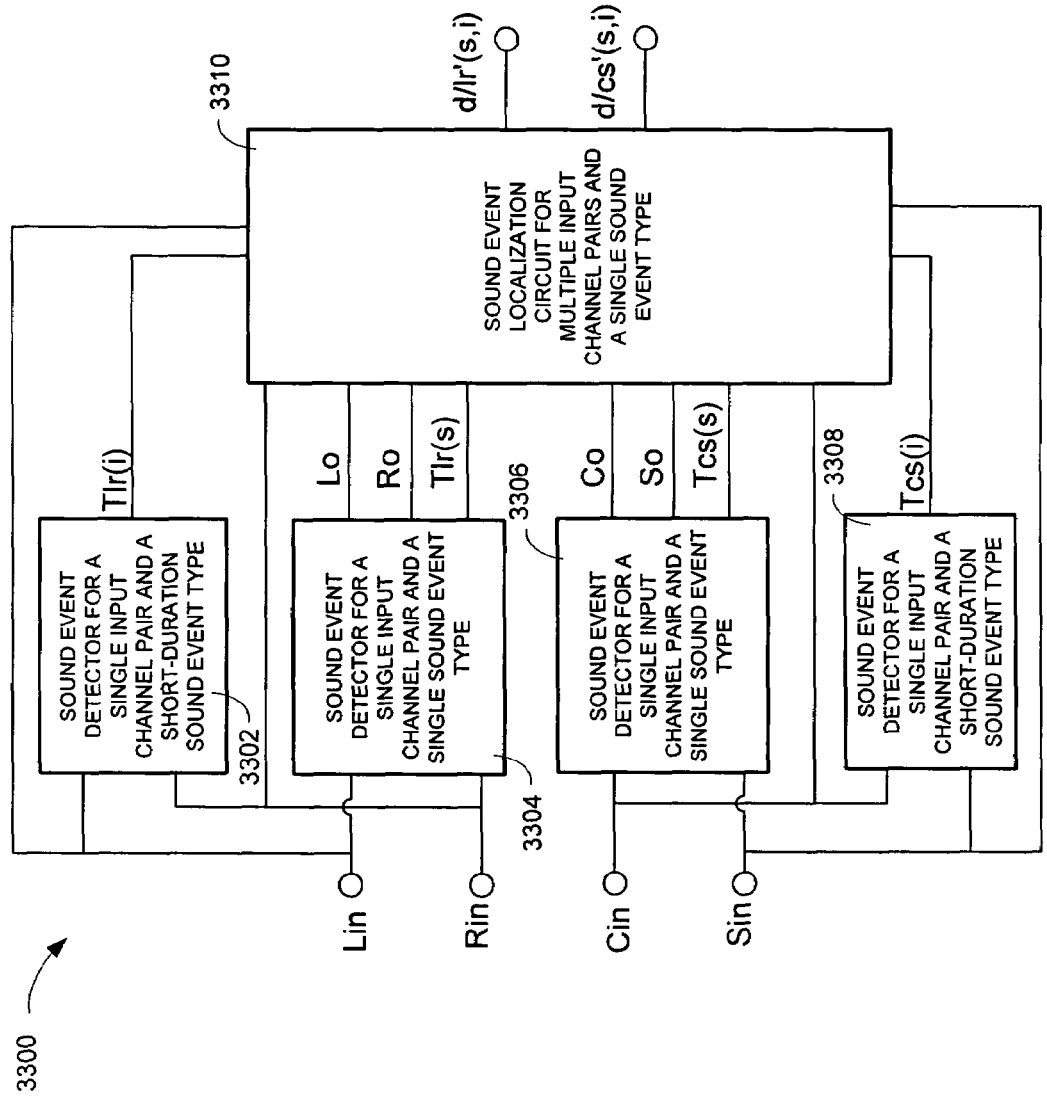
FIG. 33 is a block diagram of a sound event detector and localizer for multiple input channel pairs and multiple sound event types.

The sound event detector and localizer may also be implemented to detect multiple sound event types in a sound field generated in multiple input channel pairs (a "sound event detector and localizer for multiple input channel pairs and multiple sound event types"). An example of a sound event detector and localizer for multiple input channel pairs and multiple sound event types that detects syllables and impulsive sounds in both the left-right and center-surround channel pairs is shown in FIG. 33. This sound event detector and localizer for multiple input channel pairs and multiple sound event types 3300 includes: a first and a second sound event detectors for a single input channel pair and a short-duration sound event type 3302 and 3308, respectively; a first and a second sound event detector for a single input channel pair and a single sound event type 3304 and 3306, respectively; and a sound event localization circuit for multiple channel pairs and a single sound event type 3310.

Figure 31:
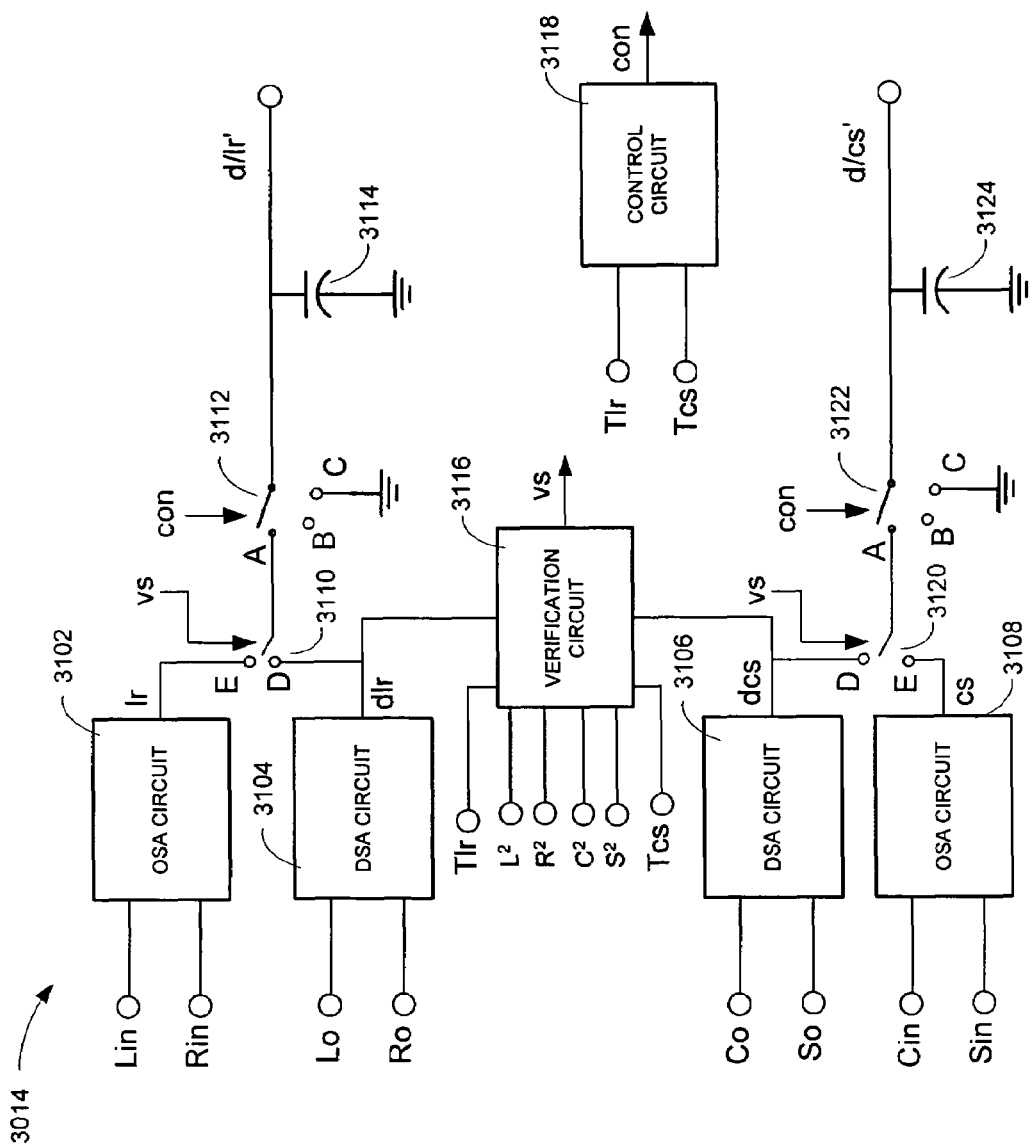
FIG. 31 is a circuit diagram of a sound event localization circuit for multiple input channel pairs and a single sound event type.

The first sound event detector for a single input channel pair and a single sound event type 3304 may include the sound event detector for multiple input channels and a single sound event type shown in FIG. 24 implemented to detect syllables and to produce a left differential signal Lo, a right differential signal Ro and a left-right trigger signal indicating the occurrence of syllables "Tlr(s)." Similarly, the second sound event detector for a single input channel pair and a single sound event type 3306 may include the sound event detector for multiple input channels and a single sound event type shown in FIG. 24 implemented to detect syllables and to produce a center differential signal Co, a surround differential signal So and a center-surround trigger signal indicating the occurrence of syllables "Tcs(s)." The first sound event detector for a single input channel pair and a short-duration sound event type 3302 may include a sound event detector for a single input channel pair and a short-duration sound event type shown in FIG. 23 in parallel for each channel in the channel pair implemented to detect impulsive sounds and to produce a left-right trigger signal (as a combination of a left trigger signal and a right trigger signal) indicating the occurrence of impulsive sounds "Tlr(i)." Similarly, the second sound event detector for a single input channel pair and a short-duration sound event type 3308 may include a sound event detector for a single input channel pair and a short-duration sound event in parallel for each input channel in the input channel pair shown in FIG. 23 implemented to detect impulsive sounds and to produce a center-surround trigger signal (as a combination of a center trigger signal and a surround trigger signal) indicating the occurrence of impulsive sounds "Tcs(i)." The sound event localization circuit for multiple channel pairs and a single sound event type 3310 may include the sound event localization circuit for multiple channel pairs and a single sound event type as shown in FIG. 31 implemented to produce left-right sound event angle indicating the direction of a detected syllable or impulsive sound whenever any trigger signal (Tlr(s), Tlr(i), Tcs(s), or Tcs(i)) indicates that a sound event is occurring "d/lr'(s,i)" and a center-surround sound event angle indicating the direction of a detected syllable or impulsive sound whenever any trigger signal (Tlr(s), Tlr(i), Tcs(s), or Tcs(i)) indicates that a sound event is occurring "d/cs'(s,i)." Although this sound event detector and localizer is implemented to detect and localize syllables and impulsive sounds in left-right and center-surround input channel pairs, it may be implemented to detect any number of sound event types in any number of channel pair simply by adding additional sound event detectors for a single channel pair implemented to detect the desired sound event types in the desired channel pairs and having the sound event localization circuit for multiple channel pairs and a single sound event type respond to any of the trigger signals produced by the sound event detectors for a single channel pair.

Furthermore, any of the sound event detector and localizers for multiple input channel pairs and multiple sound event types may additionally include an accommodation adjustment circuit and/or an error threshold circuit. Both the accommodation adjustment circuit and the error threshold circuit (not shown) are coupled to the consistency check circuit in the verification circuit and include a counter that counts the number of errors detected by the consistency check in a time period of about several seconds. The accommodation adjustment circuit is also coupled to the accommodation signal in the accommodation circuit. In contrast, the error threshold circuit is also coupled to the threshold detector in the trigger generation circuits and further includes an error voltage source that is adjusted according to the number of errors counted by the counter. As the number of errors increases, the voltage produced by the error voltage source will increase to cause the threshold voltage to increase so that fewer sound events will be detected.

8. Surround Detector

Figure 34:
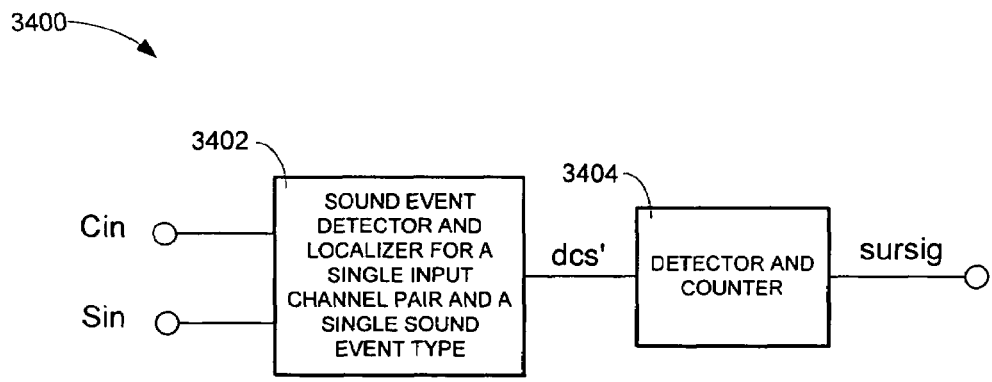
FIG. 34 is a block diagram of a stereo/surround detector for a single sound event type.

One application of a sound event detector and localizer is as a stereo/surround detector. A stereo/surround detector determines whether a sound field is intended for reproduction in two input channels or in more than two input channels. An example of a stereo/surround detector implemented to detect a single sound event type 3400 (a "stereo/surround detector for a single sound event type") is shown in FIG. 34 and includes: a sound event detector and localizer for a single input channel pair and a single sound event type 3402 and a detector and counter 3404. The sound event detector and localizer for a single input channel pair and a single sound event type 3402 uses the signals in the center input channel Cin and the surround input channel Sin to produce a true differential steering angle dcs' that reflects the direction of whatever sound event is being detected. The threshold detector and counter 3404 then determines the number of times dcs' falls within the range of about 0 degrees to about −45 degrees. If the number exceeds a predetermined value, the threshold detector and counter 3404 produces a signal "sursig" indicating that the sound field should be reproduced in surround. Conversely, if the number does not exceed a predetermined value, then the detector and counter 3404 produces sursig indicating that the sound field should be reproduced in stereo. In general, if the number of sound events detected during a relatively long time period (on the order of about 10 s to about 15 s) is on the order of about 2 or 3, the detector and counter 3404 will produce sursig indicating that the sound field should be reproduced in surround. Additionally, the detector and counter may further determine the duration of the sound events and only count those with durations that exceed a predetermined value as sound events that are intended for reproduction in the rear. In one example, sound events with durations less than about 50 ms will not be counted as sound events that are intended to be reproduced in the rear. In another example, sound events with durations of about 200 ms to about 300 ms will be counted as sound events that are intended to be reproduced in the rear.

Figure 35:
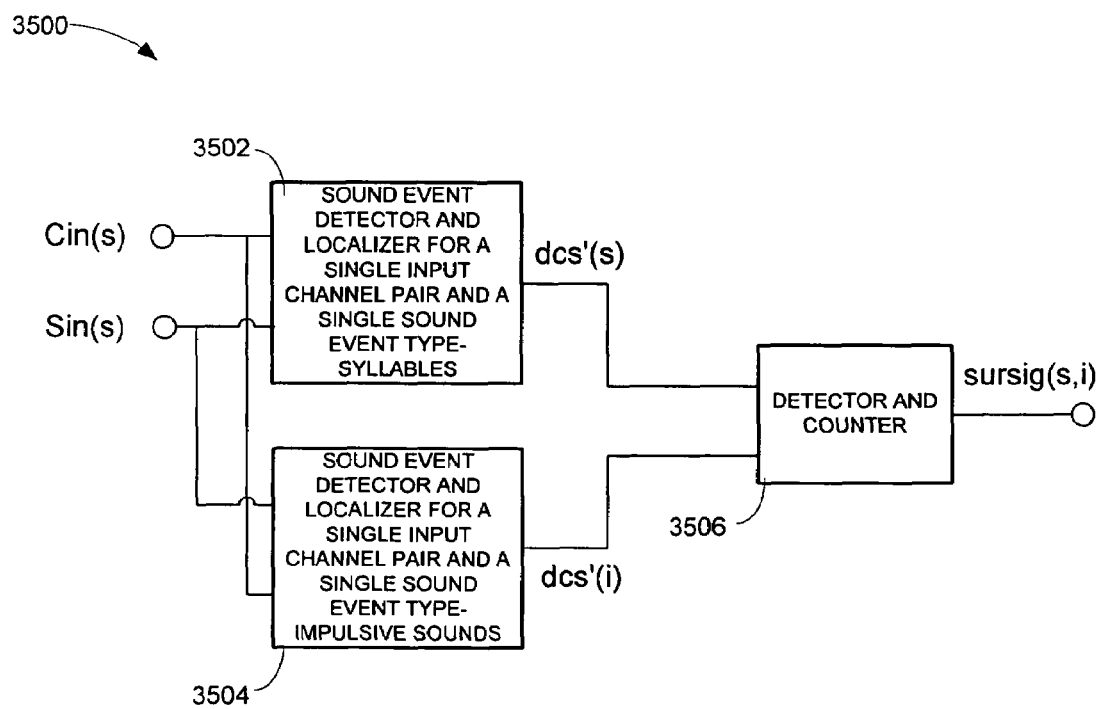
FIG. 35 is a block diagram of a stereo/surround detector for multiple sound event types.

Alternatively, a stereo/surround detector implemented to detect multiple sound event types (a "stereo/surround detector for multiple sound event types") is shown in FIG. 35 and is indicated by reference number 3500. In the example of FIG. 35, the stereo/surround detector 3500 is implemented to count the number of syllables and impulsive sounds intended for reproduction in the rear. However, it may be implemented to count the number of any type or combination of types of sound events. The detector 3500 includes: first and second sound event detector and localizers for a single input channel pair and a single sound event type 3502 and 3504, respectively, and a detector and counter 3506. The first sound event detector and localizer for a single input channel pair 3502 uses the signals in the center input channel Cin and the surround input channel Sin to produce a true differential steering angle that reflects the direction of the syllables dcs'(s). Similarly, the second sound event detector and localizer for a single input channel pair 3504 uses the signals in the center input channel Cin and the surround input channel Sin to produce a true differential steering angle that reflects the direction of the impulsive sounds dcs'(i). The detector and counter 3506 then determines the number of times dcs'(s,i) falls within the range of about 0 degrees to about −45 degrees to produce a signal "sursig(s,i)" that indicates whether the sound is to be reproduced in stereo or in surround.

9. Sound Localizer

The properties of the human hearing mechanism have been modeled to create electronic circuitry that localizes sound events in the presence of a background signal, as well as all remaining sounds (collectively, "sound localizers"). Sound localizers separately detect and localize sound events and non-sound events in a sound field to produce a continuous indication of the direction of the sound field. These sound localizers may be used in a variety of applications, such as the reproduction of recorded sounds, particularly if the sounds are part of a complex sound field that includes sound events occurring simultaneously with steady-state sounds. When a sound field is to be reproduced in surround but was stored in stereo format, the sound localizers can be used as part of a matrix decoder to derive the true directions of the sounds from a two input channel mix. Also, the sound localizers can be implemented to detect any number and combination of sound event types in a sound field generated in any number of input channels. In the following description, the sound localizers are discussed in order of increasing complexity, with each subsequent sound localizer incorporating the elements of the prior sound localizers, except as indicated.

Figure 36:
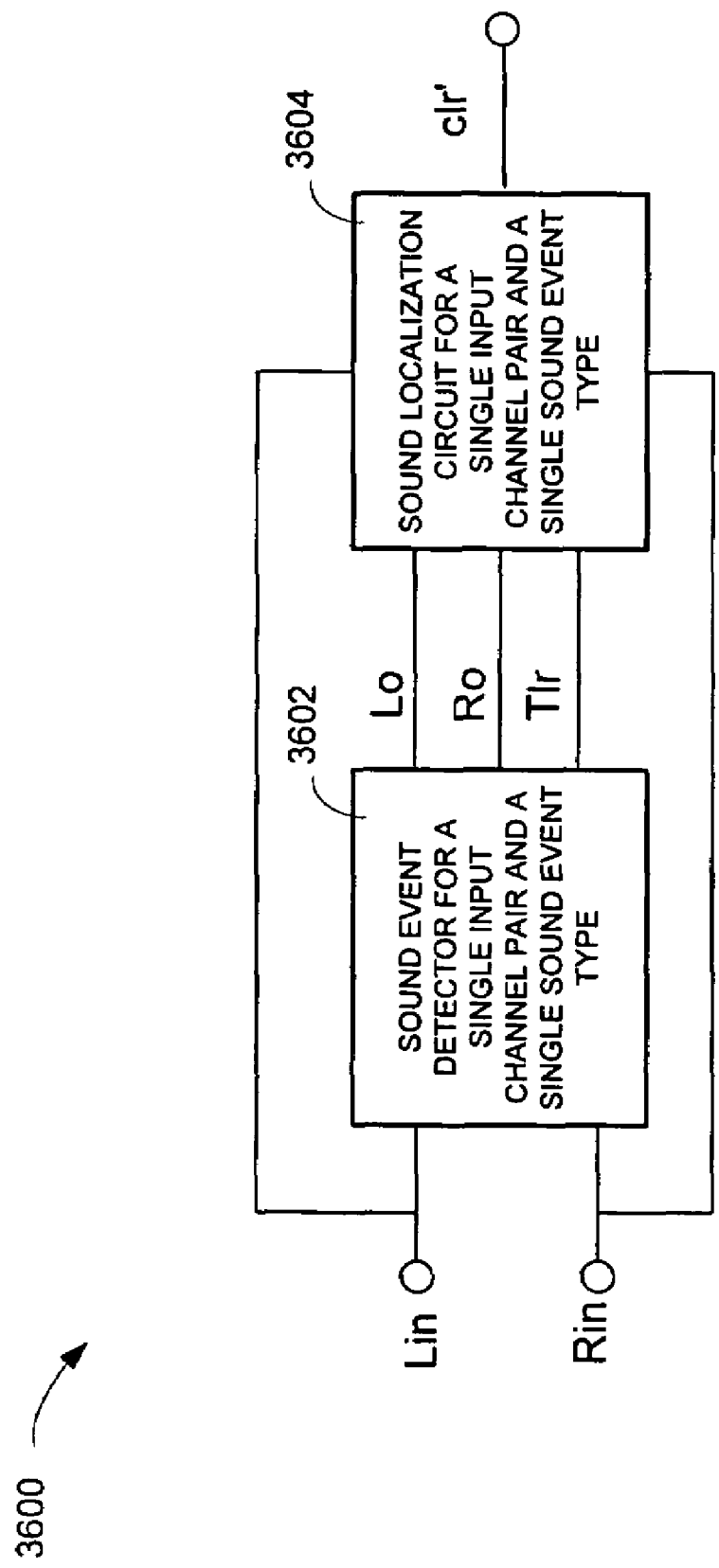
FIG. 36 is a block diagram of a sound localizer for a single input channel pair and a single sound event type.

An example of a sound localizer that separately localizes a single sound event type in a single input channel pair (a "sound localizer for a single input channel pair and a single sound event type") is shown in FIG. 36. The sound localizer for a single input channel pair and a single sound event type 3600 includes: a sound event detector for a single channel pair and a single sound event type 3602; and a sound localization circuit for a single input channel pair and a single sound event 3604. The sound event detector for a single channel pair and a single sound event type 3602 may include the sound event detector for multiple channels and a single sound event type shown in FIG. 24 implemented to detect and localize whatever sound event type is being detected and produces left and right differential signals Lo and Ro, respectively, and a left-right trigger signal Tlr. The sound localization circuit 3604 uses Tlr, Lo, Ro, and the signals in the left and right input channels Lin and Rin, respectively, to produce a steering angle that indicates the direction of the sound field with respect to the left-right input channel pair in terms of an ordinary steering angle and a differential steering angle (generally referred to in this application as a "comprehensive steering angle" and the comprehensive steering angle with respect to the left-right input channel pair is referred to as "clr'").

Figure 37:
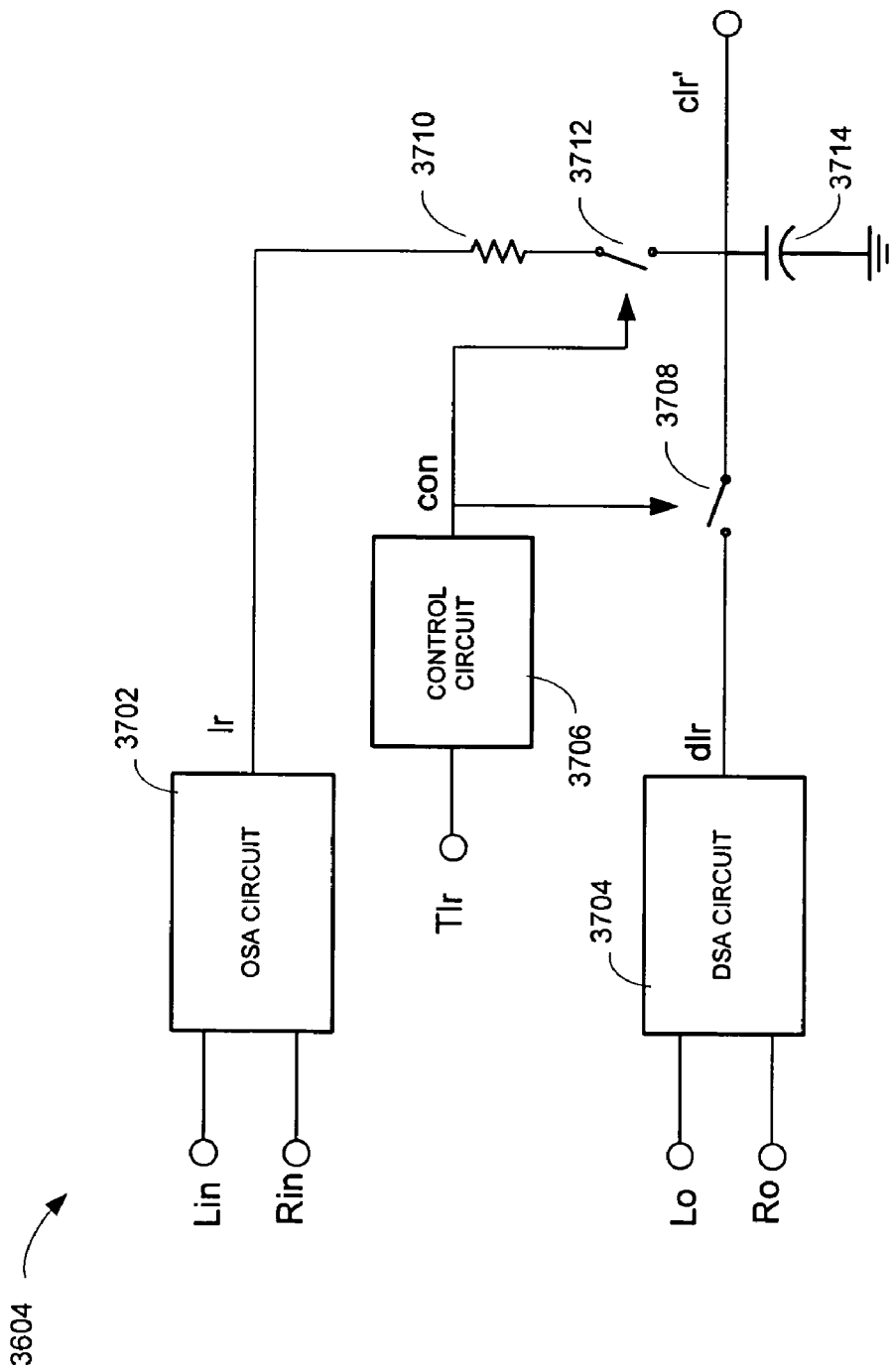
FIG. 37 is a circuit diagram of a sound localization circuit for a single input channel pair and a single sound event type.

The sound localization circuit for a single input channel pair and a single sound event type 3604 is shown in more detail in FIG. 37 and includes: an ordinary steering angle (OSA) circuit 3702; a DSA circuit 3704; a control circuit 3706; a first switch 3708; a resistor 3710; a second switch 3712 and a capacitor 3714. The sound event localization circuit for a single input channel pair and a single sound event type 3604 uses the left and right differential signals Lo and Ro, respectively, and the left and right input signals Lin and Rin, respectively, to produce a left-right comprehensive steering angle clr'. In general, clr' follows the OSA when no sound events are detected and follows the DSA whenever a sound event is detected. The OSA circuit 3702 uses Lin and Rin to determine the ordinary steering angle lr. The DSA circuit 3704 uses the differential signals Lo and Ro to produce the differential steering angle. The control circuit 3706, the first switch 3708, and the capacitor 3714 generally form a sample-and-hold circuit and can therefore be replaced with any device or circuit that performs a similar function.

In general, when no sound events are detected, the first switch 3708 will be open and the second switch 3712 will be closed. In this state, clr' will follow lr at a rate defined by the resistor 3710 and the capacitor 3714. However, when a sound event is detected, the control circuit 3706 causes the first switch 3708 to close and the capacitor 3712 to capture dlr during the typical rise time of the sound event type being detected so that clr' equals the true DSA for the typical duration of the sound event type being detected. More specifically, the control circuit 3716 receives the trigger signal Tlr and produces a control signal "con" that controls the first switch 3708 and the second switch 3712. When Tlr indicates that a sound event is occurring, the control circuit 3706 communicates to the first switch 3708 via "con" a command to close causing the first switch 3708 to close. At the end of the rise-time typical for the sound event type being detected, the control circuit 3706 communicates to the first and second switches 3708 and 3712, respectively, via con a command to open causing the first and second switches 3708 and 3712 to open. After the typical duration of the sound event type being detected, the control circuit 3706, communicates to the second switch 3712 a command via con to close. During the time that the first switch 3708 is closed (the rise-time of the sound event), the left-right differential steering angle dlr is captured by the capacitor 3714 to create the true DSA dlr'. Clr' is defined by the true DSA, which is held until the end of the typical duration of the sound event, even if the sound event has not actually ended. For example, if the sound event being detected is a syllable, the true DSA will be held for about 50 ms to about 200 ms, preferably after about 150 ms. In another example, if the sound event being detected is an impulsive sound, the true DSA will be held for about 50 ms. At the end of the typical duration of the sound event type being detected, the capacitor 3714 will charge or discharge until it reflects lr at a specified rate. The capacitor 3714 and resistor 3710 are chosen so that they define an RC time constant that will cause the specified rate of decay. For example, the RC time constant may be equal to about 300 ms.

Figure 38:
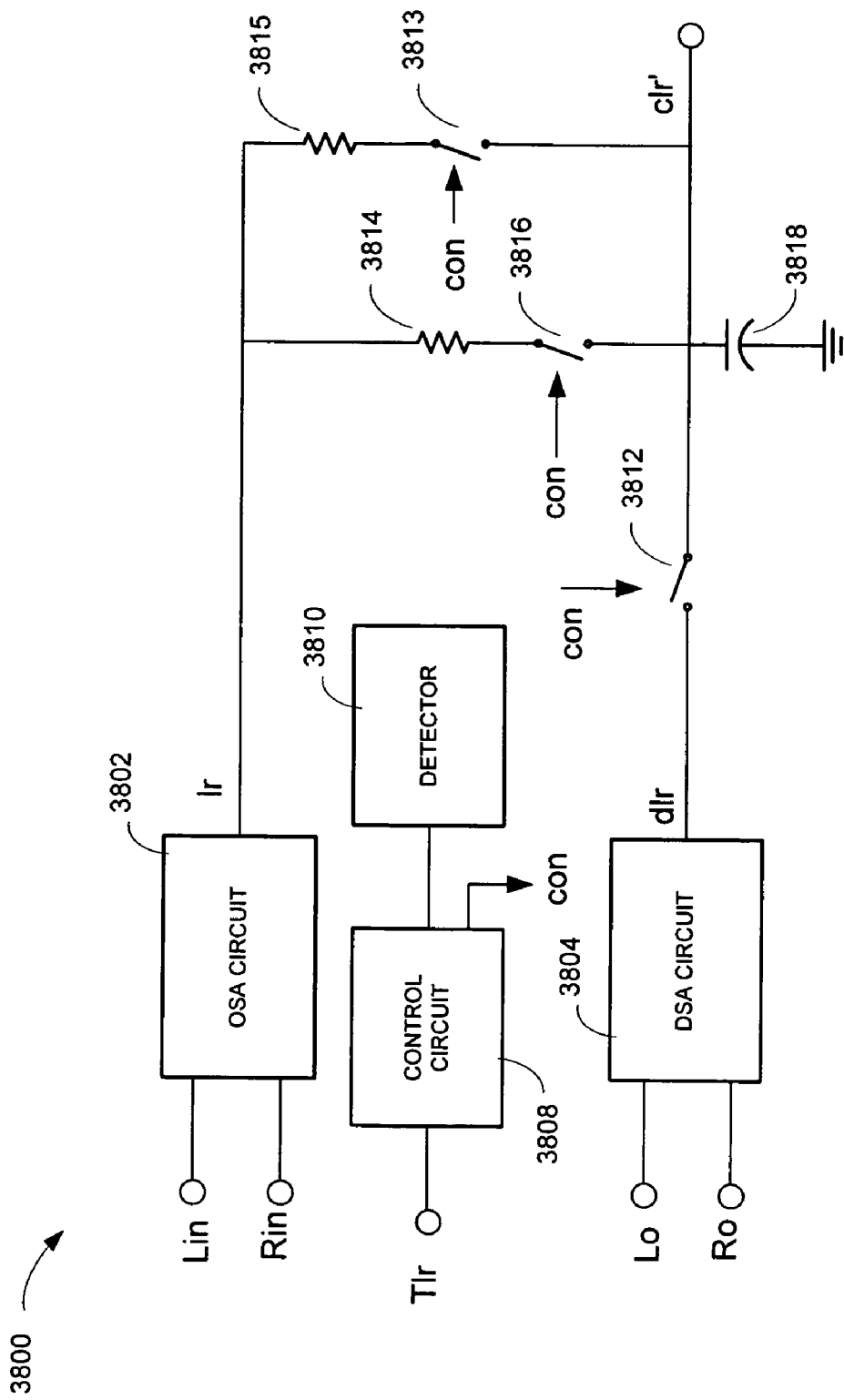
FIG. 38 is a circuit diagram of a sound localization circuit for a single input channel pair and a short-duration sound event.

Alternatively, the sound localization circuit can be specifically implemented for short-duration sound events. As previously discussed, if a short-duration sound event, such as an impulsive sound, is localized according to a DSA, it is often advantageous at the end of the typical duration of the short-duration sound event to determine if the sound event has actually ended and switch immediately to the OSA if the sound event has ended. An example of a sound event localization circuit that includes this functionality (a "sound localization circuit for a single input channel pair and short-duration sound events") is shown in FIG. 38. The sound localization circuit for a single input channel pair and short-duration sound events 3800 includes: an OSA circuit 3802; a DSA circuit 3804; a control circuit 3808; a detector 3810; a first switch 3812; a second switch 3816; a first resistor 3814; a third switch 3813; a second resistor 3815; and a capacitor 3818. This sound localization circuit 3800 produces a left-right comprehensive steering angle clr'. When no sound events are detected, clr' equals the filtered OSA (which is lr after it is filtered by resistor 3814 and capacitor 3816). However, when a sound event is detected, clr' either equals the true OSA or the true DSA. The sound localization circuit for a single channel pair and a single short duration sound event generally behaves in the same way as the sound localization circuit shown in FIG. 37, except that at the end of a sound event, clr' either decays to lr or goes to lr immediately depending on whether the sound event has actually ended.

After the control circuit 3808 receives a trigger signal indicating that a sound event is occurring and has determined that the typical duration of the sound event being detected has ended, in addition to its other functions as previously described, it communicates with the detector 3810 to establish whether the sound event has actually ended. The detector 3810 determines whether a sound event has actually ended by comparing the power envelope with the accommodation signal in each input channel of the channel pair. If the input power envelope is greater than the accommodation signal in any input channel of the input channel pair, the detector 3810 will determine that the short-duration sound event has not actually ended. Conversely, if the input power envelope is not greater than the accommodation signal in any input channel of the input channel pair, the detector 3810 will determine that the short-duration sound event has actually ended. If the control circuit 3808 establishes that the sound event has not actually ended, it will then instruct the second switch 3816 to close via con. When the second switch 3816 closes, clr' will drift to the filtered OSA at a specified rate. Therefore, capacitor 3818 and resistor 3814 are select so that their RC time constant is about equal to the specified rate (which is generally about 300 ms). For example, if impulsive sounds are being detected, the RC time constant of capacitor 3818 and resistor 3814 will be about 5 ms. However, if the control circuit 3808 establishes that the sound event has actually ended, it will then instruct the third switch 3813 to close via con. When the third switch 3813 closes, clr' immediately goes to lr. Therefore, the second resistor 3815 is chosen so that the RC time constant of the second resistor 3815 and the capacitor 3818 is much lower than that of the first resistor 3814 and the capacitor 3818 (generally about a factor of ten lower). Generally, the third switch will remain closed for a very short time (generally about 3 ms to about 10 ms). After this very short time has ended, the control circuit 3803 will instruct the third switch 3813 to open and the second switch 3816 to close so that cr' will go to the filtered OSA. Additionally, the sound localizer for a single input channel pair and a short-duration sound event type may further include a DSA averaging circuit. The DSA averaging circuit may be implemented in the sound event localization circuit 3800 between the DSA circuit 3804 and the switch 3812.

Figure 39:
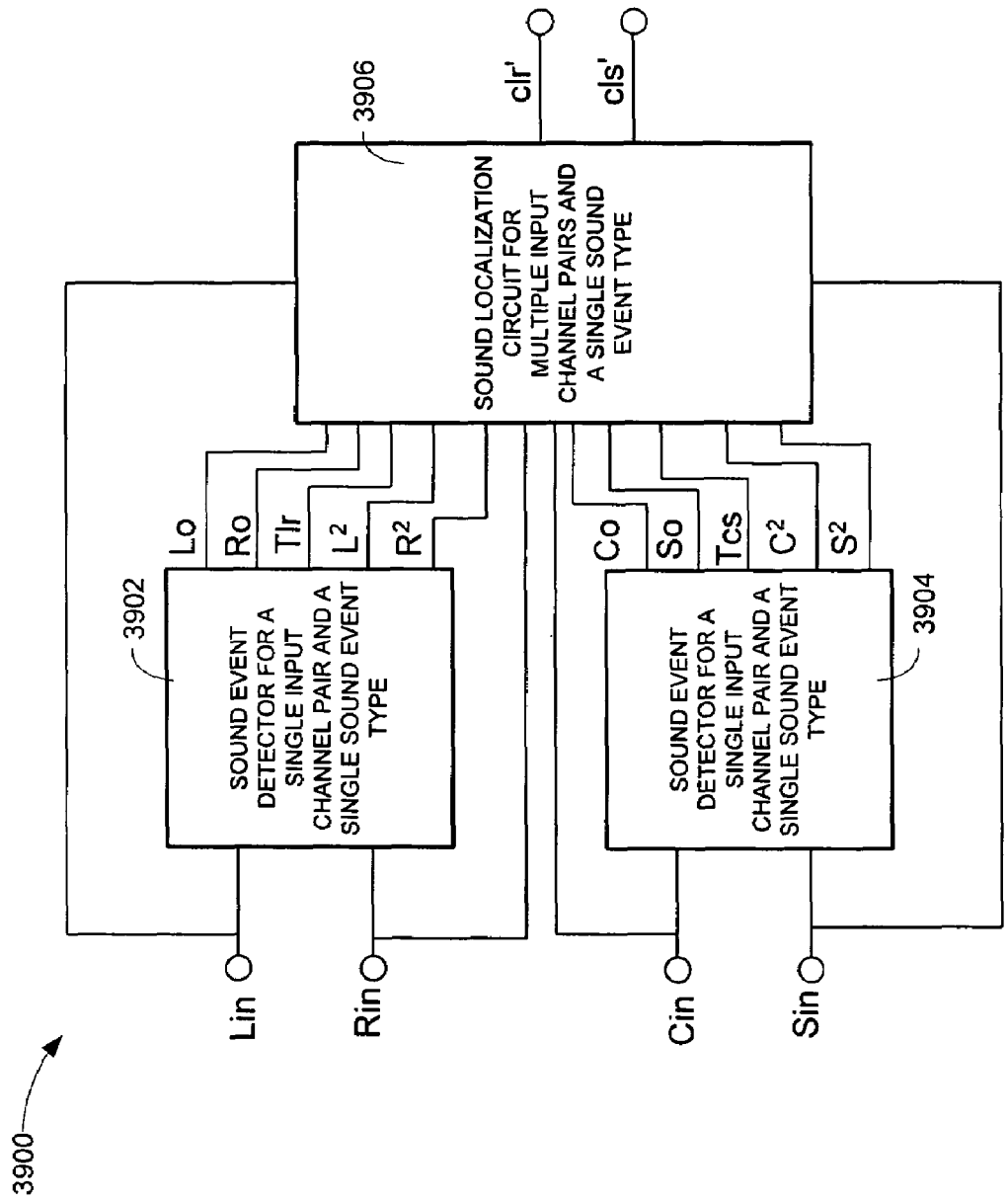
FIG. 39 is a block diagram of a sound localizer for multiple input channel pairs and a single sound event type.

The sound localizer may also be implemented to detect a single sound event type in a sound field generated in multiple input channel pairs (a "sound localizer for multiple input channel pairs and a single sound event type"). An example of a sound localizer for multiple input channel pairs and a single sound event type implemented to detect and localize a single sound event in both an LR input channel pair and a CS input channel pair is shown in FIG. 39 and designated by reference number 3900. This sound localizer may be implemented for any combination of input channel pairs with the LR input channel pair and the CS input channel pair used in this instance for explanation purposes only. The sound localizer for multiple input channel pairs and a single sound event type 3900 produces a comprehensive steering angle for the LR input channel pair ("clr'") and the CS input channel pair ("ccs'") and generally includes: a first and second sound event detector for a single input channel pair and a single sound event 3902 and 3904, respectively; and a sound localization circuit for multiple input channel pairs and a single sound event type 3906.

The first and second sound event detectors for a single input channel and a single sound event type 3902 and 3904 may include a sound event detector for multiple input channels and a single sound event type, such as that shown in FIG. 24, implemented to detect the same sound event. The first sound event detector for a single input channel 3902 uses Lin' and Rin' to produce a left differential signal Lo, a right differential signal Ro, and a left-right trigger signal Tlr. Similarly, the second sound event detector for a single input channel 3904 uses Cin' and Rin' to produce a center differential signal Co, a surround differential signal So, and a center-surround trigger signal Tcs.

The sound localization circuit for multiple input channel pairs and a single sound event type 3906 uses the left differential signal Lo, the right differential signal Ro, and the trigger signals to produce a left-right comprehensive steering angle clr', and uses the center differential signal Co, the surround differential signal So and the trigger signals to produce a center-surround comprehensive steering angle ccs'. Additionally, circuit 3906 uses all the power envelopes, dlr and dcs to verify the accuracy of the DSA. This circuit 3906 is shown in more detail in FIG. 40 and generally includes: a first OSA circuit 4002; a first DSA circuit 4004; a second DSA circuit 4006; a second OSA circuit 4008; a verification circuit 4020; a control circuit 4022; a first two-position switch 4010; a first switch 4012; a first resistor 4014; a first capacitor 4018; a second switch 4016; a second two-position switch 4030; a third switch 4032; a second capacitor 4038; a fourth switch 4036; and a second resistor 4034.

clr' is produced by the first OSA circuit 4002, first DSA circuit 4004, first two-position switch 4010, first switch 4012, the first resistor 4014, the second switch 4016, and the first capacitor 4018. Similarly, d/cs' is produced by the second OSA circuit 4008, second DSA circuit 4006, second two-position switch 4030, the third switch 4032, the second resistor 4034 and the second capacitor 4038. The first and second OSA circuits 4002 and 4008 convert Lin and Rin and Cin and Sin, respectively, into ordinary steering angles, lr and cs. The control circuit 4022, the first switch 4012, the second switch 4016, the first resistor 4014 and the first capacitor 4018 form a first sample and hold circuit, while the control circuit 4022, the third switch 4032, the fourth switch 4036, the second resistor 4034, and the second capacitor 4038 form a second sample and hold circuit. Both the first and third switches 4012 and 4032, respectively, are normally open when no sound events are detected and are controlled by the control circuit so that each switch is closed when a sound event is detected and opened at the end of the typical rise time of the sound event type being detected. Both the second and forth switches 4016 and 4036 are normally closed when no sound events are detected and opened after a sound event has been detected and the typical rise-time of the sound event type being detected has ended. The control circuit 4022 produces a control signal "con" that is communicated to switches 4012, 4016, 4032 and 4036. The control signal causes the first and second switches 4012 and 4016 to close (or stay closed) whenever either trigger signal (Tlr or Tcs) indicates that a sound event is being detected in either input channel pair. Subsequently, con causes switches 4012, 4016, 4032 and 4036 to open at the end of the typical duration of the rise-time of the sound event.

Both two-way switches 4010 and 4030 include positions D and E. When a sound event is detected and both two-way switches 4010 and 4030 are in position D, the DSA for each channel pair are used to indicate the direction of the sound event. However, when a sound event is detected and both two-way switches 4010 and 4020 are in position E, the OSA for each channel pair is used to indicate the position of the sound event. The verification circuit 4020 controls both two-way switches 4010 and 4020 via a verification signal "vs" according to whether the DSAs are correct when a sound event is detected. When either trigger signal (Tlr or Tcs) indicates that a sound event is being detected, the verification circuit determines whether at least two of the power envelopes ($L^2$, $R^2$, $C^2$, $S^2$) have dropped by at least 3 dB or more. If at least two of the power envelopes have dropped by at least 3 dB or more from the last sound event, the verification circuit will communicate to both two-way switches 4010 and 4020 via vs causing them to move or stay in position E. However, if at least two of the power envelopes have not dropped by at least 3 dB or more, the verification circuit will communicate to both two-way switches 4010 and 4020 via vs causing the to move or stay in position D.

Alternatively, the verification circuit of the sound event localization circuit 4020 may also include a consistency check circuit. The consistency check circuit is coupled to both DSA circuits and uses the differential steering angles produced by each to make a further determination of the accuracy of the differential steering angles as previously described. Furthermore, the sound localizer for multiple sound event types and a single sound event type may further include an accommodation adjustment circuit and/or an error threshold circuit.

Figure 40:
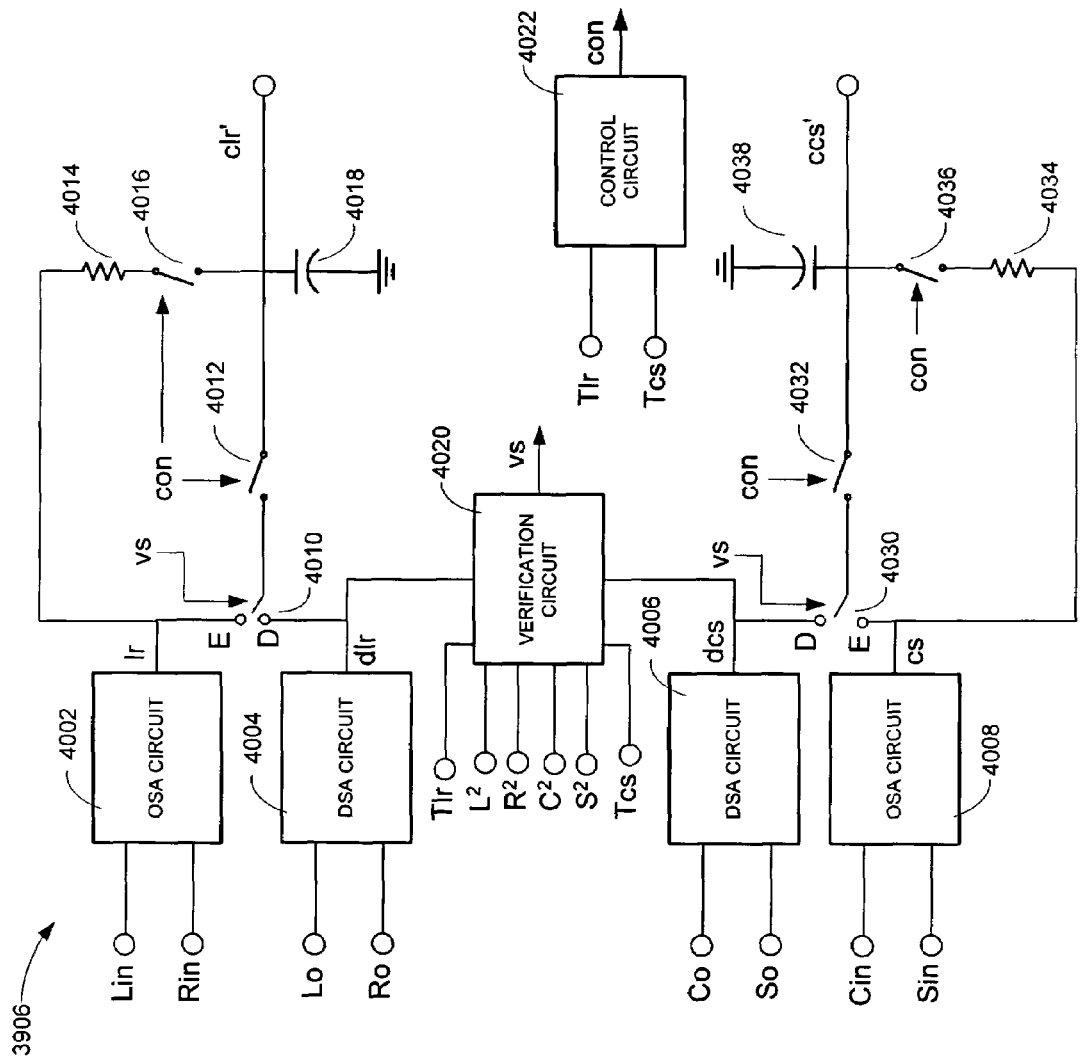
FIG. 40 is a circuit diagram of a sound localization circuit for multiple input channel pairs and a single sound event type.
Figure 41:
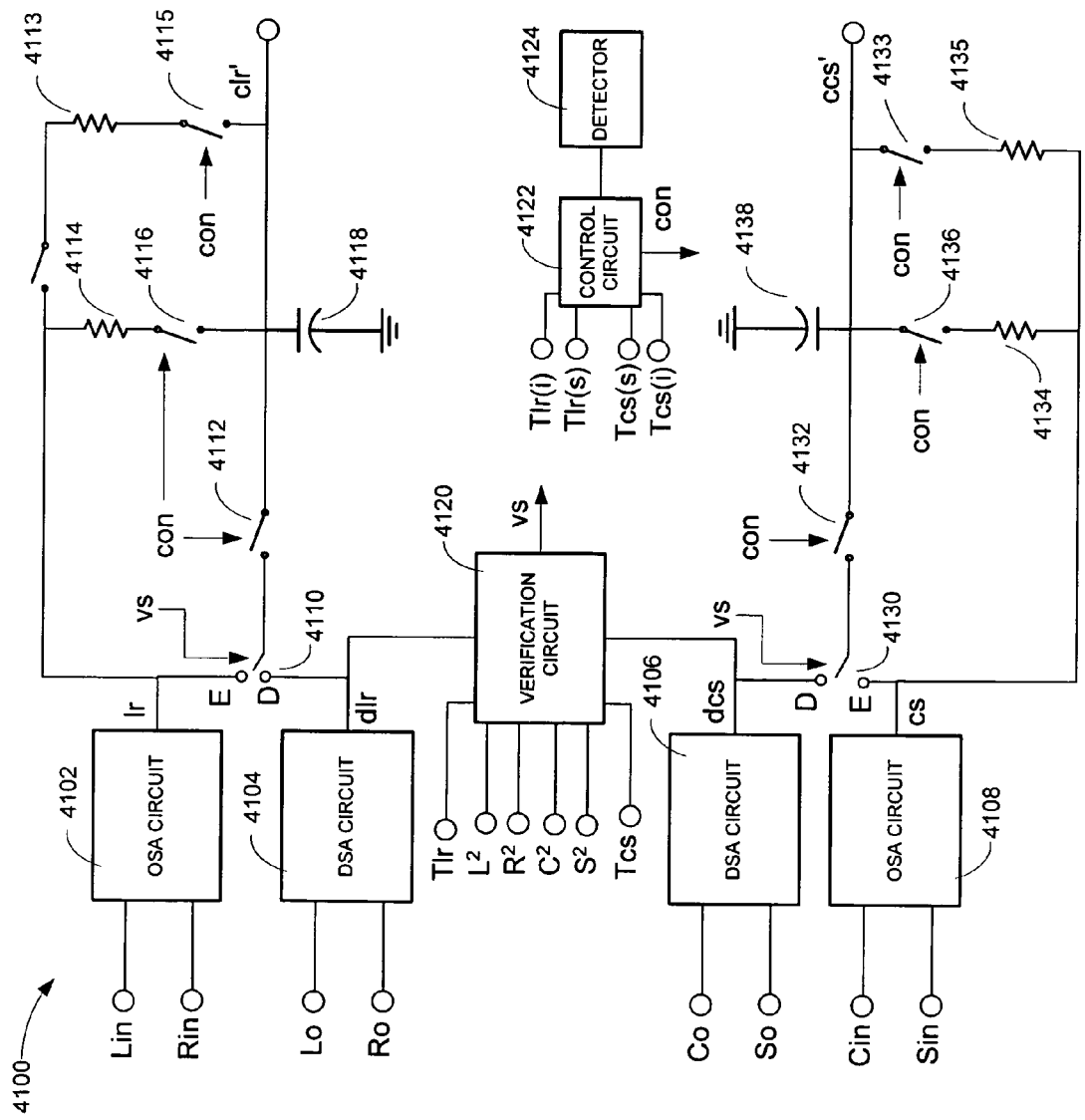
FIG. 41 is a block diagram of a sound localization circuit for multiple input channel pairs and a short-duration sound event.

Alternatively, the sound localization circuit for multiple channel pairs and a single sound event type can be specifically implemented for short-duration sound events, such as impulsive sounds. As previously discussed, if a short-duration sound event is localized, it is often advantageous at the end of the typical duration of the sound event type being detected to determine if the sound event has actually ended and switch immediately to the OSA if the sound event has not actually ended. An example of such a sound localization circuit for multiple input channel pairs and short-duration sound events is shown in FIG. 41 and indicated by reference number 4100. This sound localization circuit for multiple input channel pairs and short-duration sound events 4100 generally includes: a first OSA circuit 4102; a first DSA circuit 4104; a second DSA circuit 4106; a second OSA circuit 4108; a verification circuit 4120; a control circuit 4122; a detector circuit 4124; a first two-position switch 4110; a first switch 4112; a first resistor 4114; a first capacitor 4118; a second switch 4116; a second two-position switch 4130; a third switch 4132; a second capacitor 4138; a fourth switch 4136; a second resistor 4134; a fifth switch 4115; a third resistor 4113; a sixth switch 4133; and a fourth resistor 4135. This sound localization circuit 4100 produces a left-right comprehensive steering angle clr'. When there are no sound events, clr' will equal the filtered OSA (which is lr after being filtered by first resistor 4114 and first capacitor 4118). When there is a sound event detected, clr' will equal either the true OSA or the true DSA of the left-right channel pair. This sound localization circuit 4100 also produces a center-surround comprehensive steering ccs'. When no sound events are detected, clr' equals the filtered OSA. When sound events are detected, clr' will equal the true OSA or the true DSA of the center-surround channel pair. The sound localization circuit for multiple channel pairs and a single short duration sound event generally behaves in the same way as the sound localization circuit for multiple channel pairs an a single sound event type shown in FIG. 40, except that at the end of a sound event, clr' either decays to the filtered OSA or goes to the OSA immediately depending on whether the sound event has actually ended.

After the control circuit 4122 receives a trigger signal indicating that a sound event is occurring and has determined that the typical duration of the sound event being detected has ended, in addition to its other functions as previously described, it communicates with the detector 4124 to establish whether the sound event has actually ended. The detector 4122 determines whether a sound event has actually ended by comparing the power envelope with the accommodation signal in each input channel of any channel pair. If the input power envelope is greater than the accommodation signal in any input channel of any input channel pair, the detector 4122 will determine that the short-duration sound event has not actually ended. Conversely, if the input power envelope is not greater than the accommodation signal in any input channel of any input channel pair, the detector 4124 will determine that the short-duration sound event has actually ended. If the control circuit 4122 establishes that the sound event has not actually ended, it will then instruct the second and fourth switches 4116 and 4136, respectively, to close via con. When the second switch 4116 and the fourth switch 4136 close, clr' will drift to the left-right filtered OSA (which is lr after it has been filtered by the first resistor 4114 and the first capacitor 4118) and ccs' will drift to the center-surround filtered OSA (which is cs after it has been filtered by the second resistor 4134 and the second capacitor 4138) at a specified rate. Therefore, the first and second capacitors 4118 and 4138, respectively, and the first and second resistors 4114 and 4134, respectively, are selected so that their RC time constants are about equal to the specified rate. For example, if impulsive sounds are being detected, the RC time constant of capacitor 4118 and resistor 4114, as well as the RC time constant of capacitor 4138 and resistor 4134 will be about 5 ms.

However, if the control circuit 4122 establishes that the sound event has actually ended, it will then instruct the fifth and sixth switches 4115 and 4133, respectively, to close via con. When fifth and sixth switches 4115 and 4133, respectively, close, clr' and ccs' both immediately goes to lr and cs, respectively. Therefore, the RC time constant of the third resistor 4113 and the first capacitor 4118, and the RC time constant of the fourth resistor 4135 and the second capacitor 4138 will both be very low. These RC time constants may be about at least a factor of ten lower than the RC time constant of the first resistor 4114 and the first capacitor 4118 and the RC time constant of the second resistor 4134 and the second capacitor 4138. The fifth and sixth switches 4115 and 4133, respectively, will remain closed for a short time. This short time may be about 3 ms to about 10 ms. After this short time, the control circuit 4122 will instruct the fifth and sixth switches 4115 and 4133, respectively, to open and the second and fourth switches 4116 and 4136, respectively, to close so that clr' and ccs' will reflect the filtered OSAs. Additionally, the sound localizer for a multiple input channel pair and a short-duration sound event type may further include first and second DSA averaging circuits. The first DSA averaging circuit may be implemented in the sound event localization circuit 4100 between the first DSA circuit 4104 and the first two-position switch 4110. Likewise, the second DSA averaging circuit may be implemented in the sound event localization circuit 4100 between the second DSA circuit 4106 and the second two-position switch 4130.

Alternatively, the verification circuit of the sound localization circuit for multiple channel pairs and a single short-duration sound event type 4100 may also include a consistency check circuit. The consistency check circuit is coupled to both DSA circuits and uses the differential steering angles produced by each to make a further determination of the accuracy of the differential steering angles as previously described. Furthermore, the sound localizer for multiple sound event types and a single sound event type may further include an accommodation adjustment circuit and/or an error threshold circuit.

Figure 42:
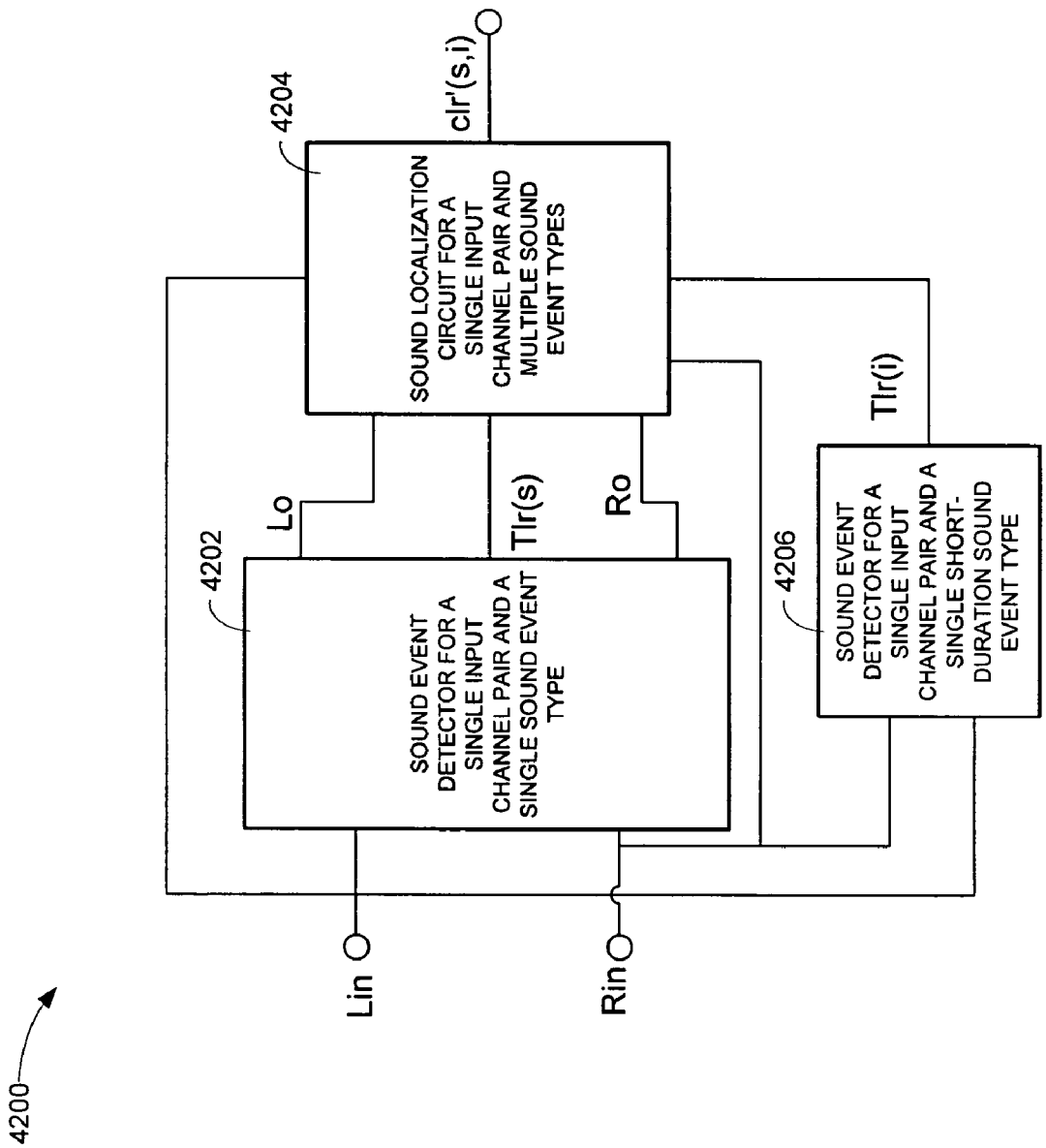
FIG. 42 is a block diagram of a sound localizer for a single input channel pair and multiple sound event types.

The sound localizer may also be implemented to detect multiple sound event types in a sound field generated in a single input channel pair (a "sound localizer for a single input channel pair and multiple sound event types"). An example of a sound localizer for a single input channel pair and a multiple sound event types implemented to detect and localize syllables and impulsive sounds in a left-right input channel pair is shown in FIG. 42 and indicated by reference number 4200 (however, this localizer may be implemented for any input channel pair to detect any combination of sound event types). The sound localizer for a single input channel pair and multiple sound event types 4200 generally includes: a sound event detector for a single input channel pair and a single sound event type 4202; a sound event detector for a single input channel pair and a single short-duration sound event type 4206; and a sound localization circuit for a single input channel pair and multiple sound event types 4204.

The sound event detector for a single input channel pair and a single sound event type 4202 may include the sound event detector for multiple channels and a single sound event type shown in FIG. 24 implemented to detect syllables and to produces a left differential signal Lo, a right differential signal Ro and a left-right trigger signal indicating the occurrence of syllables Tlr(s). The sound event detector for a single input channel pair and a single short-duration sound event type 4206 may include the sound event detector for a single channel pair and a short-duration sound event shown in FIG. 23 implemented in parallel for each input channel to detect impulsive sounds and to produce a left-right trigger signal (as a combination of a left trigger signal and a right trigger signal) indicating the occurrence of impulsive sounds Tlr(i). The sound localization circuit for a single input channel pair and multiple sound event types 4204 may include the sound localization circuits for a single input channel pair and a single sound event type as shown in FIGS. 37 and 38 implemented in parallel to produce a left-right differential steering angle indicating the direction of a detected syllable or impulsive sound whenever either trigger signal (Tlr(s) or Tlr(i)) indicates that a sound event is occurring. Although this sound localizer is implemented to detect and localize syllables and impulsive sounds in a left-right input channel pair, it may be implemented to detect any number of sound event types in any channel pair simply by adding additional sound event detectors for a single channel pair implemented to detect the desired sound event type and having the sound localization circuit for a single channel pair and multiple sound event types respond to any of the trigger signals produced by the sound event detectors for a single channel pair.

Figure 43:
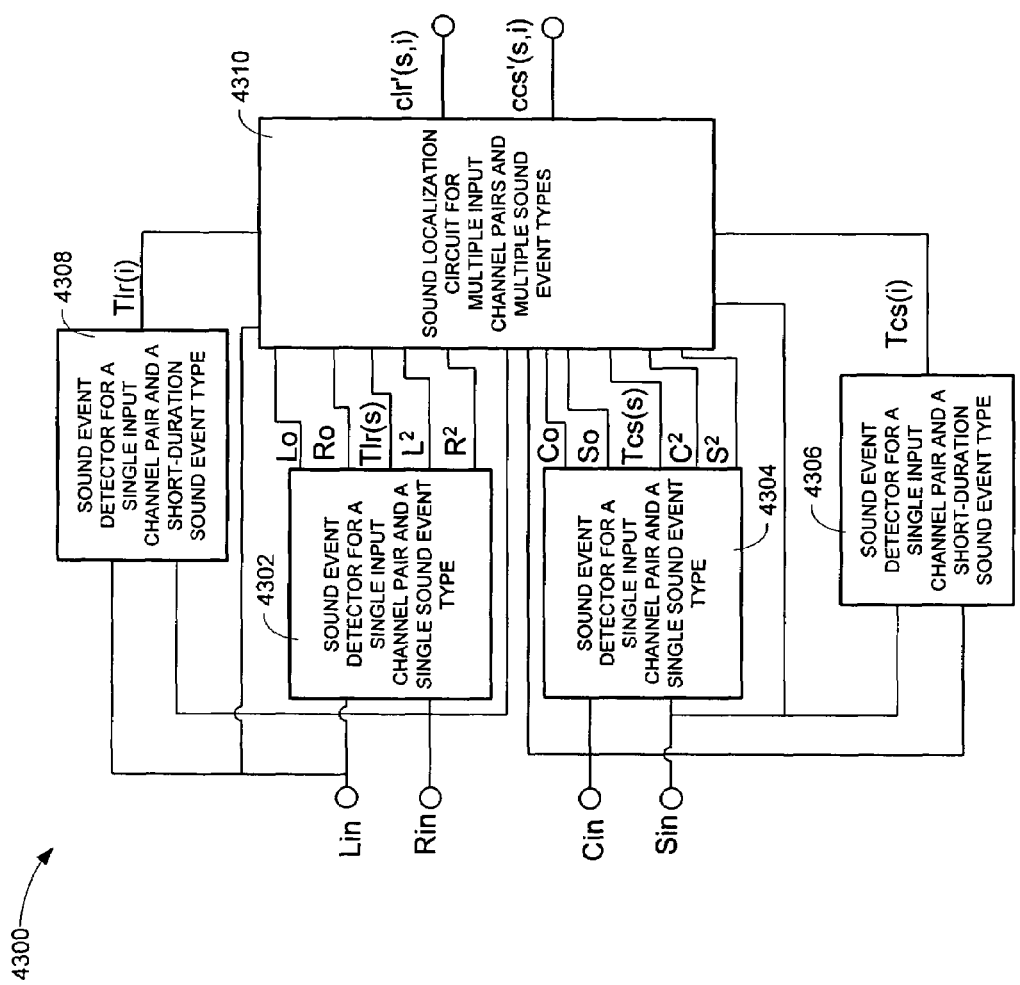
FIG. 43 is a block diagram of a sound localizer for multiple input channel pairs and multiple sound event types.

The sound localizer may also be implemented to detect multiple sound event types in a sound field generated in multiple input channel pairs (a "sound localizer for multiple input channel pairs and multiple sound event types"). An example of a sound localizer for multiple input channel pairs and multiple sound event types specifically localizes syllables and impulsive sounds in a left-right input channel pair and a center-surround input channel pair is shown in FIG. 43 (however, the sound localizer for multiple input channel pairs and multiple sound event types may be implemented to specifically localize any combination of sound events in any number of input channel pairs). This sound localizer for multiple input channel pairs and multiple sound event types 4300 includes: a first and a second sound event detector for a single input channel pair and a short-duration sound event type 4308 and 4306, respectively; a first and a second sound event detector for a single input channel pair and a single sound event type 4302 and 4304, respectively; and a sound event localization circuit for multiple channel pairs and multiple sound event types 4310.

The first sound event detector for a single input channel pair and a single sound event type 4302 may include the sound event detector for multiple channels and a single sound event type shown in FIG. 24 implemented to detect syllables and to produce a left differential signal Lo, a right differential signal Ro and a left-right trigger signal indicating the occurrence of syllables Tlr(s). Similarly, the second sound event detector for a single input channel pair and a single sound event type 4304 may include the sound event detector for multiple channels and a single sound event type shown in FIG. 24 implemented to detect syllables and to produces a center differential signal Co, a surround differential signal So and a center-surround trigger signal indicating the occurrence of syllables Tcs(s). The first sound event detector for a single channel pair and a short-duration sound event type 4308 may include the sound event detector for a single input channel pair and a short-duration sound type shown in FIG. 23 implemented in parallel for each input channel in the pair to detect impulsive sounds and to produce a left-right trigger signal (as a combination of a left trigger signal and a right trigger signal) indicating the occurrence of impulsive sounds Tlr(i). Similarly, the second sound event detector for a single channel pair and a short-duration sound event type 4306 may include the sound event detector for a single input channel pair and a short-duration sound event shown in FIG. 23 implemented in parallel for each input channel in the input channel pair to detect impulsive sounds and to produce a center-surround trigger signal (as a combination of a center trigger signal and a surround trigger signal) indicating the occurrence of impulsive sounds Tcs(i). The sound localization circuit for multiple channel pairs and multiple sound event types 4310 may include the sound localization circuits for multiple channel pairs and a single sound event type as shown in FIGS. 40 and 41 implemented in parallel to produce left-right sound event angle indicating the direction of a detected syllable or impulsive sound whenever any trigger signal (Tlr(s), Tlr(i), Tcs(s), or Tcs(i)) indicates that a sound event is occurring "clr'(s,i)," and a center-surround sound event angle indicating the direction of a detected syllable or impulsive sound whenever any trigger signal (Tlr(s), Tlr(i), Tcs(s), or Tcs(i)) indicates that a sound event is occurring "ccs'(s,i)." Although this sound localizer is implemented to detect and localize syllables and impulsive sounds in left-right and center-surround input channel pairs, it may be implemented to detect any number of sound event types in any number of channel pairs simply by adding additional sound event detectors for a single channel pair implemented to detect the desired sound event types in the desired channel pairs and having the sound localization circuit for multiple channel pairs and multiple sound event types 4310 respond to any of the trigger signals produced by the sound event detectors for a single channel pair.

Furthermore, any of the sound localizers for multiple input channel pairs and multiple sound event types may additionally include an accommodation adjustment circuit and/or an error threshold circuit. Both the accommodation adjustment circuit and the error threshold circuit (not shown) are coupled to the consistency check circuit and include a counter that counts the number of errors detected by the consistency check in a time period of about several seconds. The accommodation adjustment circuit is also coupled to the accommodation signal in the accommodation circuits. In contrast, the error threshold circuit is also coupled to the threshold detector in the trigger generation circuits and further includes an error voltage source that is adjusted according to the number of errors counted by the counter. As the number of errors increases, the voltage produced by the error voltage source will increase to cause the threshold voltage to increase so that fewer sound events are detected.

10. Software

Implementations of the sound event detection methods, sound event detection and localization methods, sound localization methods, any methods included in any of these methods, and sound event detectors, sound event detectors and localizers, and sound localizers include computer readable software code. These algorithms may be implemented together or independently. Such code may be stored on a processor, a memory device or on any other computer readable storage medium. Alternatively, the software code may be encoded in a computer readable electronic or optical signal. The code may be object code or any other code describing or controlling the functionality described in this application. The computer readable storage medium may be a magnetic storage disk such as a floppy disk, an optical disk such as a CD-ROM, semiconductor memory or any other physical object storing program code or associated data.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for determining whether a sound is intended for production in one channel pair comprising a pair of audio channels or a plurality of channel pairs, each comprising a pair of audio channels, comprising:
   detecting one or more sound events in the sound;
   analyzing at least one aspect of power in one or more channel pairs to determine a comparative indicator of the power of the sound in the one or more channel pairs, when any of the one or more sound events are detected;
   determining a number of instances in which the comparative indicator of the power of the sound includes a predetermined result;
   determining whether the number of instances exceeds a predetermined value; and
   determining that the sound is intended for production in the plurality of channel pairs, if the number of instances exceeds the value.

2. The method of claim 1, further comprising determining that the sound is intended for production in the one channel pair, if the number of instances does not exceed the value.

3. The method of claim 1, where detecting the one or more sound events in the sound includes detecting the one or more sound events in an input channel pair.

4. The method of claim 3, where the input channel pair is a center-surround input channel pair.

5. The method of claim 1, where the predetermined result is a rear direction.

6. The method of claim 1, where the predetermined value is about 2 to about 3.

7. The method of claim 1, where the predetermined result is between about zero degrees and about −22.5 degrees.

8. The method of claim 1, further comprising determining a duration of the one or more sound events.

9. The method of claim 8, further comprising determining whether the duration of the one or more sound events exceed about a predetermined duration.

10. The method of claim 9, where the one or more sound events include a sound event type and the predetermined duration is that of the detected sound event type.

11. The method of claim 9, where the predetermined duration is about 50 ms.

12. The method of claim 9, where the predetermined duration is about 200 ms to about 300 ms.

13. The method of claim 9, where determining the comparative indicator of the power of the sound includes determining the comparative indicator of the power of the sound when the duration of the one or more sound events exceed about the predetermined duration.

14. The method of claim 9, where determining the number of instances includes determining the number of instances in which the power of the sound for the one or more sound events that exceed about the predetermined duration, exceeds the value.

15. The method of claim 1, where detecting the one or more sound events includes detecting the one or more sound events in a time period.

16. The method of claim 15, where the time period is about 10 seconds to about 15 seconds.

17. A method for determining whether a sound is intended for production in one channel pair comprising a pair of audio channels or a plurality of channel pairs, each comprising a pair of audio channels, comprising:
    detecting a plurality of sound event types in the sound;
    analyzing at least one aspect of power in one or more channel pairs to determine a comparative indicator of the power of the sound in the one or more channel pairs, when any of the plurality of sound event types is detected;
    determining a number of instances in which the comparative indicator of the power of the sound includes a predetermined result;
    determining whether the number of instances exceeds a predetermined value; and
    determining that the sound is intended for production in the plurality of channel pairs, if the number of instances exceeds the predetermined value.

18. The method of claim 17, further comprising determining that the sound is intended for production in one channel pair, if the number of instances does not exceed a value.

19. The method of claim 17, where the one of the plurality of sound event types that is detected defines a detected sound event type and the method further comprises determining the duration of the detected sound event.

20. The method of claim 19, further comprising determining whether the duration of the detected sound event type exceeds about a predetermined duration.

21. The method of claim 20, where the predetermined duration is that of the detected sound event type.

22. The method of claim 20, where determining the comparative indicator of the power of the sound includes determining the comparative indicator of the power of the sound when the duration of the detected sound event type exceeds about the predetermined duration.

23. The method of claim 17, where detecting the plurality of sound event types includes detecting the plurality of sound event types in a time period.

24. A computer readable medium comprising computer-executable instructions for performing a method for determining whether a sound is intended for production in one input channel pair comprising a pair of audio input channels or a plurality of input channel pairs, each comprising a pair of audio input channels, comprising the steps of:
    detecting one or more sound events in the sound;
    analyzing at least one aspect of power in one or more channel pairs to determine a comparative indicator of the power of the sound in the one or more channel pairs, when any of the one or more sound events are detected;
    determining a number of instances in which the comparative indicator of the power of the sound includes a predetermined result;
    determining whether the number of instances exceeds a predetermined value; and
    determining that the sound is intended for production in the plurality of input channel pairs, if the number of instances exceeds the predetermined value.

25. A computer readable medium comprising computer-executable instructions for performing a method for determining whether a sound is intended for production in one input channel pair comprising a pair of audio input channels or a plurality of input channel pairs, each comprising a pair of audio input channels, comprising the steps of:
    detecting a plurality of sound event types in the sound;
    analyzing at least one aspect of power in one or more channel pairs to determine a comparative indicator of the power of the sound in the one or more channel pairs, when any of the plurality of sound event types is detected;
    determining a number of instances in which the comparative indicator of the power of the sound includes a predetermined result;
    determining whether the number of instances exceeds a value; and
    determining that the sound is intended for production in the plurality of channel pairs, if the number of instances exceeds the predetermined value.

26. An apparatus for determining whether a sound is intended for production in one channel pair comprising a pair of audio channels or a plurality of channel pairs, each comprising a pair of audio channels, comprising:
    a sound event detector in communication with the sound and producing a first signal indicating when a sound event is detected;
    a sound event localizer in communication with the sound event detector, where when the first signal indicates that the sound event is detected, the sound event localizer produces a second signal indicating a comparative indicator of a power of the sound, the comparative indicator of the power of the sound being based on analyzing at least one aspect of the power in one or more channel pairs;
    a detector in communication with the sound event detector and producing a third signal indicating whether the comparative indicator of the power of the sound includes a predetermined result; and
    a counter in communication with the detector and producing a fourth signal indicating whether a number of instances for which the comparative indicator of the power of the sound that includes the predetermined result exceeds a predetermined value, and if the number of instances exceeds the predetermined value, the counter produces the fourth signal indicating that the sound is intended for production in the plurality of channel pairs.

27. The apparatus of claim 26, further comprising, if the number of instances does not exceed the value, the counter produces the fourth signal indicating that the sound is intended for production in the one channel pair.

28. The apparatus of claim 26, where the sound event detector is in communication with a center-surround input channel pair.

29. An apparatus for determining whether a sound is intended for production in one channel pair comprising a pair of audio channels or a plurality of channel pairs, each comprising audio channels, comprising:
- a sound event detector in communication with the sound and producing a first signal indicating when any of a plurality of sound events is detected;
- a sound event localizer in communication with the sound event detector and when the first signal indicates that one of the plurality of sound events is detected, the sound event localizer produces a second signal indicating a comparative indicator of a power of the sound, the comparative indicator of the power of the sound being based on analyzing at least one aspect of the power in one or more channel pairs;
- a detector in communication with the sound event detector and producing a third signal indicating whether the comparative indicator of the power of the sound includes a predetermined result; and
- a counter in communication with the detector, where the counter produces a fourth signal indicating whether a number of instances of the comparative indicator of the power of the sound that includes the predetermined result exceeds a value, where if the number of instances exceeds the predetermined value, the counter produces the fourth signal indicating that the sound is intended for production in the plurality of channel pairs.

30. The apparatus of claim 29, further comprising, if the number of instances does not exceed the value, the counter produces the fourth signal indicating that the sound is intended for production in the one channel pair.

31. The apparatus of claim 29, where the sound event detector is in communication with a center-surround input channel pair.

32. An apparatus for determining whether a sound is intended for production in one input channel pair comprising a pair of audio input channels or a plurality of input channel pairs, each comprising a pair of audio input channels, comprising:
- means for detecting one or more sound events in the sound;
- means for determining a comparative indicator of the power of the sound in communication with the means for detecting, and analyzing at least one aspect of power in one or more channel pairs to determine a comparison of the power of the sound when the means for detecting indicates that the sound event is detected;
- means for determining a number of instances in communication with the means for determining a direction, where the means for determining the number of instances determines the number of instances in which the comparative indicator of the power of the sound includes a predetermined result; and
- means for determining whether the number of instances exceeds a predetermined value in communication with the means for determining the number of instances.

33. A computer readable medium comprising computer-executable instructions for implementing an apparatus for determining whether a sound is intended for production in one channel pair comprising a pair of audio channels or a plurality of channel pairs, each comprising a pair of audio channels, the apparatus comprising:
- a sound event detector in communication with one of the plurality of input channel pairs and producing a first signal indicating when a sound event is detected;
- a sound event localizer in communication with the sound event detector, where when the first signal indicates that the sound event is detect of a power of the sound, the comparative indicator of the power of the sound being based on analyzing at least one aspect of the power in one or more channel pairs;
- a detector in communication with the sound event detector and producing a third signal indicating whether the comparative indicator of the power of the sound includes a predetermined result; and
- a counter in communication with the detector and producing a fourth signal indicating whether a number of instances for which the comparative indicator of the power of the sound that includes the predetermined result exceeds a predetermined value, and if the number of instances exceeds the predetermined value, the counter produces the fourth signal indicating that the sound is intended for production in the plurality of channel pairs.

34. A computer readable medium comprising computer-executable instructions for implementing an apparatus for determining whether a sound is intended for production in one channel pair comprising a pair of audio channels or a plurality of channel pairs, each comprising a pair of audio channels, the apparatus comprising:
- a sound event detector in communication with the sound and producing a first signal indicating when any of a plurality of sound events is detected;
- a sound event localizer in communication with the sound event detector and when the first signal indicates that one of the plurality of sound events is detected, the sound event localizer produces a second signal indicating a comparative indicator of a power of the sound, the comparative indicator of the power of the sound being based on analyzing at least one aspect of the power in one or more channel pairs;
- a detector in communication with the sound event detector and producing a third signal indicating whether the comparative indicator of the power of the sound includes a predetermined result; and
- a counter in communication with the detector and producing a fourth signal indicating whether a number of instances of the comparative indicator of the power of the sound that includes the predetermined result exceeds a predetermined value, where if the number of instances exceeds the predetermined value, the counter produces the fourth signal indicating that the sound is intended for production in the plurality of channel pairs.

35. A computer readable medium comprising computer-executable instructions for implementing an apparatus for determining whether a sound is intended for production in one channel pair comprising a pair of audio channels or a plurality of channel pairs, each comprising a pair of audio channels, the apparatus comprising:
- means for detecting one or more sound events in the sound;
- means for determining a comparative indicator of the power of the sound in communication with the means for detecting, and analyzing at least one aspect of power in one or more channel pairs to determine a comparison of the power of the sound when the means for detecting indicates that any of the one or more sound events are detected;
- means for determining a number of instances in communication with the means for determining a direction, where the means for determining a number of instances determines the number of instances in which the comparative indicator of the power of the sound includes a predetermined result; and means for determining whether the number of instances exceeds a predetermined value in communication with the means for determining the number of instances.

36. The method of claim 1, where analyzing at least one aspect of power comprises comparing the at least one aspect of the power in one audio channel with the at least one aspect of the power in another audio channel.

37. The method of claim 1, where power in the one audio channel comprises squaring a voltage signal in the one audio channel;

where power in the another audio channel comprises squaring a voltage signal in the another audio channel; and where comparing the at least one aspect of the power in one audio channel with the at least one aspect of the power in another audio channel comprises comparing the squared voltage signal in the one audio channel with the squared voltage signal in the another audio channel.

\* \* \* \* \*